United States Patent
Park et al.

(10) Patent No.: US 6,609,003 B1
(45) Date of Patent: Aug. 19, 2003

(54) HANDOFF METHOD IN A MOBILE COMMUNICATION SYSTEM SUPPORTING TRANSMISSION DIVERSITY

(75) Inventors: Su-Won Park, Seoul (KR); Soon-Young Yoon, Seoul (KR); Jae-Min Ahn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/311,546

(22) Filed: May 13, 1999

(30) Foreign Application Priority Data

May 13, 1998 (KR) ........................................ 1998-17277

(51) Int. Cl.[7] ................................................ H04Q 7/20
(52) U.S. Cl. ........................ 455/436; 455/101; 455/437; 455/432; 455/442; 370/331; 370/333; 370/334
(58) Field of Search ................................. 455/432, 436, 455/437, 442, 524, 525, 562, 101; 370/331, 332, 334

(56) References Cited

U.S. PATENT DOCUMENTS

| 5,812,935 A | * | 9/1998 | Kay ........................... 370/333 |
| 5,926,470 A | * | 7/1999 | Tiedemann, Jr. ............ 370/334 |
| 6,118,773 A | * | 9/2000 | Todd ........................... 370/334 |
| 6,141,542 A | * | 10/2000 | Kotzin et al. ............... 455/101 |

FOREIGN PATENT DOCUMENTS

| JP | 8-500474 | 1/1996 |
| JP | 08-195704 | 7/1996 |
| JP | 09-008716 | 1/1997 |
| JP | 9-511107 | 11/1997 |

OTHER PUBLICATIONS

Japanese office Action dated Feb. 4, 2003, issued in a counterpart application, namely, Appln. No. 2000–548963.

* cited by examiner

*Primary Examiner*—Vivian Chin
*Assistant Examiner*—Sujatha Sharma
(74) *Attorney, Agent, or Firm*—Dilworth & Barrese, LLP

(57) ABSTRACT

A method for performing a handoff when a mobile station receiving a transmission diversity signal travels from a first base station transmitting a signal in a transmission diversity mode of operation to a second base station transmitting a signal in the transmission diversity mode of operation. In the method, the mobile station communicates with the first base station in the transmission diversity mode of operation. Prior to performing handoff, the mobile station communicates with the first base station in a non-transmission diversity mode of operation. During the handoff, the mobile station communicates with the first and second base stations in the non-transmission diversity mode of operation. Upon completing the handoff, the mobile station communicates with the second base station in the non-transmission diversity mode of operation. After a predetermined time, the mobile station communicates with the second base station in the transmission diversity mode of operation. Other methods for performing the handoff are also provided where, for example, the mobile station and the base stations operate in the transmission diversity and the non-transmission diversity modes of operation.

9 Claims, 47 Drawing Sheets

HANDOFF METHOD IN A MOBILE COMMUNICATION SYSTEM SUPPORTING TRANSMISSION DIVERSITY

BACKGROUND OF THE INVENTION

1. Field of the Invention

The present invention relates generally to a mobile communication systems, and in particular, to a handoff method in a mobile communication system supporting transmission diversity for a base station.

2. Description of the Related Art

In a mobile communication system, a "transmission diversity" function is generally used to multiplex a path for signals transmitted from a base station to a mobile station. This provides an increase in reliability of the received signals having the same transmission power at a receiving mobile station as at the base station. Here, the "path" refers to a physical path through which a signal can be transmitted from a transmitter to a receiver. The physical path depends on several factors, such as propagation direction of a transmission antenna, polarization of a transmission signal, location of the transmission antenna, different carrier used on a frequency axis, and different transmit time on a time axis. The path does not necessarily mean a spatial path. A term "micro transmission diversity" as used herein refers to a transmission diversity function implemented in one base station, and a term "macro transmission diversity" refers to a transmission diversity function implemented within multiple base stations. A common transmission diversity function is the time switched transmission diversity (TSTD). The TSTD concept is explained in Korean Patent Application Serial No. 1998-5526 having a common assignee.

For simplicity, a base station having the transmission diversity function will be referred to herein as a TSTD base station, and a base station not supporting the transmission diversity function as a non-TSTD base station. Furthermore, a mobile station supporting the transmission diversity function will be referred to herein as a TSTD mobile station and a mobile station not supporting the transmission diversity function as a non-TSTD mobile station.

By way of example, reference will now be made to a prior art soft handoff operation in conjunction with FIGS. 5A and 5B in the case were a soft handoff operation occurs between the non-TSTD mobile station and two non-TSTD base stations.

Referring to FIG. 5A, a signal exchange occurs between a non-TSTD mobile station and two non-TSTD base stations A and B; that is, when the non-TSTD mobile station travels from a non-TSTD base station A (BS#A) to an adjacent non-TSTD base station B (BS#B). Immediately before the soft handoff operation, only the base station A (BS#A) transmits a signal and the mobile station receives the transmitted signal (320). During the soft handoff operation, the base stations A and B simultaneously transmit the same information and the mobile station assigns the fingers to the transmission paths from the respective base stations to receive the transmitted information (330). After completion of the soft handoff operation, only the base station B (BS#B) transmits a signal and the mobile station receives the transmitted signal (340).

FIG. 5B illustrates a timing chart of control signals and traffic signals between the base stations and the mobile station during the handoff operation shown by FIG. 5A. In step 511, the non-TSTD base station A and the non-TSTD mobile station communicate with each other in the non-TSTD mode of operation. During the communication, the mobile station examines in step 513 whether a receiving strength of a signal from the base station A is lower than a threshold to determine whether handoff is required. When the handoff is not required, the mobile station returns to step 511 and continuously communicates with the base station A.

Otherwise, when handoff is required, the mobile station proceeds to step 515 to send a handoff request to the base station A. The base station A then sends a handoff confirm message (or handoff approve message) to the mobile station in step 517. Here, the mobile station can make the handoff request directly by sending a control signal, or can make the handoff request indirectly. For example, for the direct handoff request the mobile station measures strengths of signals from the base stations adjacent thereto and sends an ID (identification) of a base station having the highest signal strength (herein, the base station A) to the base station A. However, for the indirect handoff request, the mobile station sends to the base station A not only a measured strength of a signal from the base station A but also the measured strengths of signals from the adjacent base stations having a received signal strength higher than a threshold, so as to enable the base station A to determine whether to perform the handoff to a handoff target base station (herein, the base station B) when the handoff is required.

In answer to the handoff request, the base station A inquires a base station controller (BSC) as to whether the base station B can accept the handoff request, and sends the inquiry result to the mobile station. At the same moment, the base station B can also send the mobile station information as to whether the handoff is acceptable, in step 519. When the handoff is approved, the base station A sends a signal in the non-TSTD mode of operation in step 521, and at the same time, the base station B also sends the same signal in the non-TSTD mode of operation in step 523. The mobile station receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 525, and the base station A then sends an acknowledge message in answer to the request message and releases the channel in step 527. At the same time, the mobile station also discontinues receiving a signal from the base station A. Thereafter, in step 529, the mobile station communicates with the base station B in the non-TSTD mode of operation.

As described above, the soft handoff operation occurs between base stations and a mobile station without taking the TSTD function into consideration, thereby simplifying the handoff procedure. But, applying the TSTD function to the base station is advantageous in that a higher communication quality can be obtained with the same mean transmission power. However, the TSTD function increases the cost of the mobile communication system, since additional hardware is required. Therefore, in an effort to minimize cost, TSTD base stations are installed in heavy traffic areas and non-TSTD base stations are installed in light traffic areas. Accordingly, when the TSTD function is introduced to a non-TSTD base station installed in a light traffic area in an effort to increase the communication quality, a new handoff procedure is required; that is, the mobile station must be handed-off to a base station which supports the TSTD function. The present invention provides novel methods for performing handoff operations in this and other circumstances while minimizing cost and operational complexity.

SUMMARY OF THE INVENTION

It is, therefore, an object of the present invention to provide a soft handoff method which can be performed between a TSTD mobile station and two TSTD base stations.

It is another object of the present invention to provide a soft handoff method which can be performed when a TSTD mobile station travels from a non-TSTD base station to a TSTD base station.

It is further another object of the present invention to provide a soft handoff method which can be performed between a TSTD mobile station and two non-TSTD base stations.

It is still another object of the present invention to provide a soft handoff method which can be performed when a TSTD mobile station travels from a TSTD base station to a non-TSTD base station.

It is further still another object of the present invention to provide a soft handoff method which can be performed between a non-TSTD mobile station and two TSTD base stations.

It is further still another object of the present invention to provide a soft handoff method which can be performed when a non-TSTD mobile station travels from a non-TSTD base station to a TSTD base station.

It is further still another object of the present invention to provide a soft handoff method which can be performed between a non-TSTD mobile station and two non-TSTD base stations.

It is further still another object of the present invention to provide a soft handoff method which can be performed when a non-TSTD mobile station travels from a TSTD base station to a non-TSTD base station.

To achieve these and other objects, handoff methods are provided for a mobile communication system supporting transmission diversity. In one embodiment, a method is disclosed for performing a handoff operation when a non-TSTD mobile station travels from a non-TSTD base station A to an adjacent non-TSTD base station B. Immediately before the soft handoff, the base station A transmits a signal in the non-TSTD mode of operation, and the mobile station receives the transmitted signal. During the soft handoff operation, the base stations A and B alternately transmit the same data via selected antennas thereof in a macro-TSTD mode of operation, and the mobile station assigns fingers to the transmission paths from the respective base stations to receive the transmitted data. In this embodiment, two fingers are assigned all together. After completion of the soft handoff operation, the base station B operates in the non-TSTD mode and the mobile station also operates in the non-TSTD mode to receive data from the base station B.

During the handoff operation, the non-TSTD base station A and the non-TSTD mobile station communicate with each other in the non-TSTD mode of operation. During the communication, the mobile station examines whether a receiving strength of a signal from the base station A is lower than a threshold to determine whether handoff is required. When handoff is not required, the mobile station continuously communicates with the base station A. Otherwise, when handoff is required, the mobile station sends a handoff request to the base station A. The base station A then sends a handoff confirm message to the mobile station in response to the handoff request. Together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether the handoff is acceptable.

Thereafter, upon entering the soft handoff state, the base station A transmits a signal in the macro-TSTD mode of operation and at the same time, the base station B also transmits the same signal in the macro-TSTD mode of operation. The mobile station then receives the transmitted signals by assigning the fingers for the signals from the respective base stations, multiplies the received signals by the weights corresponding to qualities of the signals from the respective base stations using a combiner and accumulates the multiplied values, to thereby perform the soft handoff operation.

In the meantime, if the quality of a signal from the base station A decreases below a threshold, the mobile station sends a release request message for a channel connected to the base station A. The base station A then sends an acknowledge message in response to the request message and releases the channel. At the instant of sending the channel release request, the mobile station sends a macro-TSTD mode release request to the base station B, and the base station B sends an acknowledge message in response to the request. Upon receipt of the acknowledge message, the mobile station switches the receiving mode from the macro-TSTD mode to the non-TSTD mode and communicates with the base station B in the non-TSTD mode of operation.

DETAILED DESCRIPTION OF PREFERRED EMBODIMENTS

Preferred embodiments of the present invention will be described herein below with reference to the accompanying drawings. In the following description, well known constructions or functions are not described in detail so as not to obscure the present invention. Although the invention is described herein below with reference to several embodiments supporting TSTD, it is also possible to apply the invention to mobile communication systems which do not support the transmission diversity function.

In a mobile communication system according to the present invention, a base station distributes user data to multiple antennas on a time-division basis to perform a transmission diversity function, and a mobile station demodulates the received diversity data using a demodulator.

As noted above, the term "micro-TSTD" as used herein means that a base station having multiple antennas transmits data to a mobile station by alternating the antennas on a time-division basis. That is, the micro-TSTD refers to a normal TSTD. In addition, the term "macro-TSTD" refers to transmitting data to a mobile station using antennas of multiple base stations in a soft handoff state, by selecting a base station and then selecting the transmission antenna in the selected base station.

A. Mobile Communication System

Before describing the various novel methods for performing handoff operations, in accordance with the present invention, a description will be made of a transmitter and receiver of a mobile communication system in which the methods of the present inventions are implemented therein.

1. Transmitter

Figure 1:
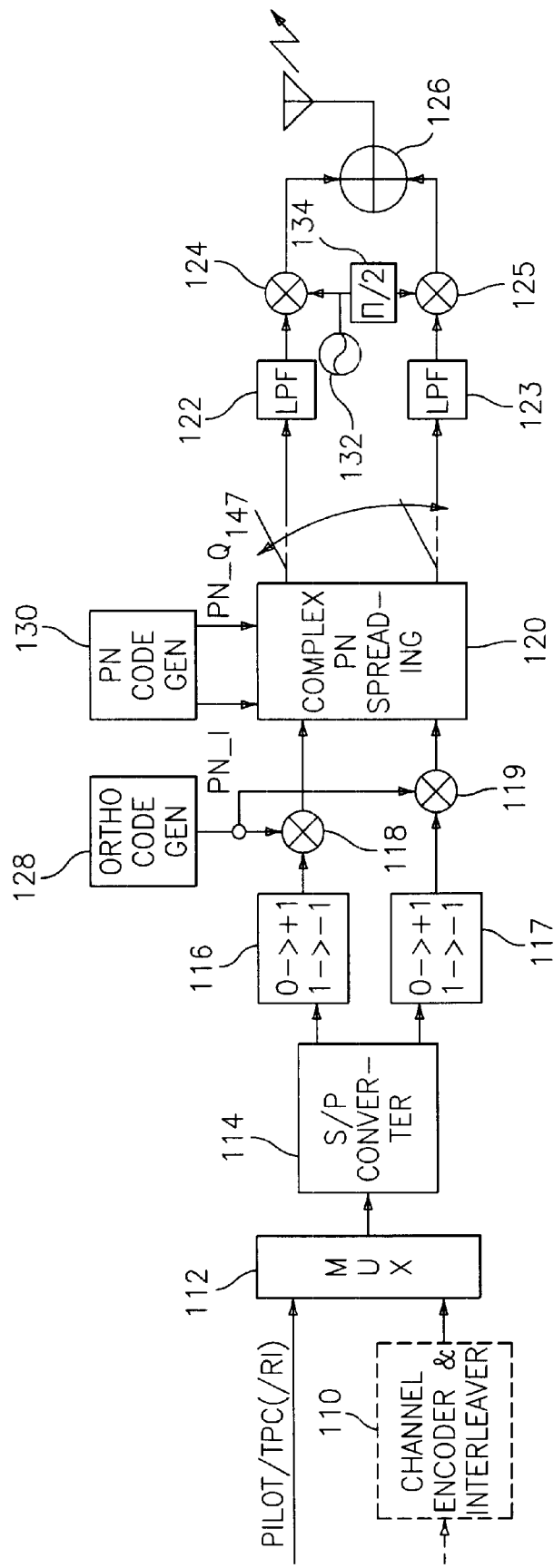
FIG. 1 is a block diagram illustrating a transmitter for a non-TSTD base station of the present invention.
Figure 2:
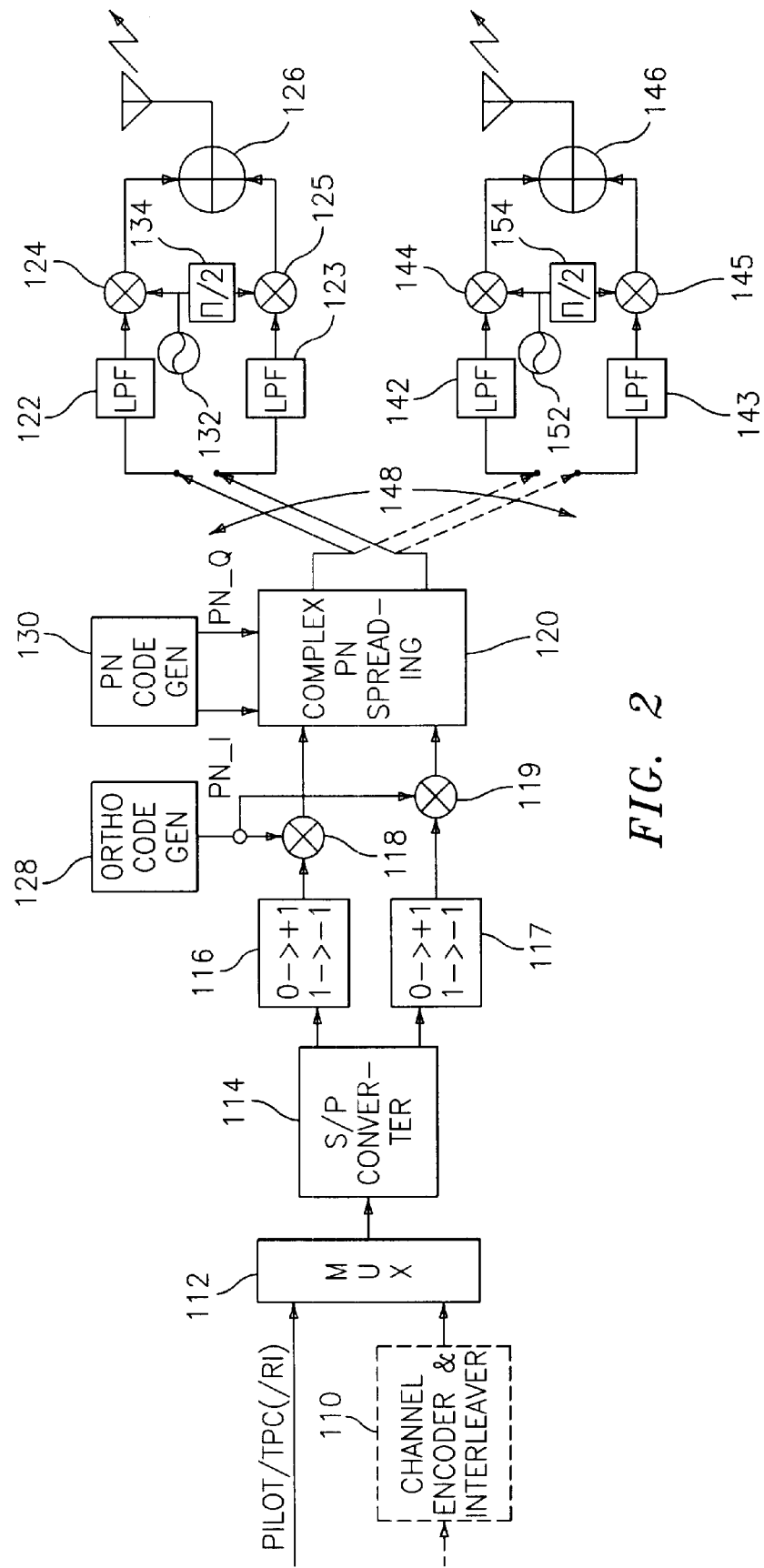
FIG. 2 is a block diagram illustrating a transmitter for a micro-TSTD base station of the present invention.
Figure 3:
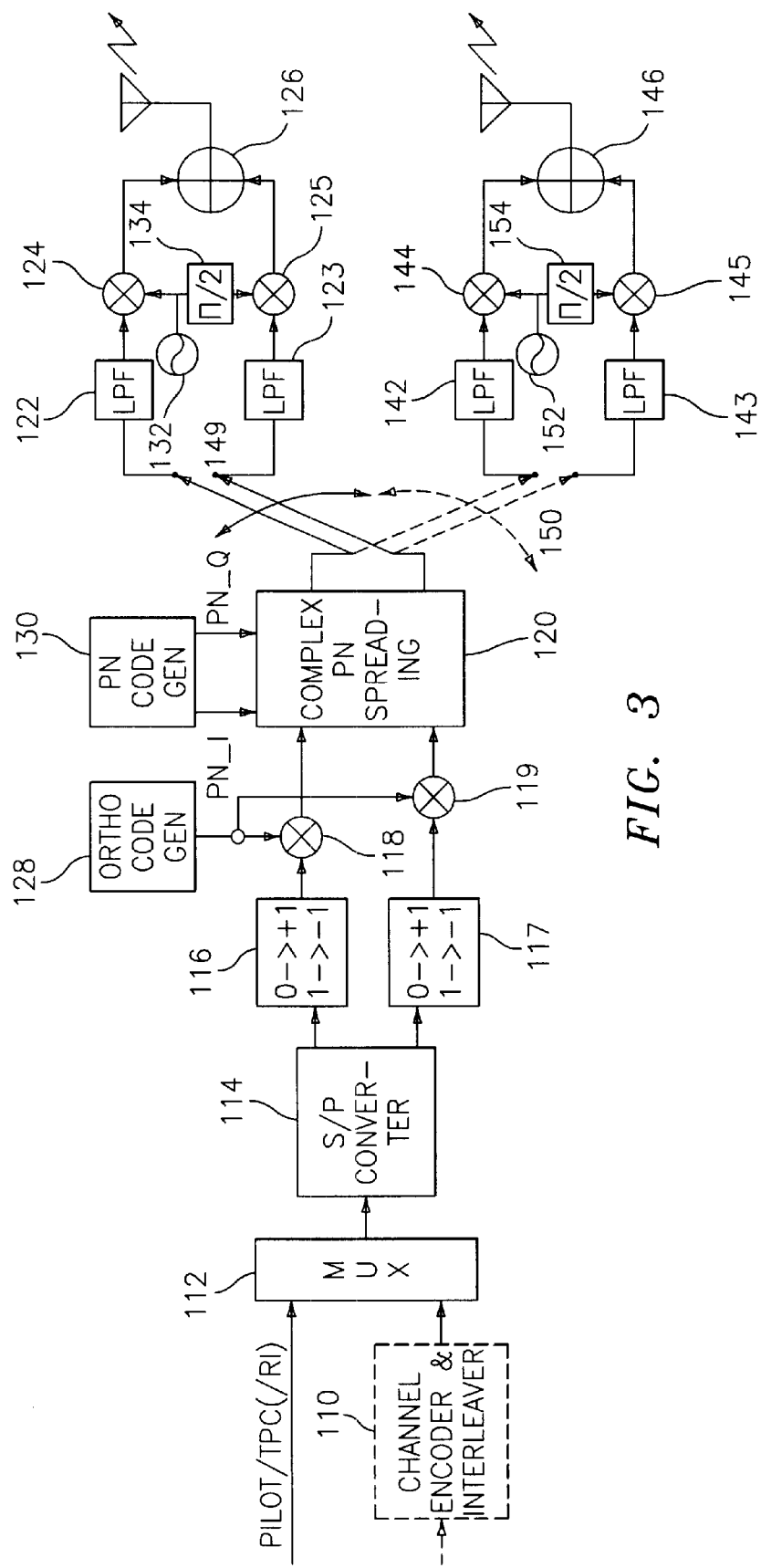
FIG. 3 is a block diagram illustrating a transmitter for a macro-TSTD base station of the present invention.

FIG. 1 is a block diagram illustrating the transmitter structure of a base station. Though unable to support the micro-TSTD, the transmitter can support the macro-TSTD by transmitting data in a DTX mode of operation in a soft handoff state according to an ON/OFF state of the selector 147. FIG. 2 is a block diagram illustrating the transmitter structure for a base station supporting the micro-TSTD, and FIG. 3 is a block diagram illustrating a transmitter structure for a base station supporting the macro-TSTD. The two transmitters have almost the same structure, and the sloe difference therebetween is an operating method of a selector 148 and selectors 149 and 150.

Referring to FIGS. 2 and 3, a description will now be made of the transmitter for the base station supporting the TSTD function in a CDMA mobile communication system. A channel encoder and interleaver 110 is a normal channel encoder and interleaver for increasing reliability of the transmission signals received through a traffic channel. A multiplexer 112 multiplexes pilot symbols, transmission power control (TPC) bits, rate information (RI) bits, and data bits output from the channel encoder and interleaver 110. A serial-to-parallel (S/P) converter 114 receives an output from the multiplexer 112 and outputs odd-numbered symbols to an I channel and even-numbered symbols to a Q channel. Signal converts 116 and 117 convert logic signals "0" and "1" output from the S/P converter 114 to "+1" and "−1", respectively. An orthogonal code generator 128 generates an orthogonal code used for separating transmission channels in the base station. Mixers 118 and 119 multiply converted signals from the signal convertors 116 and 117 by the orthogonal code generated from the orthogonal code generator 128. A PN code generator 130 generates PN codes PN_I and PN_Q and provides them to a complex PN spreader 120 which multiplies outputs of the mixers 118 and 119 by the PN codes PN_I and PN_Q, respectively.

In the base station transmitter of FIG. 2 which supports the micro-TSTD, a selector 148 selects the transmission antennas in the TSTD mode and transfers an output of the complex PN spreader 120 to the selected antenna. In the base station transmitter of FIG. 3 which supports the macro-TSTD, either selector 149 or 150 selects a particular transmission antenna and transmits data in the DTX mode through the selected antenna. A switch 147 is employed to provide a macro-TSTD function in a soft handoff state by intermitting transmission through the antenna. A switch for discontinuous transmission (DTX) can be used in place of the switch 147.

Lowpass filters 122 (or 142) and 123 (or 143) are normal lowpass filters for limiting transmission signals to a specific bandwidth. A carrier generator 132 (or 152) generates a carrier for the transmission signals and provides the carrier to a mixer 124 (or 144) and a 90° phase shifter 134 (or 154). The 90° phase shifter 134 (or 154) shifts a phase of the carrier from the carrier generator 132 (or 152) by 90°, to secure an orthogonality between the I channel and the Q channel. The mixer 124 (or 144) multiplies an output of the lowpass filter 122 (or 142) by an output of the carrier generator 132 (or 152) and provides its output to an adder 126 (or 146). A mixer 125 (or 145) multiplies an output of the lowpass filter 123 (or 143) by an output of the 90° phase shifter 134 (or 154) and provides its output to the adder 126 (or 146). The adder 126 (or 146) adds outputs of the mixers 124 (or 144) and 125 (or 145), and transmits its output via an antenna.

2. Receiver

Figure 4A:
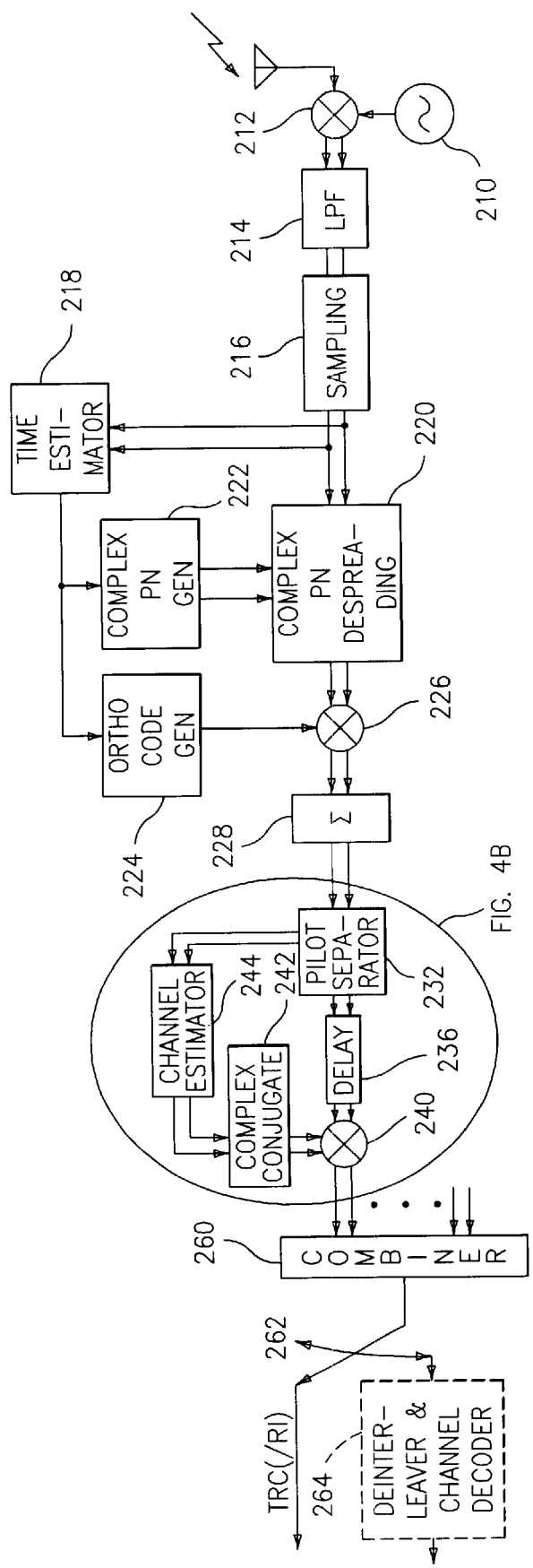
FIG. 4A is a block diagram illustrating a receiver for a TSTD mobile station of the present invention.

FIG. 4A illustrates a receiver for the TSTD mobile station. A mixer 212 multiplies a signal received through an antenna by an output of a carrier generator 210 including the carrier generator 132 and the 90° phase shifter 134 of FIGS. 1 through 3, to convert the received signal to a baseband signal. A lowpass filter 214 lowpass-filters an output of the mixer 212. A sampler 216 samples and quantizes an output of the lowpass filter 214 to convert the lowpass-filtered analog signal to a digital signal. A time estimator 218 follows a PN code to remove a phase difference between the received signal and the PN code generated in the mobile station. The time estimator 218 controls a complex PN code generator 222 and an orthogonal code generator 224. A complex PN despreader 220 PN despreads an output of the complex PN code generator 222 and the sampler 216.

A mixer 226 multiplies the PN despread signal by an output of the orthogonal code generator 224. An accumulator (or integrator) 228 accumulates outputs of the mixer 226 for a symbol duration to generate a symbol estimation value. A pilot separator 232 estimates a channel from the base station antenna to the mobile station to separates pilot signals being non-modulation signals, for reliable symbol estimation. The separated signals are applied to a channel estimator 244, which has structure for communicating with a TSTD mobile station as well as a non-TSTD mobile station. The detailed structure of the channel estimator 244 is illustrated in a circle represented by reference numeral 230.

Figure 4B:
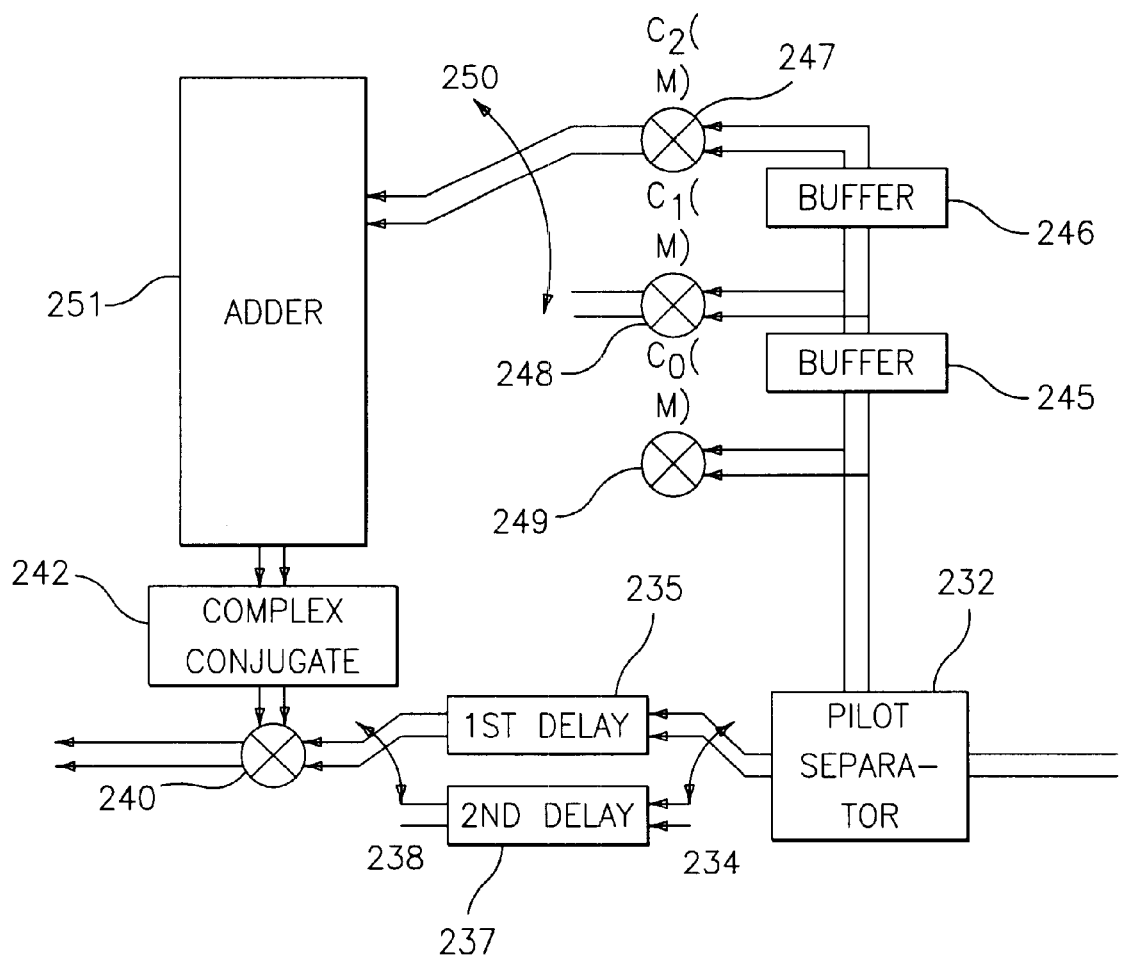
FIG. 4B is a block diagram illustrating a channel estimator of the receiver of FIG. 4A of the present invention.
Figure 5A:
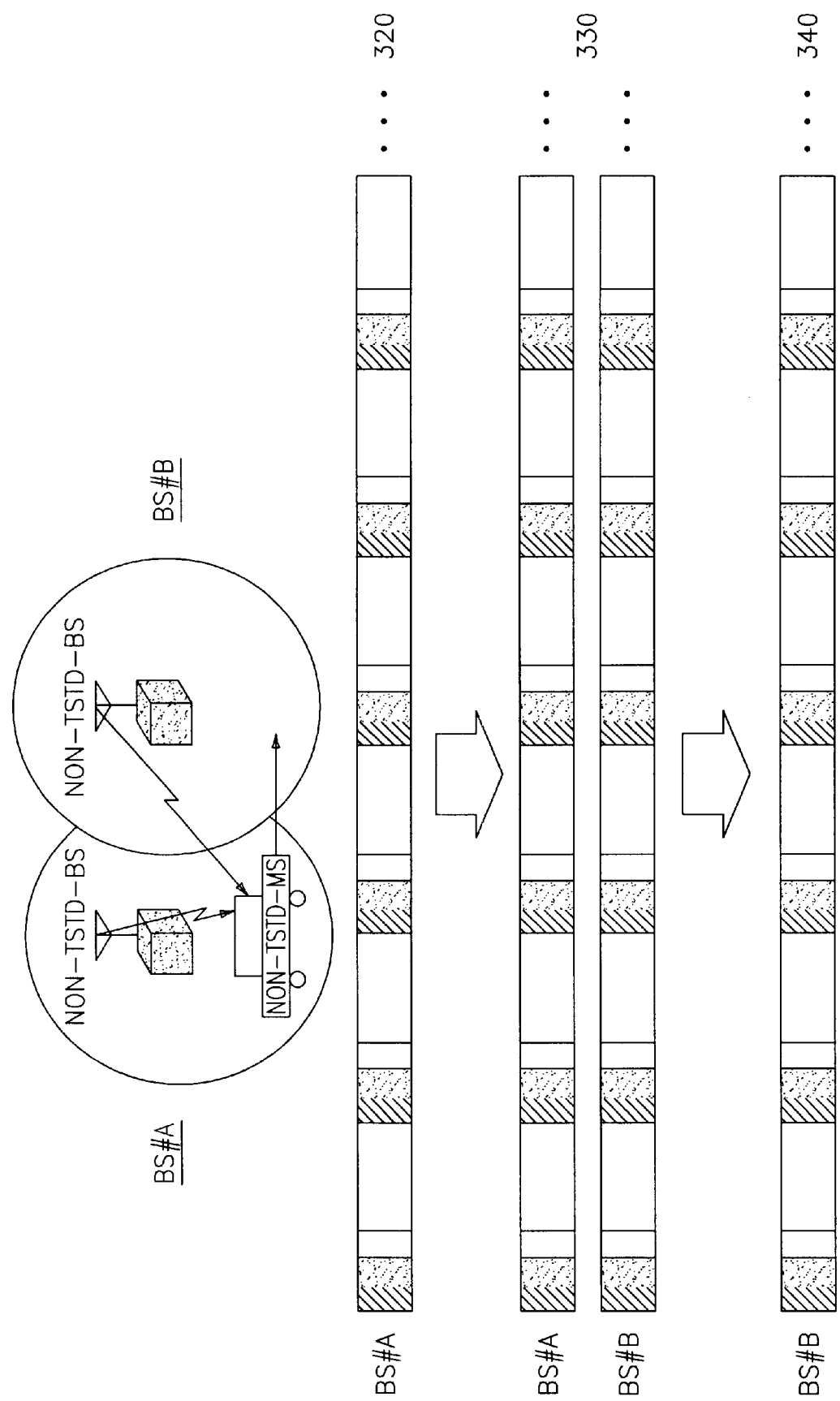
FIGS. 5A and 5B are diagrams illustrating a prior art soft handoff procedure between a non-TSTD mobile station and two non-TSTD base stations.
Figure 5B:
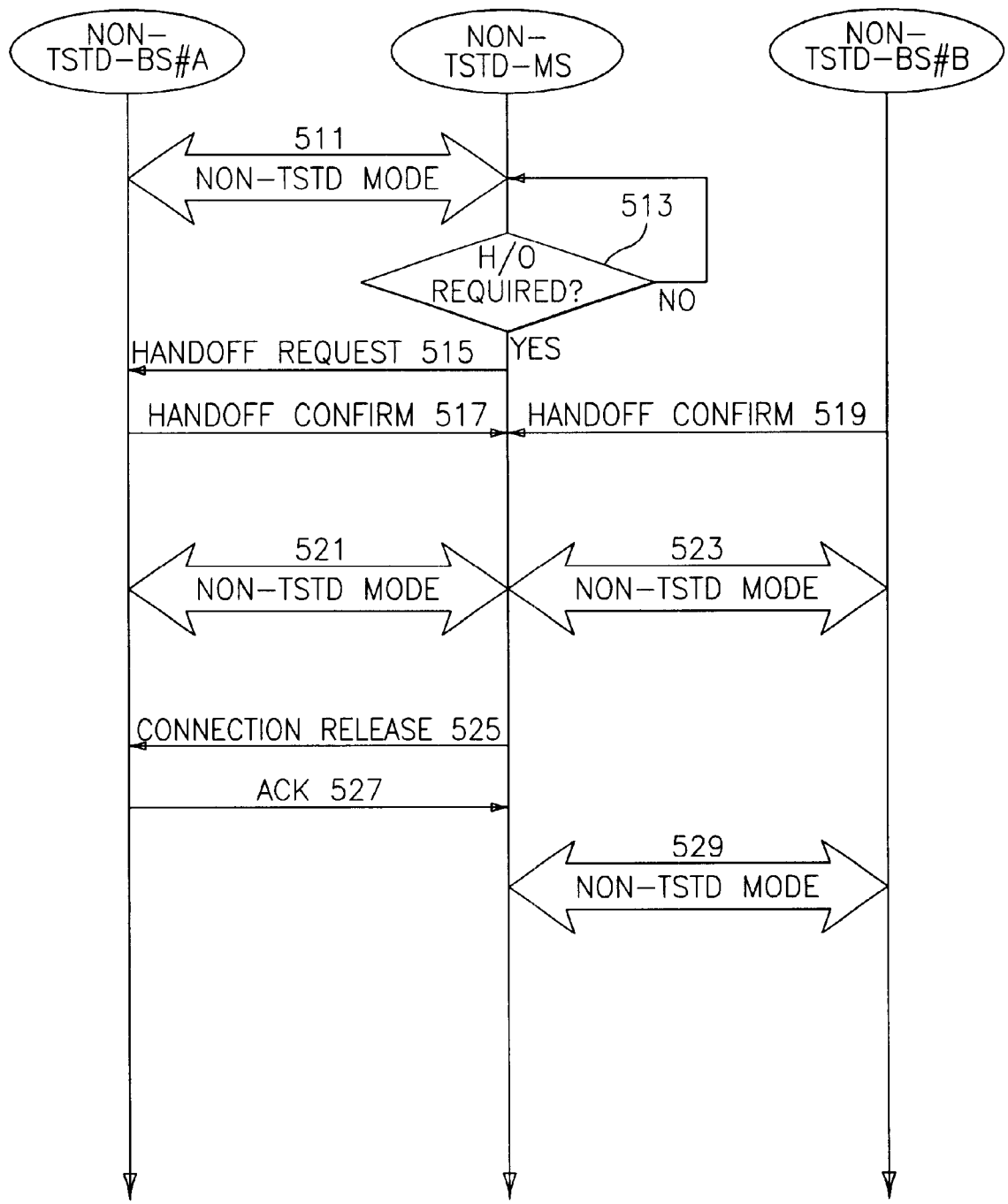

FIG. 4B illustrates the channel estimator 244 for the TSTD mobile station which estimates the channels using two pilot symbols transmitted through the same antenna of a base station having two transmission antennas. Therefore, the channel estimator 244 includes two cascaded buffers for storing outputs of the pilot separator 232.

A selector 250 selects an output of a mixer 247 in a TSTD mode of operation, and an output of the mixer 248 in a non-TSTD mode of operation. Input parameters of the mixers 247 and 248 are fixed regardless of the operation mode because the mixers 247 and 248 are selected by the selector 250, but the parameter $C_0(m)$ of a mixer 249 should be varied according to the operation mode.

Further, since the time delay for the channel estimation depends on the operation mode, a delay 236 is composed of two delays 235 and 237 having a different delay time and two selectors 234 and 238. The selectors 234 and 238 are interlocked with the selector 250. An adder 251 adds outputs of the mixers 247, 248, and 249 in the channel estimator 244. A complex conjugate block 242 complex-conjugates an output of the adder 251. A mixer 240 multiplies an output of the complex conjugate block 242 by an output of a selector 238 to synchronously demodulate data symbols. An output of the mixer 240 is applied to a combiner 260 which combines signals received via multiple paths in the case where the signals transmitted through the same transmission antenna in the base station reach the mobile station via the multiple paths.

FIG. 4A shows the structure of only a particular path, and each receiver having such a structure is called a finger. The combiner 260 adds corresponding weights to outputs of the fingers. An output of the combiner 260 is provided to a selector 262 which performs a demultiplexing process corresponding to the multiplexing process in the transmitter. A deinterleaver and channel decoder 264 deinterleaves and decodes the signals from the selector 262 which have been encoded and interleaved in the channel encoder and interleaver 110 of FIGS. 1 to 3.

Code outputs from the orthogonal code generator 224 and the complex PN code generator 222 in the finger receiving signals from the same micro-TSTD base station, are equal to each other, though they are different from each other in phase. However, outputs of the orthogonal code generator 224 and the complex PN code generator 222 in the finger receiving signals from different macro-TSTD base stations, may be different from each other in phase and in code.

In general, it can be considered that every pilot signal for the signals output from the non-TSTD base station are transmitted through the same path. In addition, it can be considered that the signals output from the same antenna of the TSTD base station are transmitted through the same path. However, it cannot be considered that the signals output from different antennas are transmitted to the mobile station via the same path. Accordingly, channel estimation should be performed independently, for the respective antennas. Furthermore, channel estimation parameters $C_0(m)$, $C_1(m)$, $C_2(m)$, . . . should be varied according to a period of the pilot symbols used for estimation of the respective channels.

A difference between the TSTD mobile station and the non-TSTD mobile station is that for the channel estimator of the non-TSTD mobile station, the selector 250 selects the mixer 248, disregarding the mixer 247 and the buffer 246. Further, the parameter $C_0(m)$ is fixed (or used) and the parameter $C_2(m)$ is disregarded. In addition, since the receiver for the non-TSTD mobile station needs to estimate the channel for only one antenna, the delay 236 is composed of only the delay 235 and the selectors 234 and 238 are switched to select the delay 235.

Now, various embodiments of the present invention will be described as implemented within the above-described structures for the transmitter and receiver in the mobile communication system.

B. First Embodiment

Figure 6A:
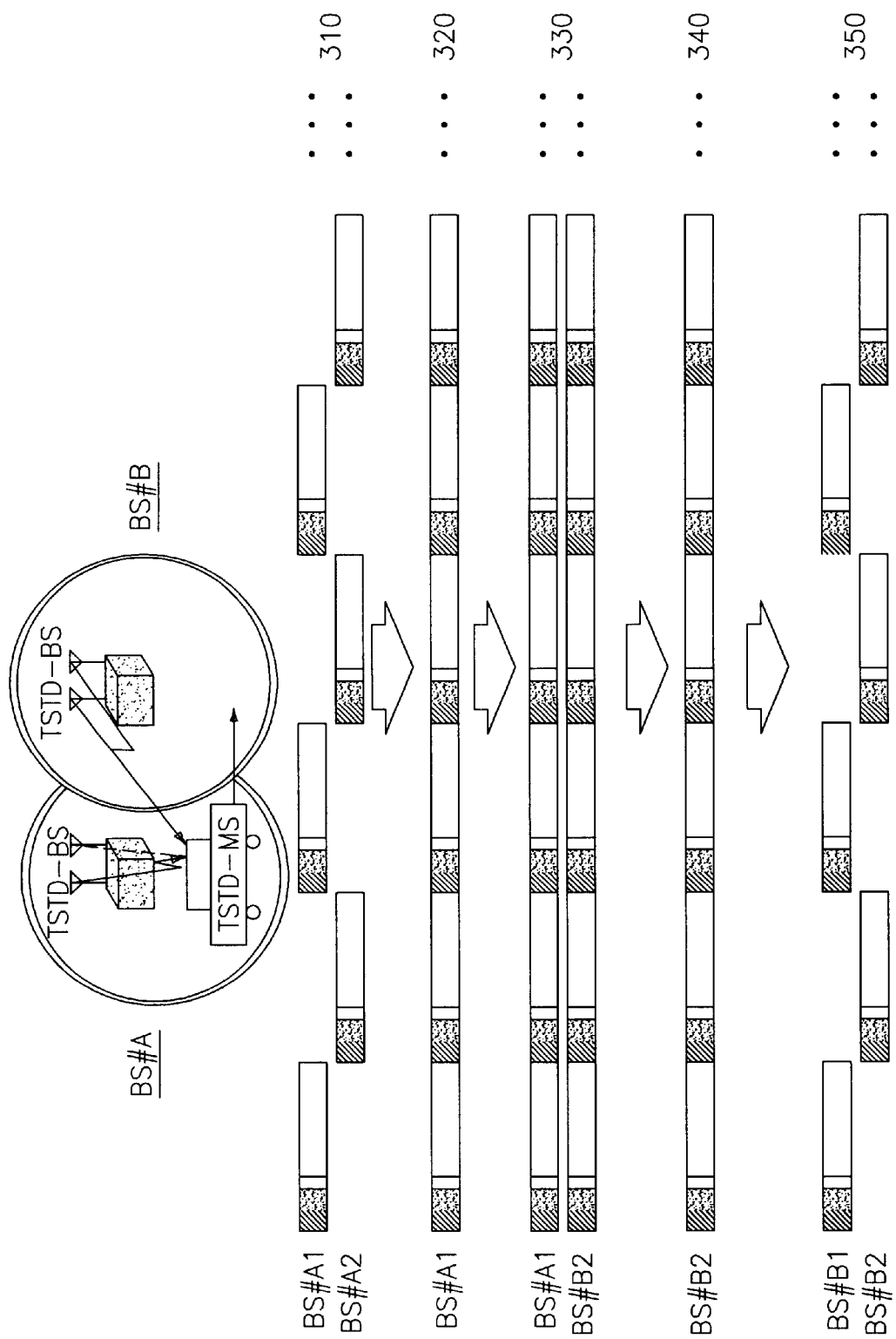
FIGS. 6A and 6B are diagrams illustrating a soft handoff procedure between a TSTD mobile station and two TSTD base stations in a mobile communication system according to a first embodiment of the present invention.
Figure 6B:
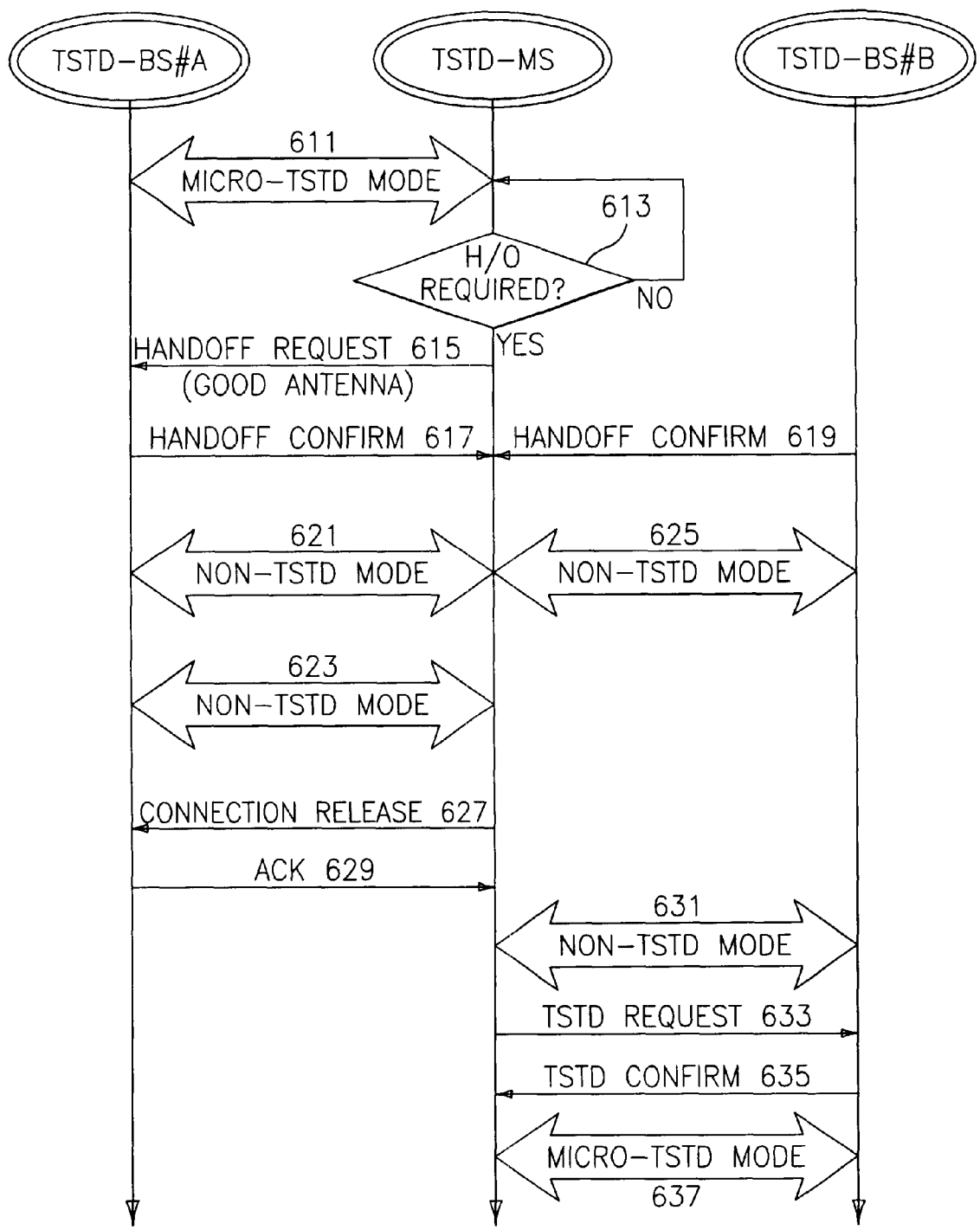

FIGS. 6A and 6B are diagrams illustrating a soft handoff method according to a first embodiment of the present invention. With respect to FIG. 6A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A1 and BS#A2 (310). Prior to executing the handoff procedure, the base station A switches the operation mode from the TSTD mode to the non-TSTD mode to transmit a signal via one of the antennas, and the mobile station receives the transmitted signal (320).

In the non-TSTD mode, the base station selects one of the transmission antennas to transmit a signal according to an antenna select message that the mobile station has transmitted based on a quality (i.e., strength) of a received signal. During the soft handoff, the base stations A and B simultaneously transmit the same information in the non-TSTD mode of operation. The mobile station assigns the fingers to the transmission paths from the respective base stations to receive the transmitted information (330).

Here, selection of the transmission antennas in the base station B entirely depends on a judgement of the base station B itself, because the mobile station has not received a signal transmitted in the TSTD mode from the base station B and thus cannot determine which transmission antenna of the base station B has a better transmission quality. Therefore, selection of the transmission antennas in the base station B is determined by the base station B itself depending on the total transmission powers to the respective antennas. Immediately after the soft handoff, only the base station B transmits a signal in the non-TSTD mode of operation. The mobile station receives the transmitted signal (340). After completion of the soft handoff, the base station B transmits a signal in the TSTD mode of operation. The mobile station also receives the transmitted signal in the TSTD mode of operation (350).

FIG. 6B illustrates a flow diagram of control signals and traffic signals between the base stations and the mobile station during the handoff process of FIG. 6A. In step 611, the TSTD base station A and the TSTD mobile station communicate with each other in the micro-TSTD mode of operation. During the communication, the mobile station examines in step 613 whether a receiving strength of a signal from the base station A is lower than a threshold to determine whether handoff is required. When handoff is not required, the mobile station returns to step 611 and continuously communicates with the base station A. Otherwise, when handoff is required, the mobile station proceeds to step 615 to send a handoff request to the base station A. The base station A then sends a handoff confirm message (or handoff approve message) to the mobile station in step 617.

Here, together with the handoff request, the mobile station sends information about the handoff target base station B and information about a transmission antenna, selected for the non-TSTD mode, out of the transmission antennas of the base station A. Upon receipt of the handoff request, the base station A inquires a base station controller (BSC) as to whether the base station B can accept the handoff, and sends the inquiry result to the mobile station. At the same moment, the base station B can also send the mobile station information as to whether handoff is acceptable, in step 619. When handoff is approved, the base station A sends a signal via the transmission antenna selected by the mobile station in the non-TSTD mode of operation. The mobile station receives the signal transmitted from the base station A in the non-TSTD mode of operation, in step 621.

Thereafter, upon entering the soft handoff state, the base station A sends a signal in the non-TSTD mode in step 623 and at the same time, the base station B also sends the same signal in the non-TSTD mode in step 625. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 627, and the base station A then sends an acknowledge message in response to the request message and releases the channel in step 629. At the same time, the mobile station also discontinues receiving a signal from the base station A.

Thereafter, in step 631, the mobile station communicates with the base station B in the non-TSTD mode of operation. Meanwhile, in step 633, the mobile station requests the base station B to send a signal in the TSTD mode of operation, and the base station B then sends a confirm message (or acknowledge message) to the mobile station in step 635. Subsequently, the mobile station and the base station B communicate with each other in the micro-TSTD mode of operation in step 637.

C. Second Embodiment

Figure 7A:
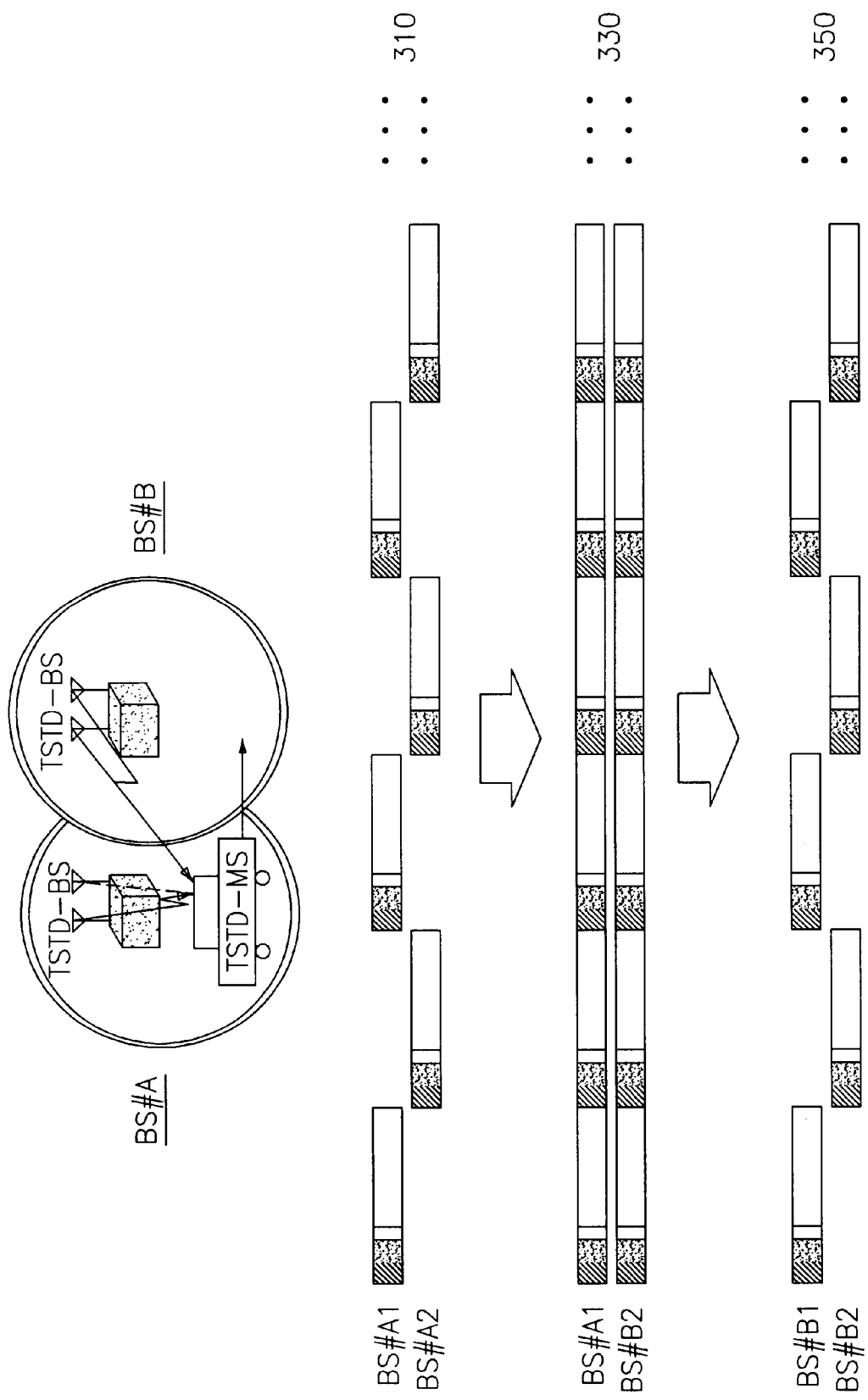
FIGS. 7A and 7B are diagrams illustrating a soft handoff procedure between a TSTD mobile station and two TSTD base stations in a mobile communication system according to a second embodiment of the present invention.
Figure 7B:
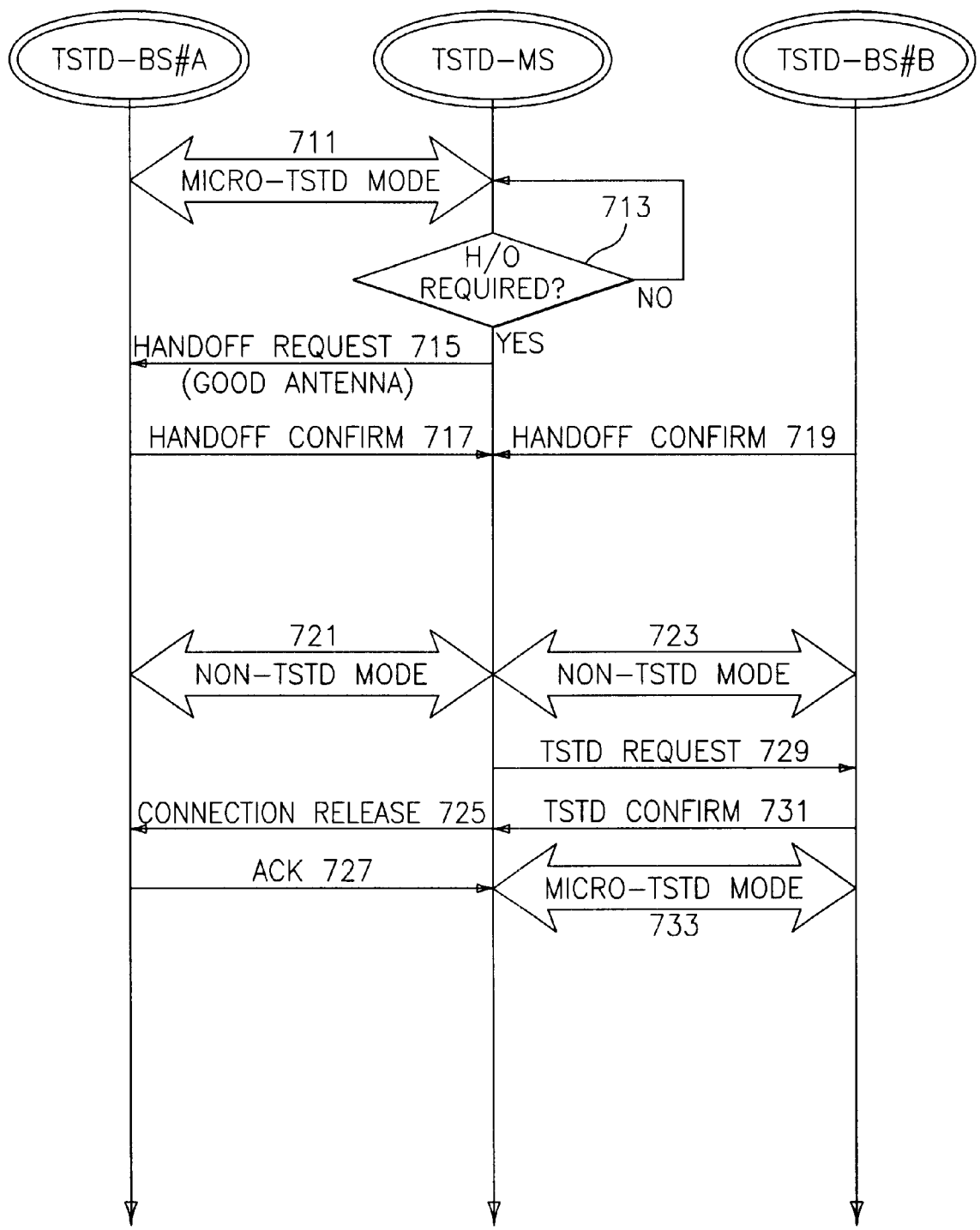

FIGS. 7A and 7B are diagrams illustrating a soft handoff method according to a second embodiment of the present invention. Referring to FIG. 7A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A 1 and BS#A2 (310). During the soft handoff, the base stations A and B simultaneously transmit the same information in the non-TSTD mode of operation, and the mobile station assigns the fingers to the transmission paths from the respective base stations to receive the transmitted information (330).

Here, the base station A selects one of the transmission antennas to transmit a signal according to an antenna select message that the mobile station has transmitted based on a quality (i.e., strength) of a received signal. However, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B transmits a signal in the TSTD mode of operation. The mobile station also receives the transmitted signal in the TSTD mode of operation (350).

FIG. 7B illustrates a flow diagram of control signals and traffic signals between the base stations and the mobile station during the handoff process of FIG. 7A. In step 711, the TSTD base station A and the TSTD mobile station communicate with each other in the micro-TSTD mode of operation. During the communication, the mobile station examines in step 713 whether a receiving strength of a signal from the base station A.is lower than a threshold to determine whether handoff is required. When handoff is not required, the mobile station returns to step 711 and continuously communicates with the base station A. Otherwise, when handoff is required, the mobile station proceeds to step 715 to send a handoff request to the base station A. The base station A then sends a handoff confirm message to the mobile station in step 717.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 719.

Thereafter, upon entering the soft handoff state, the base station A sends a signal in the non-TSTD mode of operation in step 721 and at the same time, the base station B also sends the same signal in the non-TSTD mode of operation in step 723. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 725, and the base station A then sends an acknowledge message in response to the request message and releases the channel in step 727. At the same time, the mobile station also discontinues receiving a signal from the base station A. At the instant of sending the channel release request message, the mobile station requests the base station B to send a signal in the TSTD mode of operation in step 729, and the base station B then sends a confirm message to the mobile station and subsequently, transmits data in the TSTD mode in step 731. Upon receipt of the confirm message, the mobile station switches the operation mode from the non-TSTD mode to the TSTD mode and communicates with the base station B in the micro-TSTD mode of operation in step 733.

D. Third Embodiment

Figure 8A:
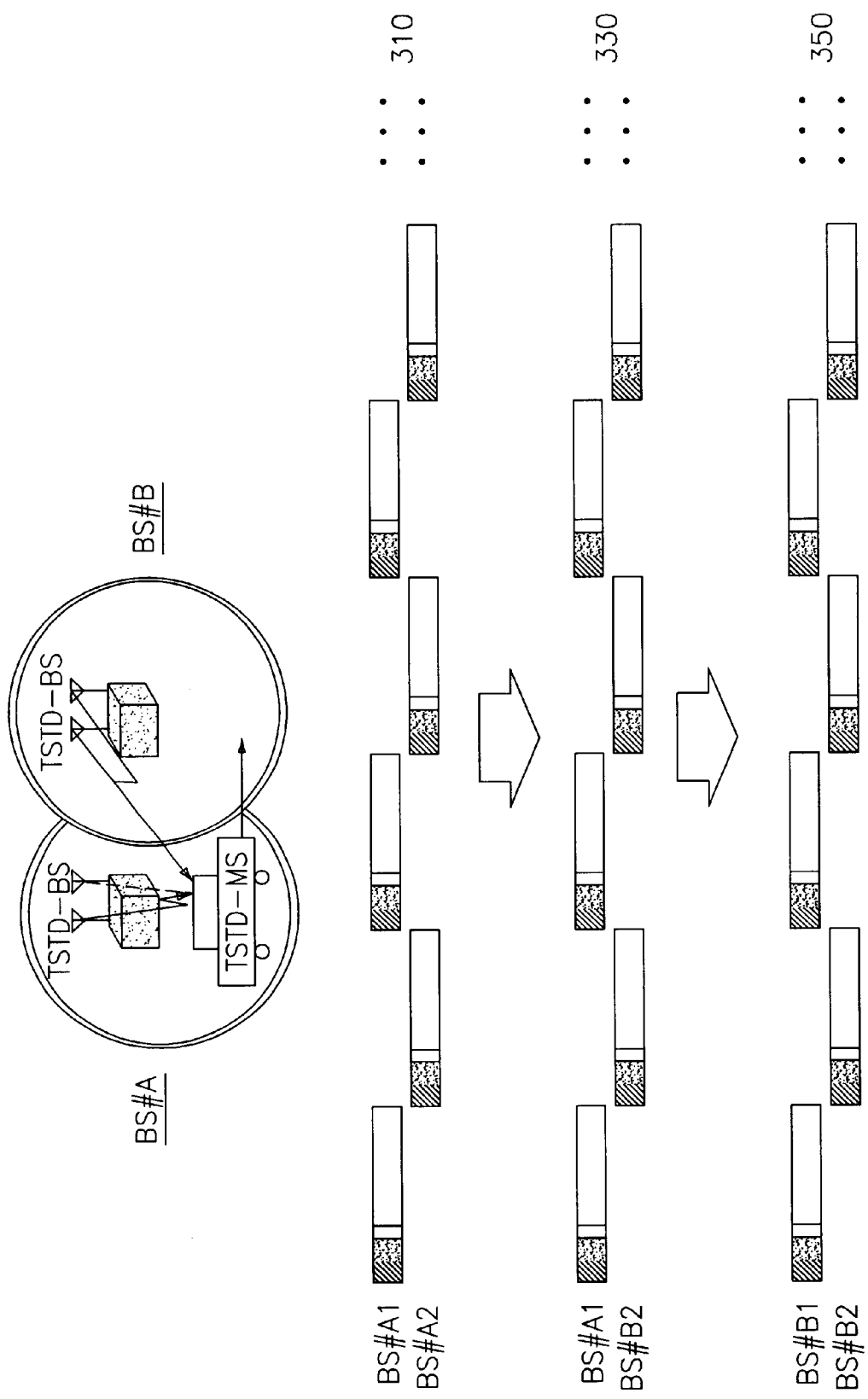
FIGS. 8A and 8B are diagrams illustrating a soft handoff procedure between a TSTD mobile station and two TSTD base stations in a mobile communication system according to a third embodiment of the present invention.
Figure 8B:
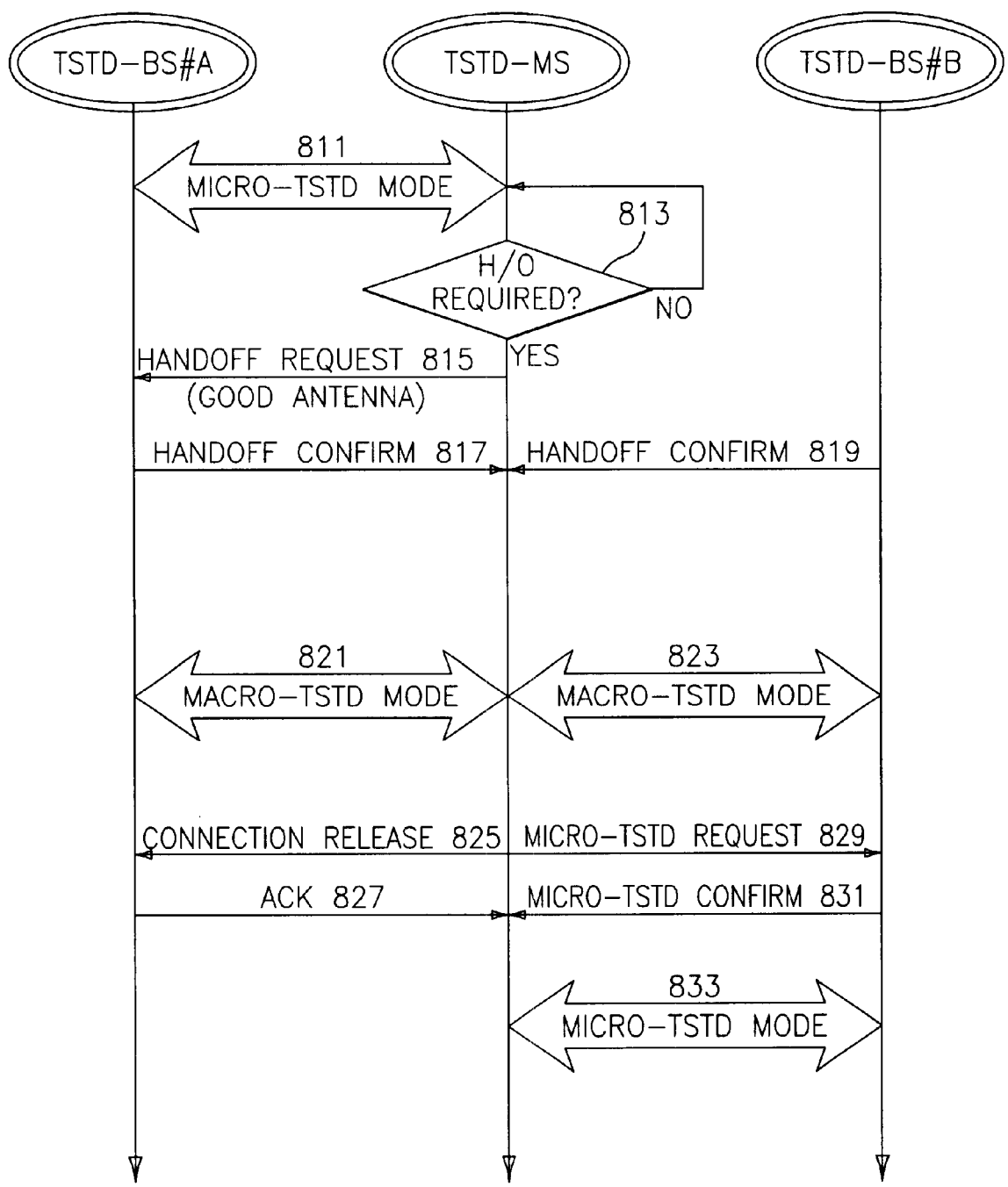

FIGS. 8A and 8B are diagrams illustrating a soft handoff method according to a third embodiment of the present invention. Referring to FIG. 8A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A1 and BS#A2 (310). During the soft handoff, the base stations A and B intermittently transmit data in the macro-TSTD mode of operation via selected ones of the transmission antennas thereof, and the mobile station assigns the fingers to the transmission paths from the respective base stations to receive the transmitted data (360).

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B transmits a signal in the TSTD mode of operation. The mobile station also receives the transmitted signal in the TSTD mode of operation (350).

FIG. 8B illustrates a flow diagram of control signals and traffic signals between the base stations and the mobile station during the handoff process of FIG. 8A. In step 811, the TSTD base station A and the TSTD mobile station communicate with each other in the micro-TSTD mode of operation. During the communication, the mobile station examines in step 813 whether a receiving strength of a signal from the base station A is lower than a threshold to determine whether handoff is required. When handoff is not required, the mobile station returns to step 811 and continuously communicates with the base station A. Otherwise, when handoff is required, the mobile station proceeds to step 815 to send a handoff request to the base station A. The base station A then sends a handoff confirm message to the mobile station in step 817.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 819. Upon entering the soft handoff state through steps 817 and 819, the base stations A and B alternately send the signal in the macro-TSTD mode of operation in steps 821 and 823. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 825, and the base station A then sends an acknowledge message in response to the request message and releases the channel in step 827. At the same time, the mobile station also discontinues receiving a signal from the base station A. At the instant of sending the channel release request message, the mobile station requests the base station B to send a signal in the TSTD mode of operation in step 829, and the base station B then sends a confirm message to the mobile station and subsequently, switches the operation mode to the TSTD mode in step 831. Upon receipt of the confirm message, the mobile station switches the operation mode from the non-TSTD mode to the TSTD mode and communicates with the base station B in the micro-TSTD mode of operation in step 833.

E. Fourth Embodiment

Figure 9A:
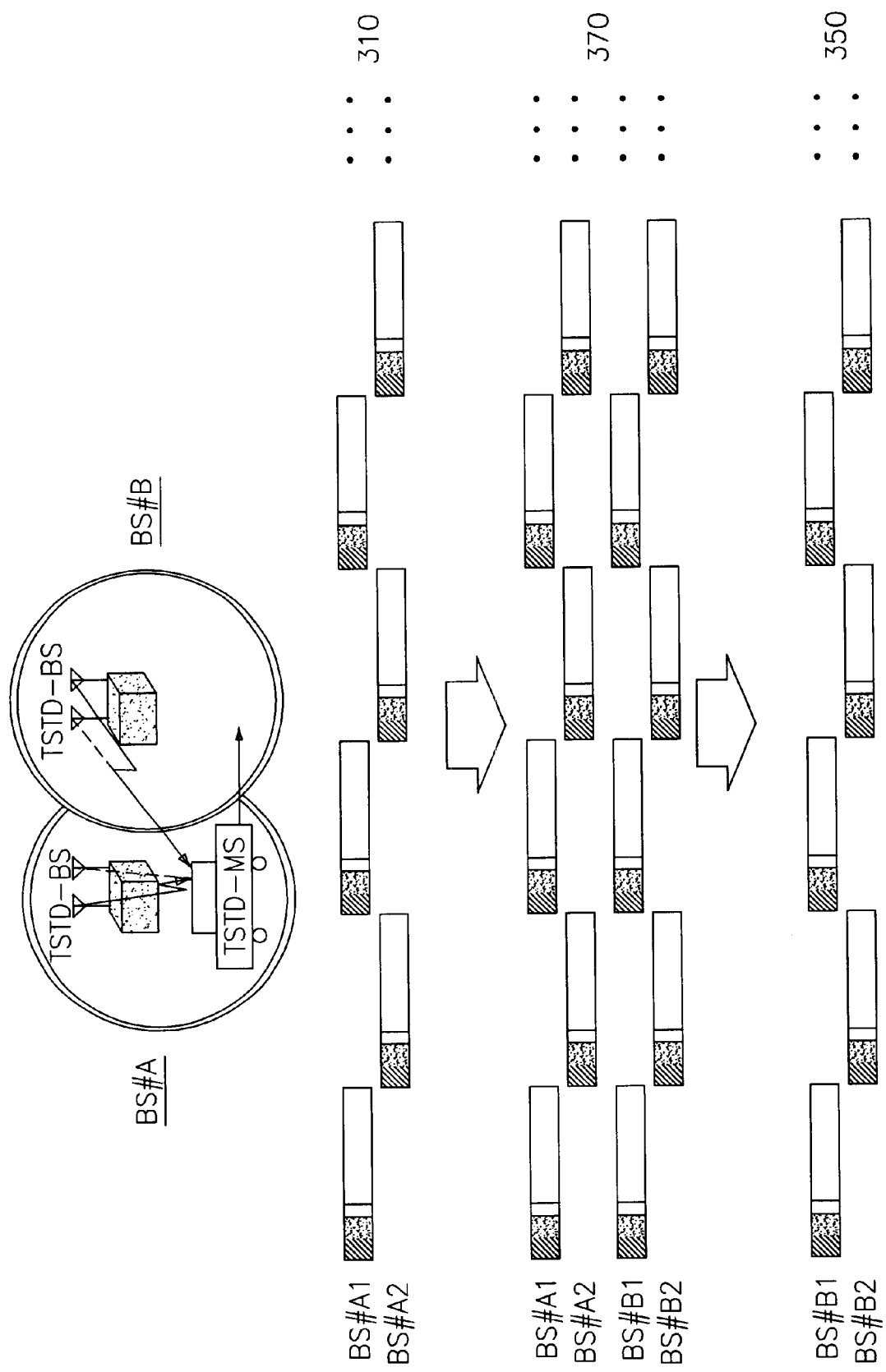
FIGS. 9A and 9B are diagrams illustrating a soft handoff procedure between a TSTD mobile station and two TSTD base stations in a mobile communication system according to a fourth embodiment of the present invention.
Figure 9B:
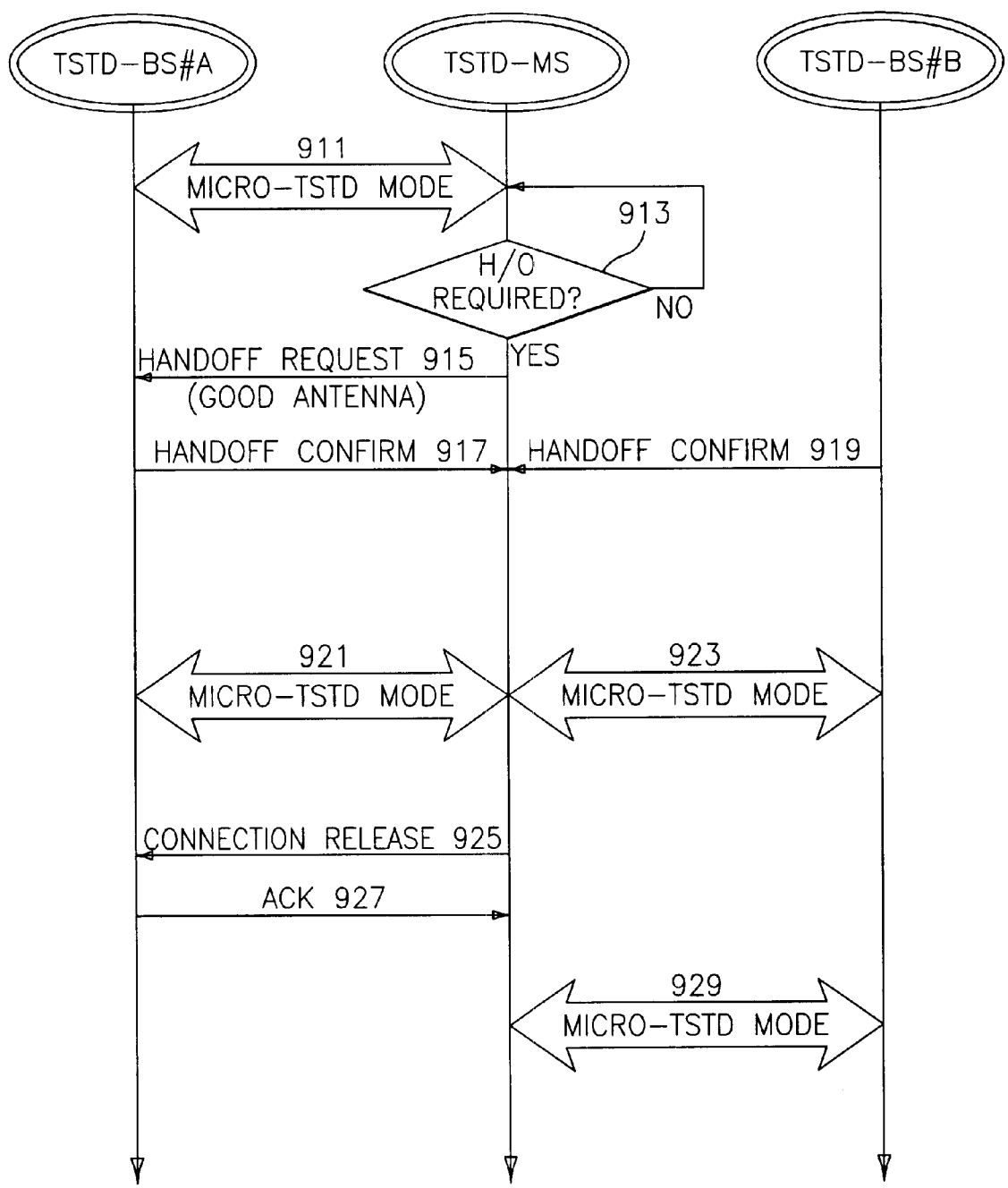

FIGS. 9A and 9B are diagrams illustrating a soft handoff method according to a fourth embodiment of the present invention. Referring to FIG. 9A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A1 and BS#A2 (310). During the soft handoff, the base stations A and B simultaneously transmit the same data in the micro-TSTD mode of operation. The mobile station assigns the fingers to the transmission paths from the respective base stations to receive the transmitted data (370). In this embodiment, four fingers are assigned all together. After completion of the soft handoff, the base station B transmits a signal in the TSTD mode of operation. The mobile station also receives the transmitted signal in the TSTD mode of operation (350).

FIG. 9B illustrates a flow diagram of control signals and traffic signals between the base stations and the mobile station during the handoff process of FIG. 9A. In step 911, the TSTD base station A and the TSTD mobile station communicate with each other in the micro-TSTD mode of operation. During the communication, the mobile station examines in step 913 whether a receiving strength of a signal from the base station A is lower than a threshold to determine whether handoff is required. When handoff is not required, the mobile station returns to step 911 and continuously communicates with the base station A. Otherwise, when handoff is required, the mobile station proceeds to step 915 to send a handoff request to the base station A. The base station A then sends a handoff confirm message to the mobile station in step 917.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 919. Upon entering the soft handoff state through step 917, the base station A sends a signal in the micro-TSTD mode of operation in step 921 and the base station B also sends the same signal in the micro-TSTD mode of operation in step 923. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 925, and the base station A then sends an acknowledge message in response to the request message and releases the channel in step 927. At the same time, the mobile station also discontinues receiving a signal from the base station A. Thereafter, in step 929, the mobile station and the base station B communicate with each other in the micro-TSTD mode of operation.

The fourth embodiment can be applied even to a handoff for a sync channel. In a universal mobile telecommunication system (UMTS), each frame is 10 ms and is composed of 16 time slots. In the sync channel, one time slot is divided into 10 durations, to output first and second sync codes for 256-chip period in a first duration of each slot. Here, a channel for transmitting the first sync code in the first duration of each slot is referred to as a first sync channel, and a channel for transmitting the second sync code in the first duration of each slot is referred to as a second sync channel. Prior to performing the handoff for the sync channel, the mobile station receives a sync channel transmitted in the TSTD mode of operation from the base station A. During the handoff, the mobile station receives both a sync channel transmitted in the TSTD mode of operation from the base station A and a sync channel transmitted in the TSTD mode of operation from the base station B. After completion of the handoff, the mobile station receives a sync channel transmitted in the TSTD mode of operation from the base station B.

F. Fifth Embodiment

Figure 10A:
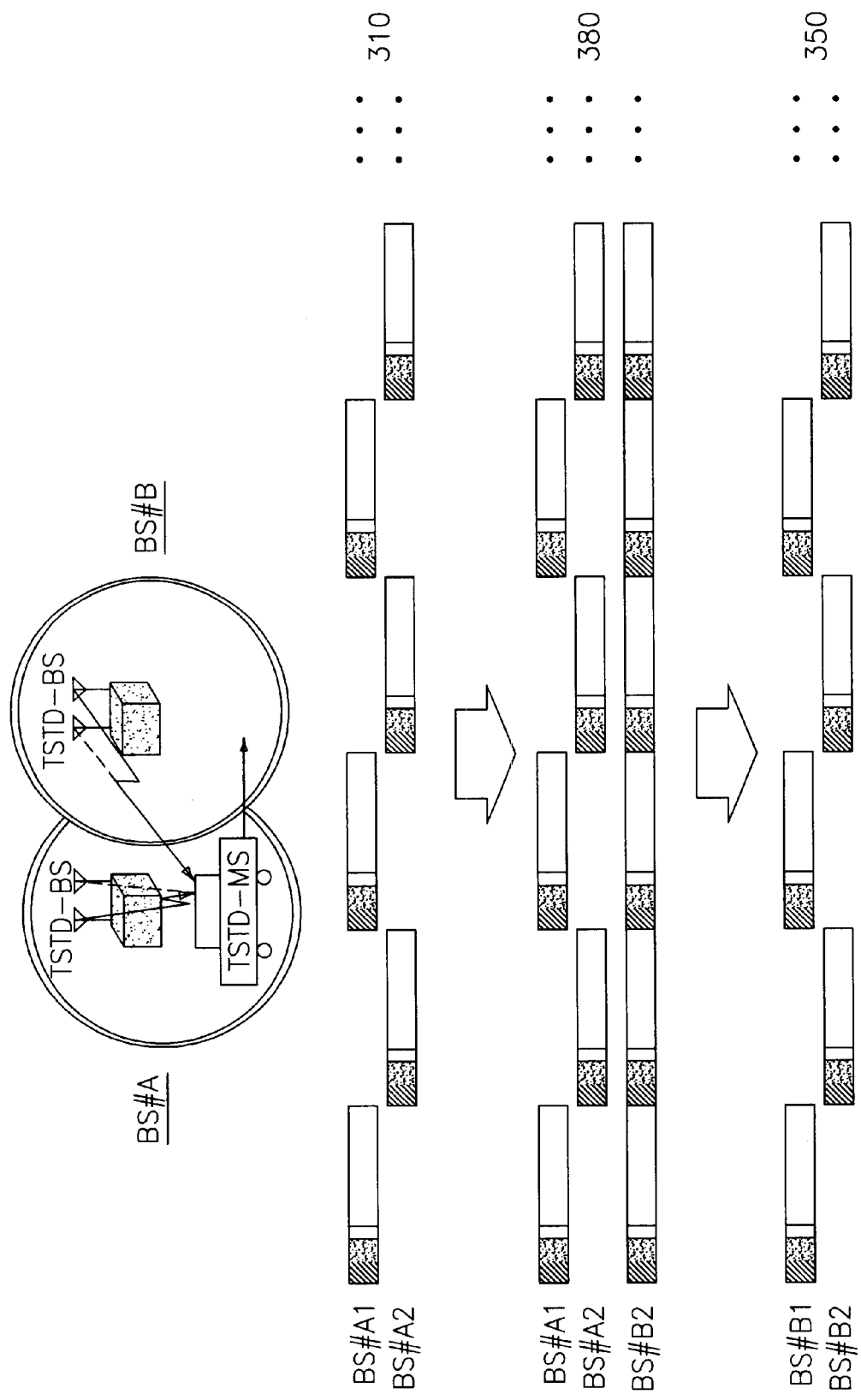
FIGS. 10A and 10B are diagrams illustrating a soft handoff procedure between a TSTD mobile station and two TSTD base stations in a mobile communication system according to a fifth embodiment of the present invention.
Figure 10B:
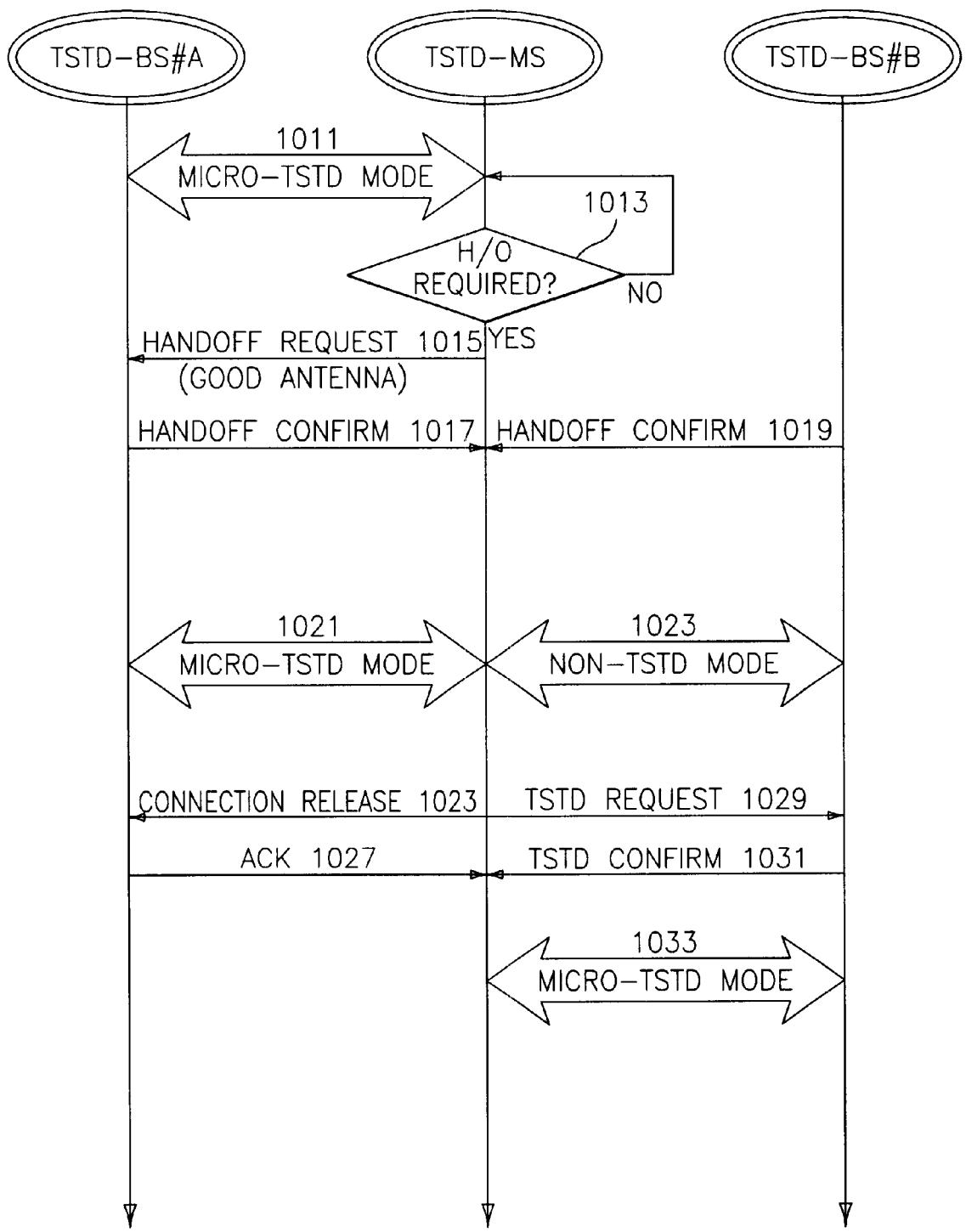

FIGS. 10A and 10B are diagrams illustrating a soft handoff method according to a fifth embodiment of the present invention. Referring to FIG. 10A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A1 and BS#A2 (310). During the soft handoff, the base station A continuously transmits a signal in the TSTD mode of operation and at the same time, the base station B transmits the same signal in the non-TSTD mode of operation. The mobile station then assigns the fingers to the transmission paths from the respective base stations to receive the transmitted signals (380). In this embodiment, three fingers are assigned all together.

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B transmits a signal in the TSTD mode of operation. The mobile station also receives the transmitted signal in the TSTD mode of operation (350).

FIG. 10B illustrates a flow diagram of control signals and traffic signals between the base stations and the mobile station during the handoff process of FIG. 10A. In step 1011, the TSTD base station A and the TSTD mobile station communicate with each other in the micro-TSTD mode of operation. During the communication, the mobile station examines in step 1013 whether a receiving strength of a signal from the base station A is lower than a threshold to determine whether handoff is required. When handoff is not required, the mobile station returns to step 1011 and continuously communicates with the base station A. Otherwise, when handoff is required, the mobile station proceeds to step 1015 to send a handoff request to the base station A. The base station A then sends a handoff confirm message in response to the handoff request in step 1017.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, instep 1019.

Thereafter, upon entering the soft handoff state, the base station A sends a signal in the micro-TSTD mode of operation in step 1021 and at the same time, the base station B sends the same signal in the non-TSTD mode of operation in step 1023. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1025, and the base station A then sends an acknowledge message in response to the request message and releases the channel in step 1027. At the same time, the mobile station also discontinues receiving a signal from the base station A. At the instant of sending the channel release request, the mobile station requests the base station B to send a signal in the TSTD mode of operation in step 1029, and the base station B then sends a confirm message to the mobile station and subsequently, switches the operation mode to the TSTD mode in step 1031. Upon receipt of the confirm message, the mobile station switches the operation mode from the non-TSTD mode to the TSTD mode and communicates with the base station B in the micro-TSTD mode of operation in step 1033.

G. Sixth Embodiment

Figure 11A:
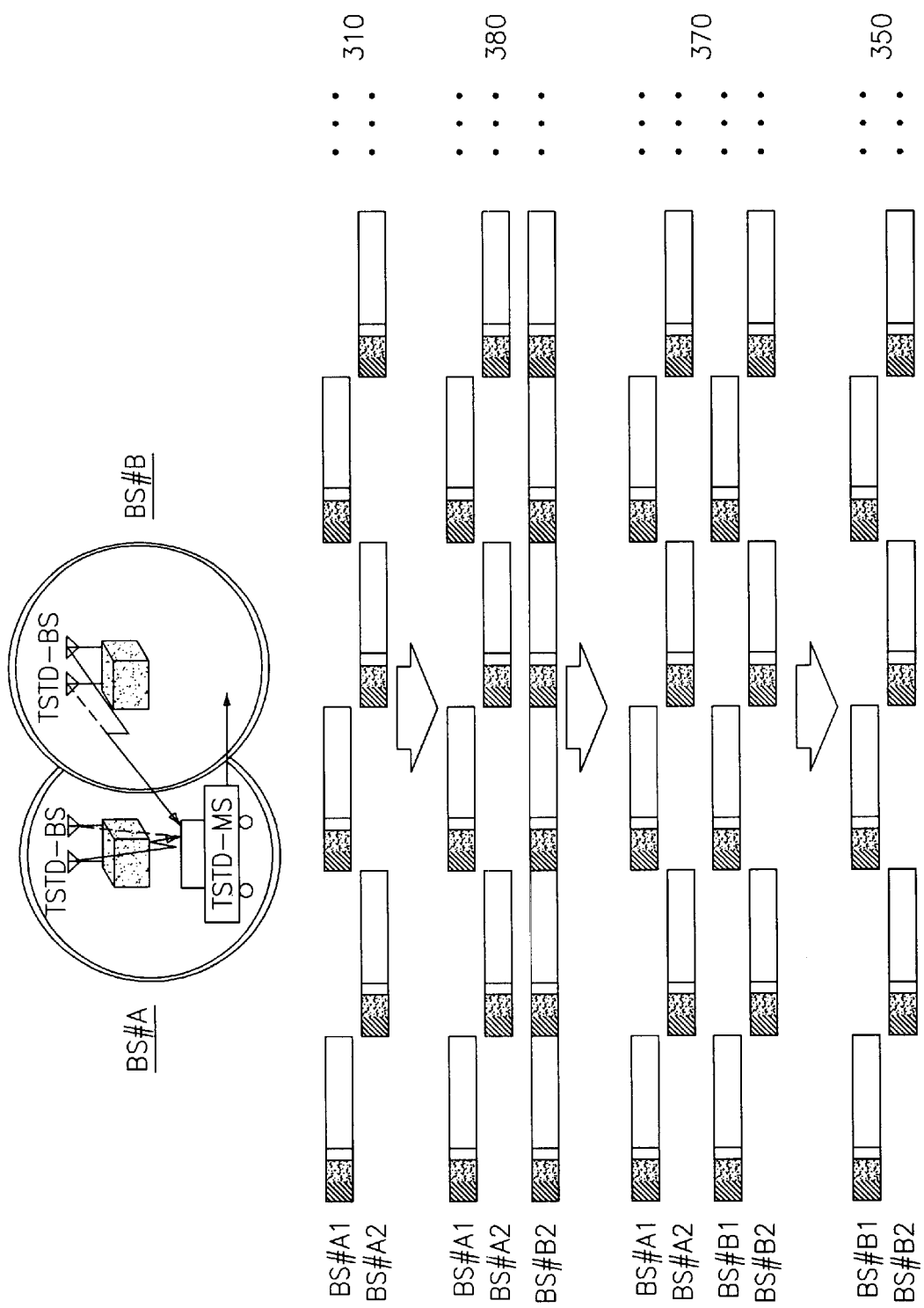
FIGS. 11A and 11B are diagrams illustrating a soft handoff procedure between a TSTD mobile station and two TSTD base stations in a mobile communication system according to a sixth embodiment of the present invention.
Figure 11B:
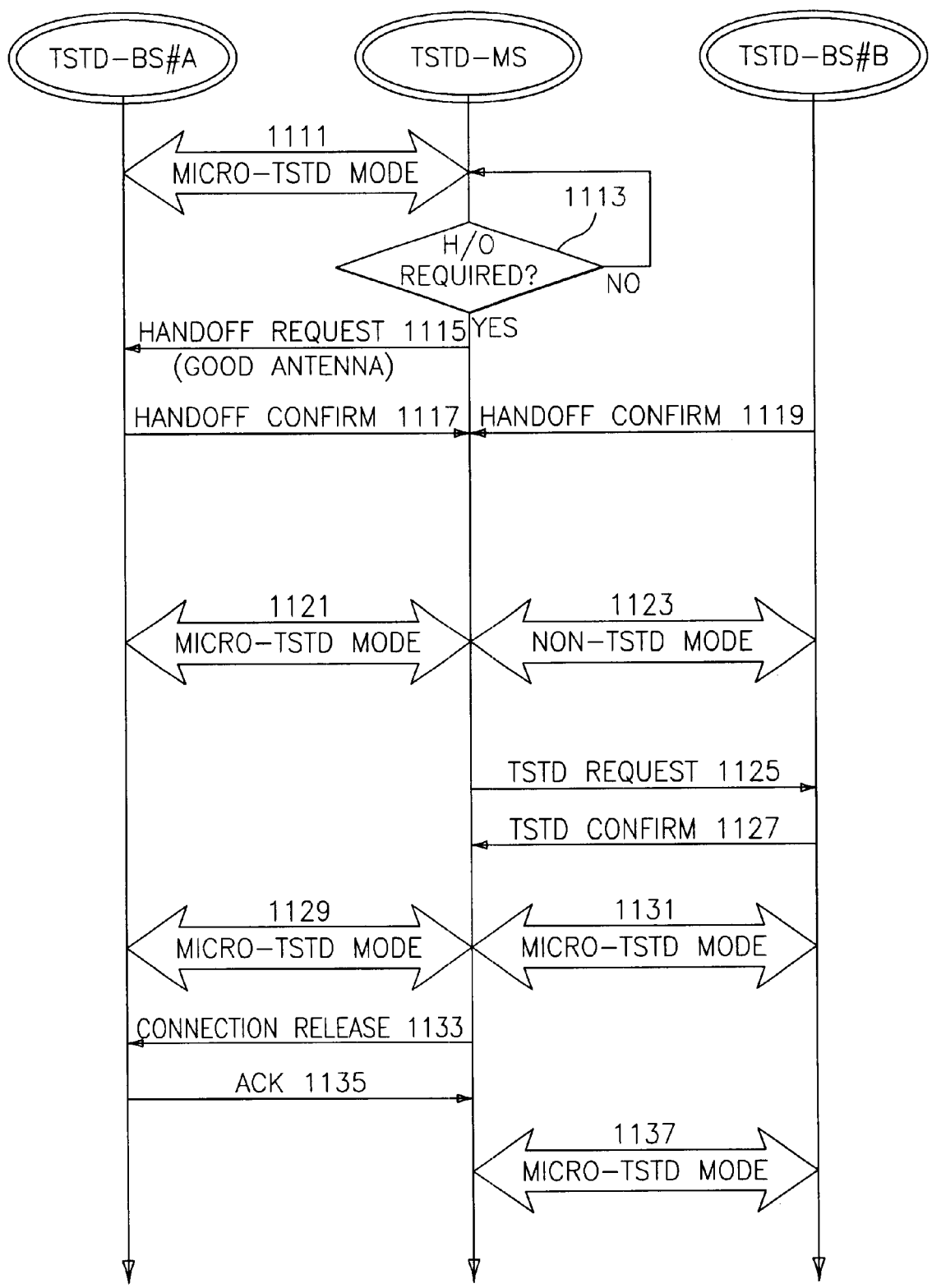

FIGS. 11A and 11B are diagrams illustrating a soft handoff method according to a sixth embodiment of the present invention. Referring to FIG. 11A, a signal exchange occurring when a TSTD mobile station travels from a TSTD base station A (BS#A) to an adjacent TSTD base station B (BS#B). Immediately before the soft handoff, the base station A transmits a signal in the TSTD mode of operation by alternating the transmission antennas BS#A1 and BS#A2 (310). At the beginning of the soft handoff procedure, the base station A transmits a signal in the TSTD mode of operation and at the same time, the base station B transmits the same signal in the non-TSTD mode of operation. The mobile station then assigns the fingers to the transmission paths from the respective base stations to receive the transmitted signals (380).

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. During the soft handoff, the base stations A and B simultaneously transmit the same data in the TSTD mode of operation. The mobile station then assigns the fingers to the transmission paths from the respective base stations to receive the transmitted data (370). In this embodiment, four fingers are assigned all together. After completion of the soft handoff, the base station B transmits a signal in the TSTD mode of operation. The mobile station also receives the transmitted signal in the TSTD mode of operation (350).

FIG. 11B illustrates a flow diagram of control signals and traffic signals between the base stations and the mobile station during the handoff process of FIG. 11A. In step 1111, the TSTD base station A and the TSTD mobile station communicate with each other in the micro-TSTD mode of operation. During the communication, the mobile station examines in step 1113 whether a receiving strength of a signal from the base station A is lower than a threshold to determine whether handoff is required. When handoff is not required, the mobile station returns to step 1111 and continuously communicates with the base station A. Otherwise, when handoff is required, the mobile station proceeds to step 1115 to send a handoff request to the base station A. The base station A then sends a handoff confirm message in response to the handoff request in step 1117.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1119. When handoff is approved through steps 1117 and 1119, the base station A continuously transmits a signal in the micro-TSTD mode of operation in step 1121 and at the same time, the base station B transmits the same signal in the non-TSTD mode of operation in step 1123. Meanwhile, the mobile station requests the base station B to send a signal in the TSTD mode of operation in step 1125, and the base station B then sends a confirm message to the mobile station in step 1127. Upon receipt of the confirm message, the mobile station switches the operation mode from the non-TSTD mode to the TSTD mode to receive the signal transmitted from the base station B.

Thereafter, upon entering the regular soft handoff state, the base station A sends a signal in the micro-TSTD mode of operation in step 1129 and at the same time, the base station B also sends the same signal in the micro-TSTD mode of operation in step 1131. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1133, and the base station A then sends an acknowledge message in response to the request message and releases the channel in step 1135. At the same time, the mobile station also discontinues receiving a signal from the base station A. Thereafter, the mobile station communicates with the base station B in the micro-TSTD mode of operation in step 1137.

H. Seventh Embodiment

Figure 12A:
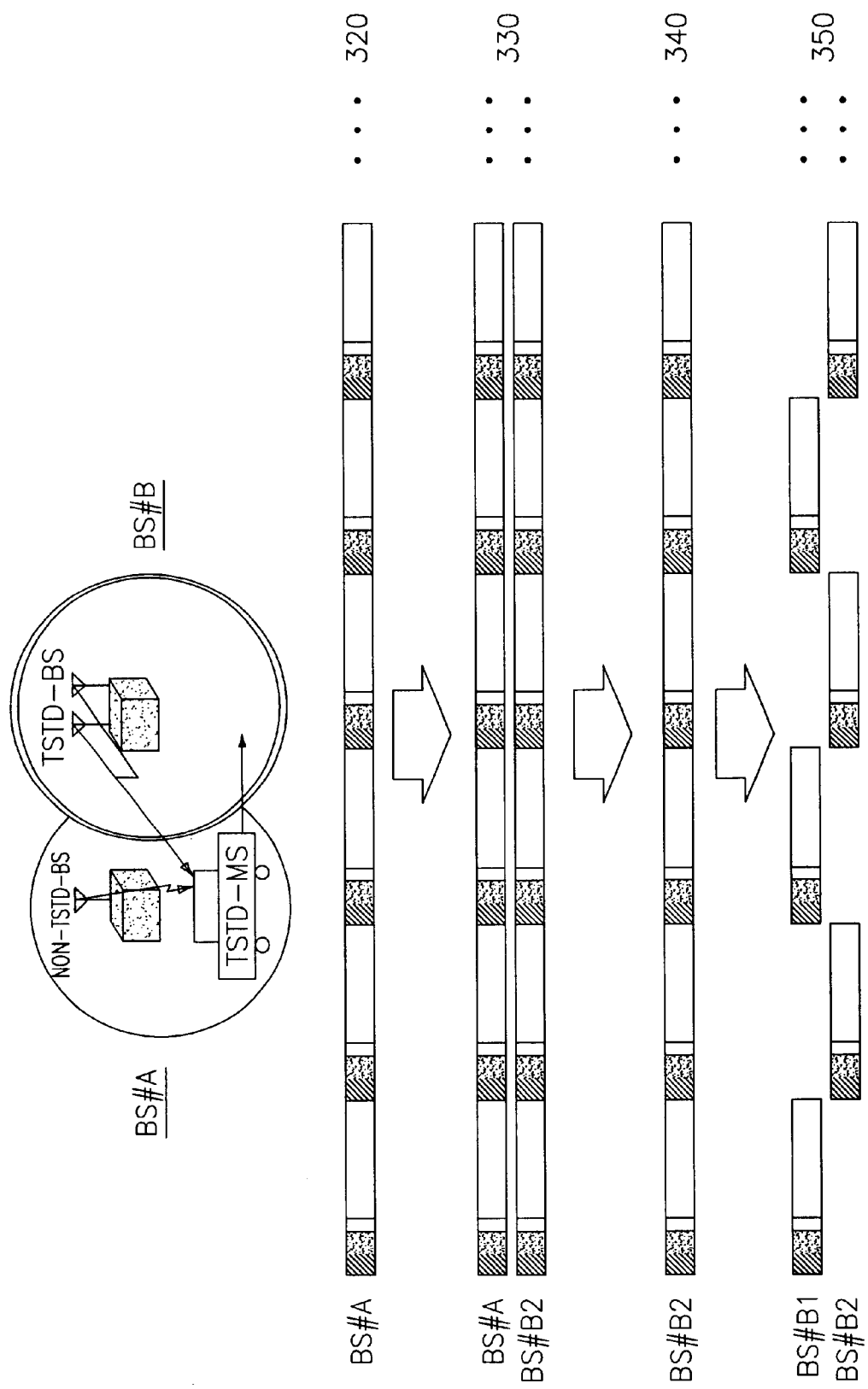
FIGS. 12A and 12B are diagrams illustrating a soft handoff procedure when a TSTD mobile station travels from a non-TSTD base station to a TSTD base station in a mobile communication system according to a seventh embodiment of the present invention.
Figure 12B:
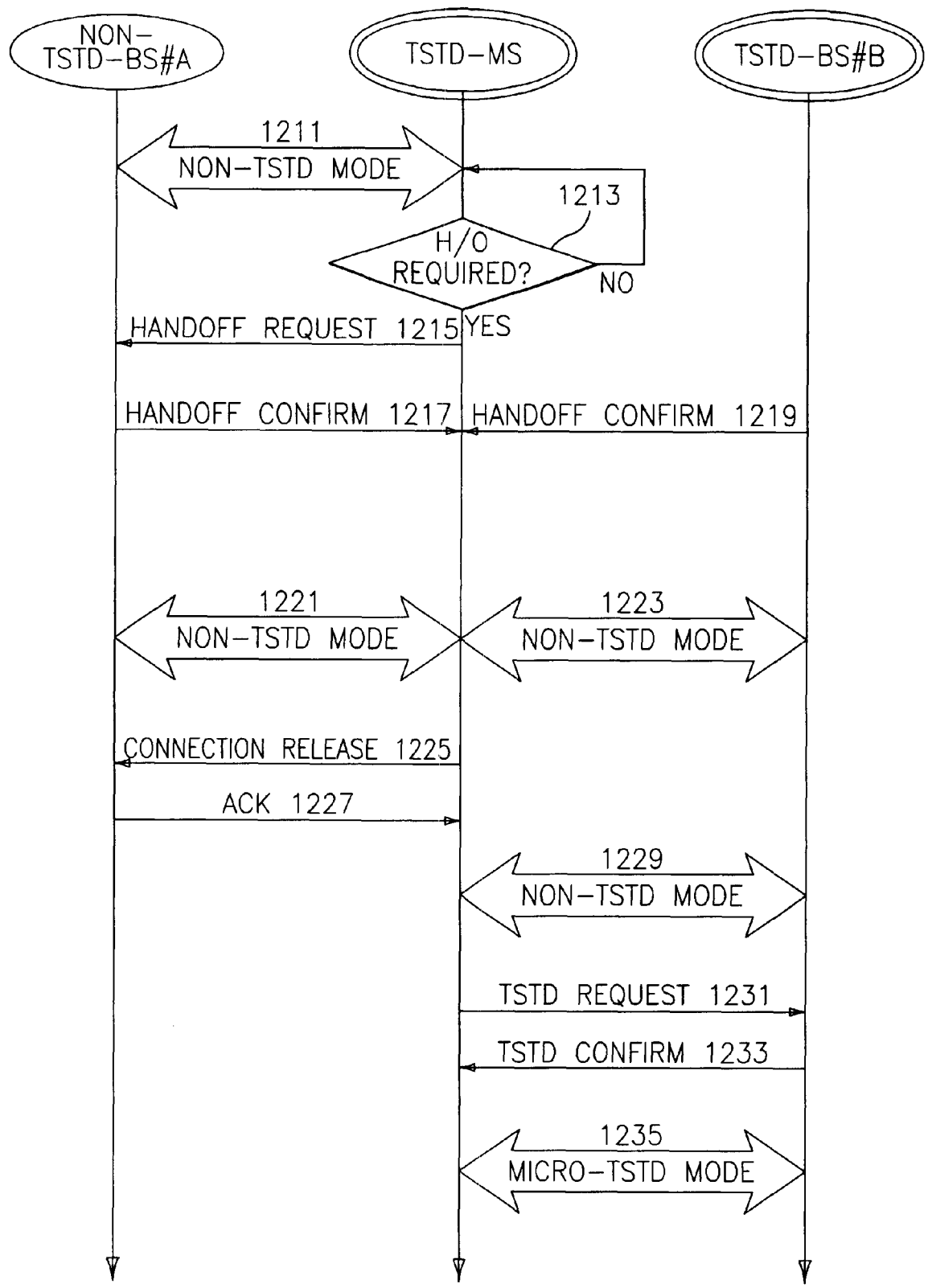

FIGS. 12A and 12B are diagrams illustrating a soft handoff method according to a seventh embodiment of the present invention. Referring to FIG. 12A, a signal exchange occurring when a TSTD mobile station travels from a non-TSTD base station A (BS#A) to an adjacent TSTD base station B (BS#B). Immediately before the soft handoff, the base station A transmits a signal in the non-TSTD mode of operation (320). During the soft handoff, the base stations A and B simultaneously transmit the same data in the non-TSTD mode of operation. The mobile station then assigns the fingers to the transmission paths from the respective base stations to receive the transmitted data (330). In this embodiment, two fingers are assigned all together.

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. Immediately after the soft handoff, only the base station B transmits a signal and the mobile station then receives the a transmitted signal (340). After completion of the soft handoff, the base station B operates in the TSTD mode and the mobile station also operates in the TSTD mode to receive data from the base station B (350).

FIG. 12B illustrates a flow diagram of control signals and traffic signals between the base stations and the mobile station during the handoff process of FIG. 12A. In step 1211, the non-TSTD base station A and the TSTD mobile station communicate with each other in the non-TSTD mode of operation. During the communication, the mobile station examines in step 1213 whether a receiving strength of a signal from the base station A is lower than a threshold to determine whether handoff is required. When handoff is not required, the mobile station returns to step 1211 and continuously communicates with the base station A. Otherwise, when handoff is required, the mobile station proceeds to step 1215 to send a handoff request to the base station A. The base station A then sends a handoff confirm message to the mobile station in response to the handoff request in step 1217.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1219.

Thereafter, upon entering the soft handoff state, the base station A transmits a signal in the non-TSTD mode of operation in step 1221 and at the same time, the base station B also transmits the same signal in the non-TSTD mode of operation in step 1223. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1225, and the base station A then sends an acknowledge message in response to the request message and releases the channel in step 1227. At the same time, the mobile station also discontinues receiving a signal from the base station A. After completion of the soft handoff, the mobile station communicates with the base station B in the non-TSTD mode of operation in step 1229.

Meanwhile, the mobile station requests the base station B to send a signal in the TSTD mode of operation in step 1231, and the base station B then sends a confirm message to the mobile station and operates in the TSTD mode in step 1233. Upon receipt of the confirm message, the mobile station switches the operation mode from the non-TSTD mode to the TSTD mode and communicates with the base station B in the micro-TSTD mode of operation in step 1235.

I. Eighth Embodiment

Figure 13A:
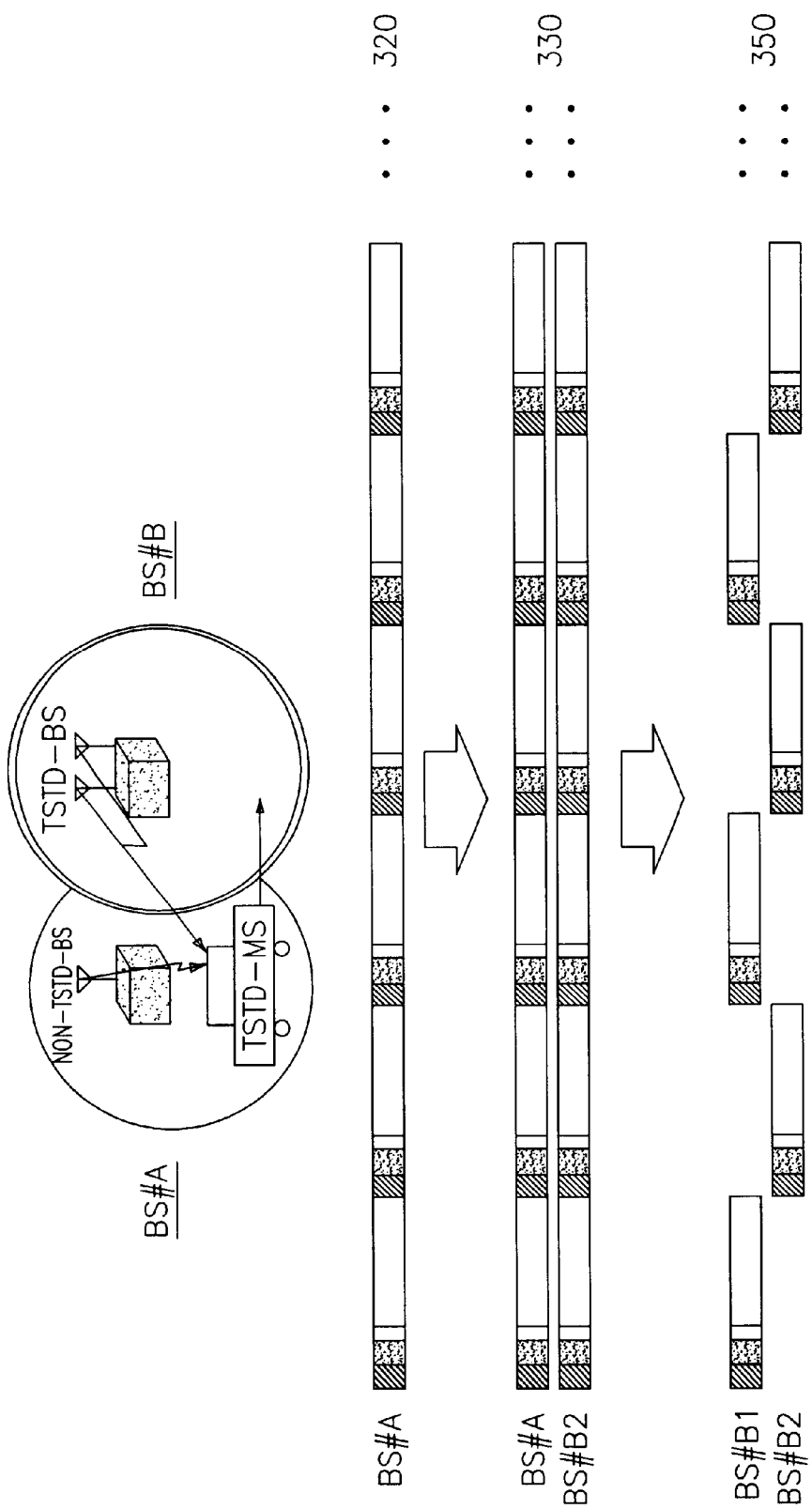
FIGS. 13A and 13B are diagrams illustrating a soft handoff procedure when a TSTD mobile station travels from a non-TSTD base station to a TSTD base station in a mobile communication system according to an eighth embodiment of the present invention.
Figure 13B:
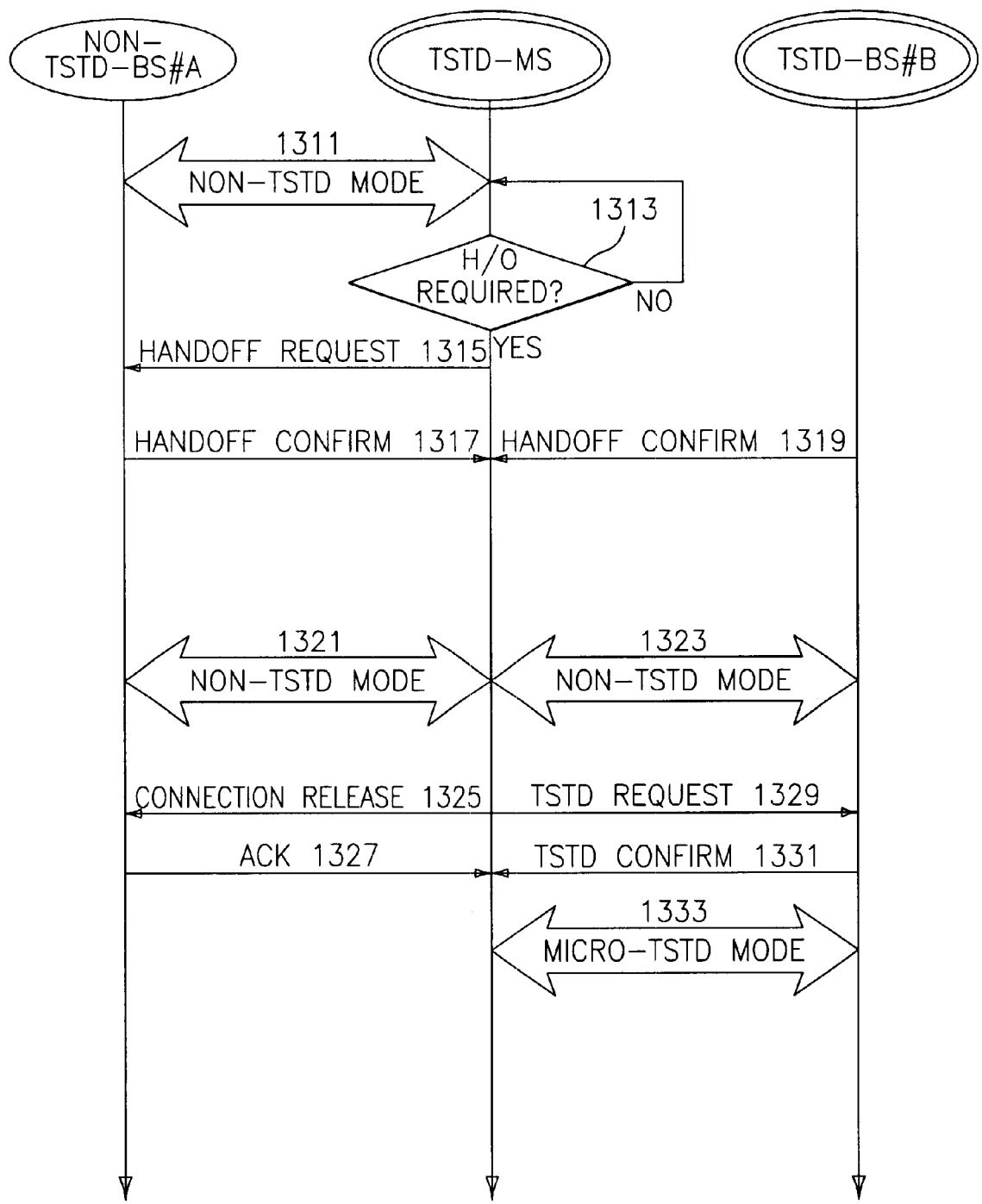

FIGS. 13A and 13B are diagrams illustrating a soft handoff method according to an eighth embodiment of the present invention. Referring to FIG. 13A, a signal exchange occurring when a TSTD mobile station travels from a non-TSTD base station A (BS#A) to an adjacent TSTD base station B (BS#B). Immediately before the soft handoff, the base station A operates in the non-TSTD mode (320). During the soft handoff, the base stations A and B simultaneously transmit the same data in the non-TSTD mode of operation. The mobile station then assigns the fingers to the transmission paths from the respective base stations to receive the transmitted data (330). In this embodiment, two fingers are assigned all together.

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B operates in the TSTD mode and the mobile station also operates in the TSTD mode to receive data from the base station B (350).

FIG. 13B illustrates a flow diagram of control signals and traffic signals between the base stations and the mobile station during the handoff process of FIG. 13A. In step 1311, the non-TSTD base station A and the TSTD mobile station communicate with each other in the non-TSTD mode of operation. During the communication, the mobile station examines in step 1313 whether a receiving strength of a signal from the base station A is lower than a threshold to determine whether handoff is required. When handoff is not required, the mobile station returns to step 1311 and continuously communicates with the base station A. Otherwise, when handoff is required, the mobile station proceeds to step 1315 to send a handoff request to the base station A. The base station A then sends a handoff confirm message to the mobile station in response to the handoff request in step 1317.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1319.

Thereafter, upon entering the soft handoff state, the base station A transmits a signal in the non-TSTD mode of operation in step 1321 and at the same time, the base station B also transmits the same signal in the non-TSTD mode of operation in step 1323. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1325, and the base station A then sends an acknowledge message in response to the request message and releases the channel in step 1327. At the same time, the mobile station also discontinues receiving a signal from the base station A.

In addition, at the instant of sending the channel release request message, the mobile station requests the base station B to transmit a signal in the TSTD mode of operation in step 1329, and the base station B then sends a confirm message in response to the request and operates in the TSTD mode in step 1331. Upon receipt of the confirm message, the mobile station switches the receiving mode from the non-TSTD mode to the TSTD mode and communicates with the base station B in the micro-TSTD mode of operation in step 1333.

J. Ninth Embodiment

Figure 14A:
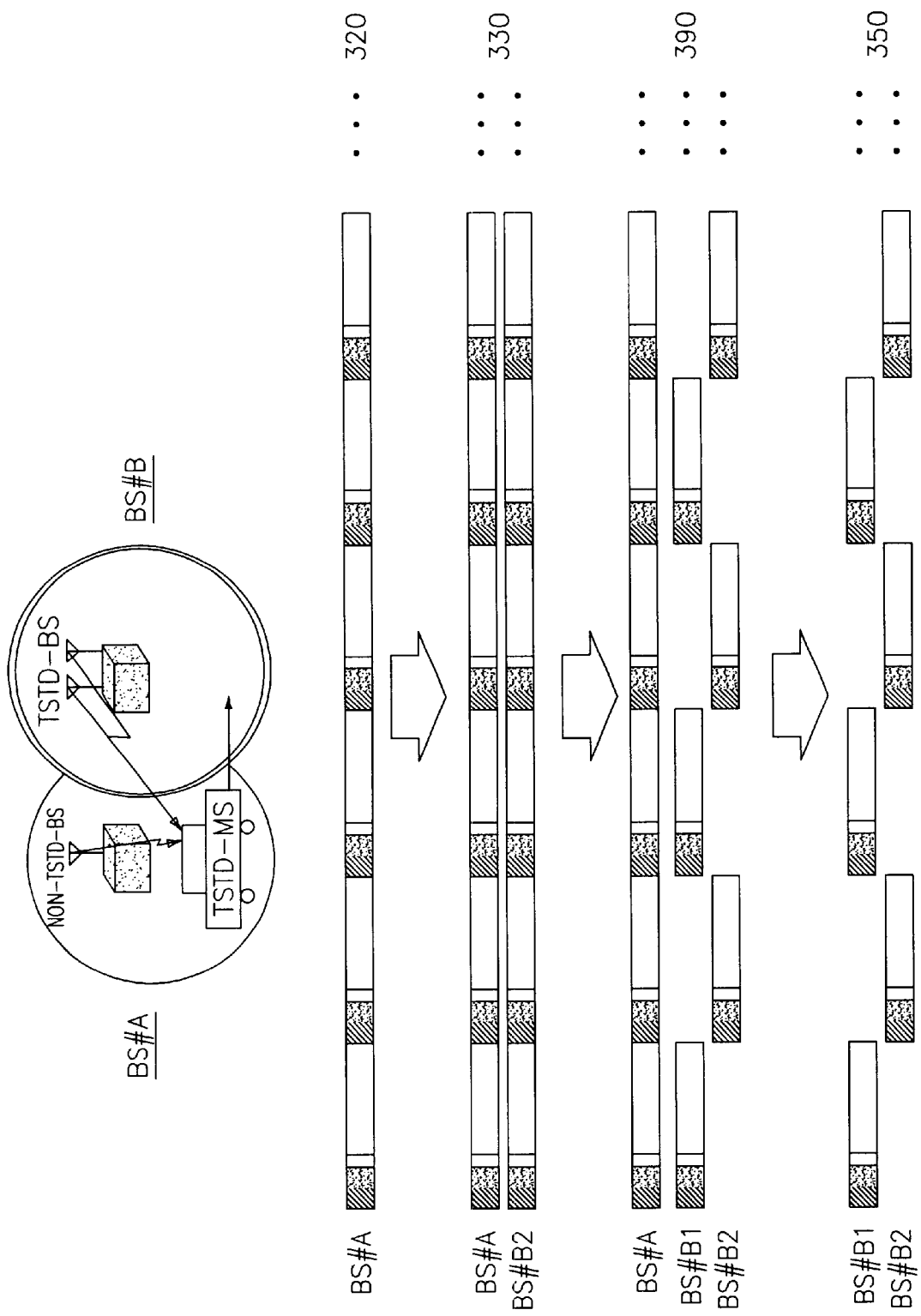
FIGS. 14A and 14B are diagrams illustrating a soft handoff procedure when a TSTD mobile station travels from a non-TSTD base station to a TSTD base station in a mobile communication system according to a ninth eighth embodiment of the present invention.
Figure 14B:
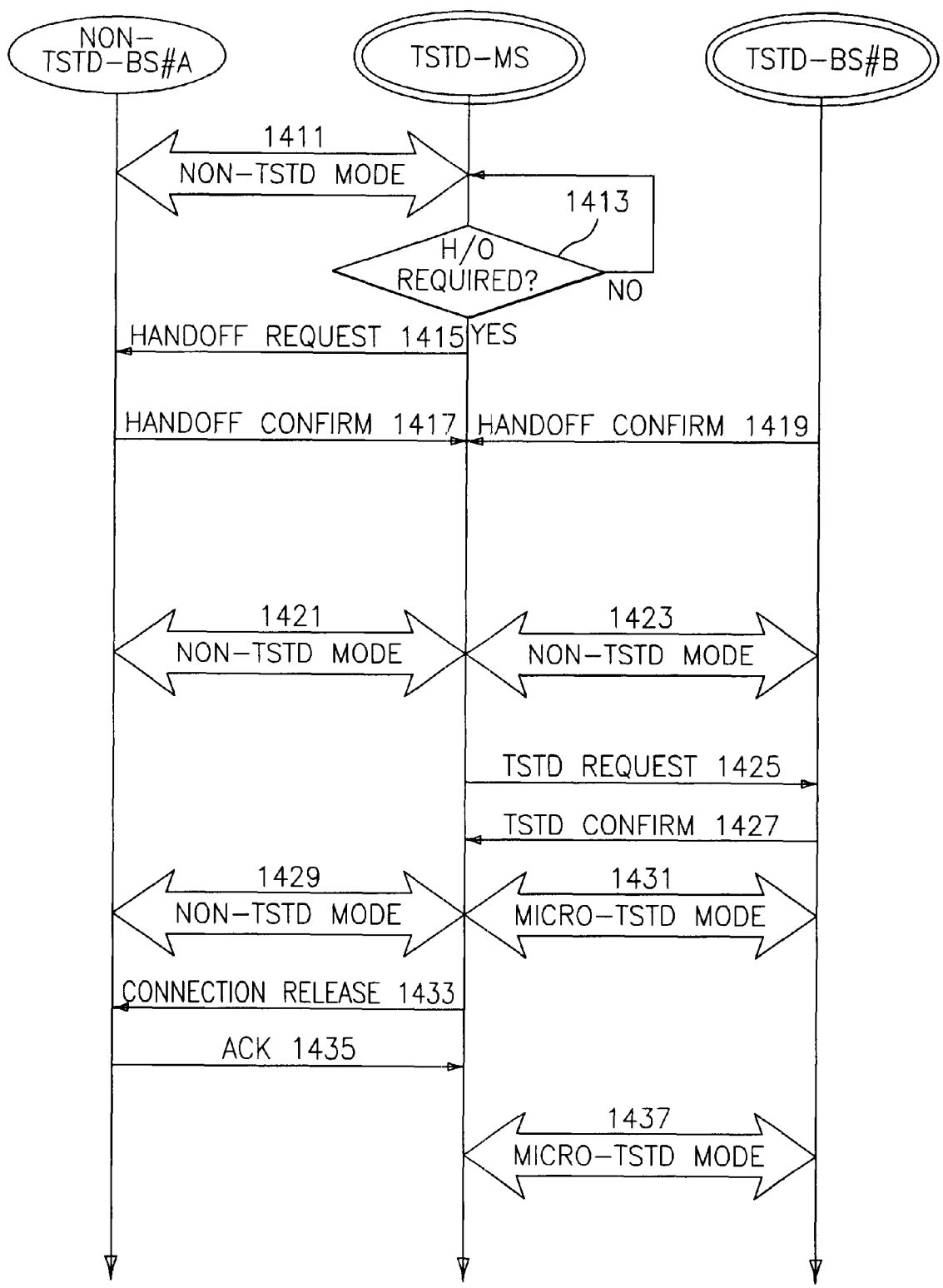

FIGS. 14A and 14B are diagrams illustrating a soft handoff method according to a ninth embodiment of the present invention. Referring to FIG. 14A, a signal exchange occurring when a TSTD mobile station travels from a non-TSTD base station A (BS#A) to an adjacent TSTD base station B (BS#B). Immediately before the soft handoff, the base station A operates in the non-TSTD mode (320). Prior to entering the handoff procedure, the base stations A and B simultaneously transmit the same data in the non-TSTD mode and the mobile station assigns the fingers to the transmission paths from the respective base stations to receive the transmitted data (330).

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas.

During the soft handoff, the base station A continuously transmits a signal in the non-TSTD mode of operation and the base station B transmit the same data in the TSTD mode of operation. The mobile station then assigns the fingers to the transmission paths from the respective base stations to receive the transmitted data (390). In this embodiment, three fingers are assigned all together. After completion of the soft handoff, the base station B operates in the TSTD mode and the mobile station also operates in the TSTD mode to receive data from the base station B (350).

FIG. 14B illustrates a flow diagram of control signals and traffic signals between the base stations and the mobile station during the handoff process of FIG. 14A. In step 1411, the non-TSTD base station A and the TSTD mobile station communicate with each other in the non-TSTD mode of operation. During the communication, the mobile station examines in step 1413 whether a receiving strength of a signal from the base station A is lower than a threshold to determine whether handoff is required. When handoff is not required, the mobile station returns to step 1411 and continuously communicates with the base station A. Otherwise, when handoff is required, the mobile station proceeds to step 1415 to send a handoff request to the base station A. The base station A then sends a handoff confirm message to the mobile station in response to the handoff request in step 1417.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1419.

Thereafter, when handoff is approved, the base stations A and B both transmit the same signal in the non-TSTD mode in steps 1421 and 1423, and the mobile station assigns the fingers to the paths from the respective base stations to receive the transmitted signals. Subsequently, the mobile station request the base station B to transmit a signal in the TSTD mode of operation in step 1425, and the base station B sends a confirm message in response to the request and operates in the TSTD mode in 1427.

Thereafter, upon entering the soft handoff state, the base station A sends a signal in the non-TSTD mode of operation in step 1429 and at the same time, the base station B sends the same signal in the micro-TSTD mode of operation in step 1431. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1433, and the base station A then sends an acknowledge message in response to the request message and releases the channel in step 1435. At the same time, the mobile station also discontinues receiving a signal from the base station A. Thereafter, the mobile station communicates with the base station B in the micro-TSTD mode of operation in step 1437.

K. Tenth Embodiment

Figure 15A:
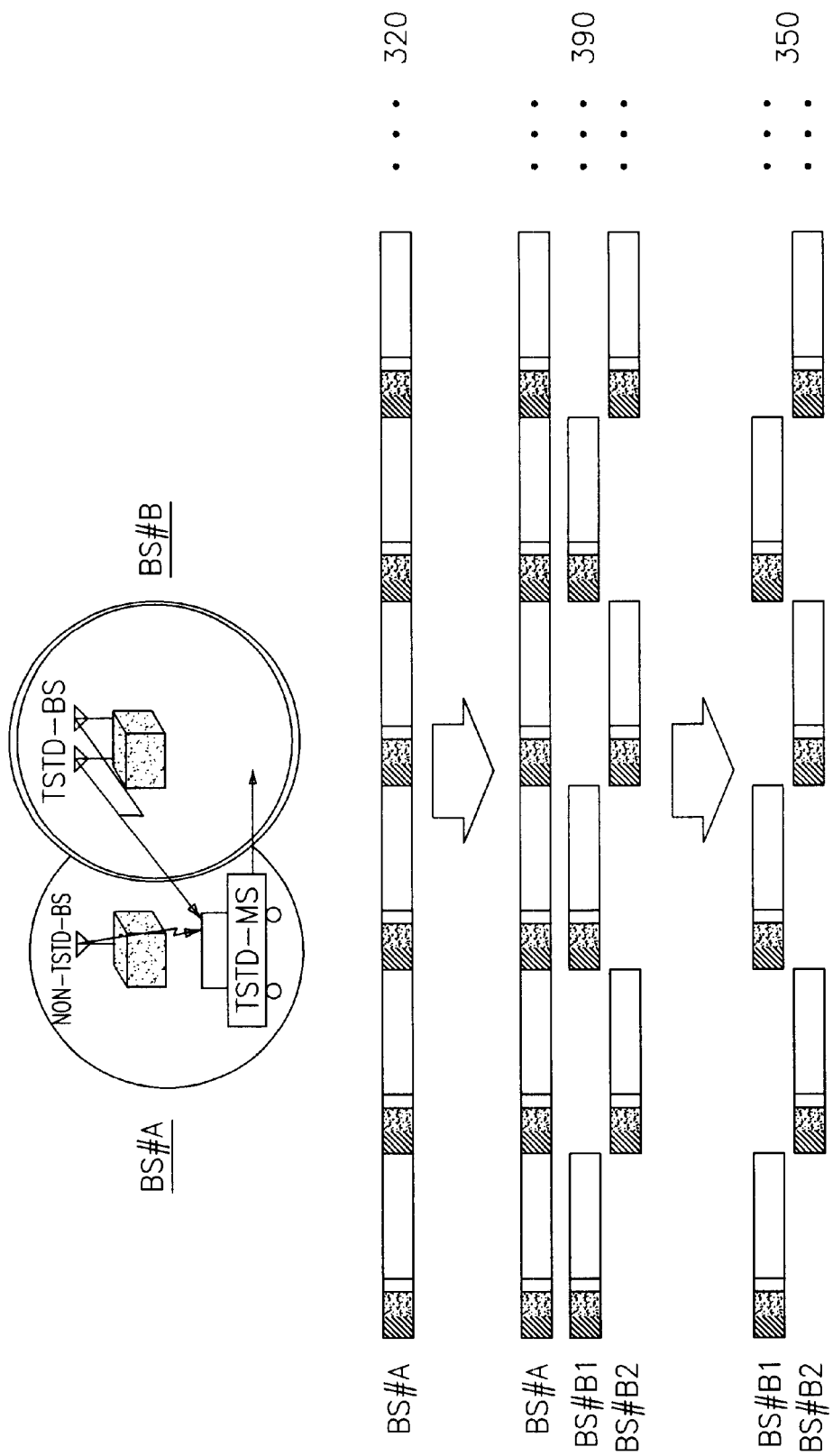
FIGS. 15A and 15B are diagrams illustrating a soft handoff procedure when a TSTD mobile station travels from a non-TSTD base station to a TSTD base station in a mobile communication system according to a tenth embodiment of the present invention.
Figure 15B:
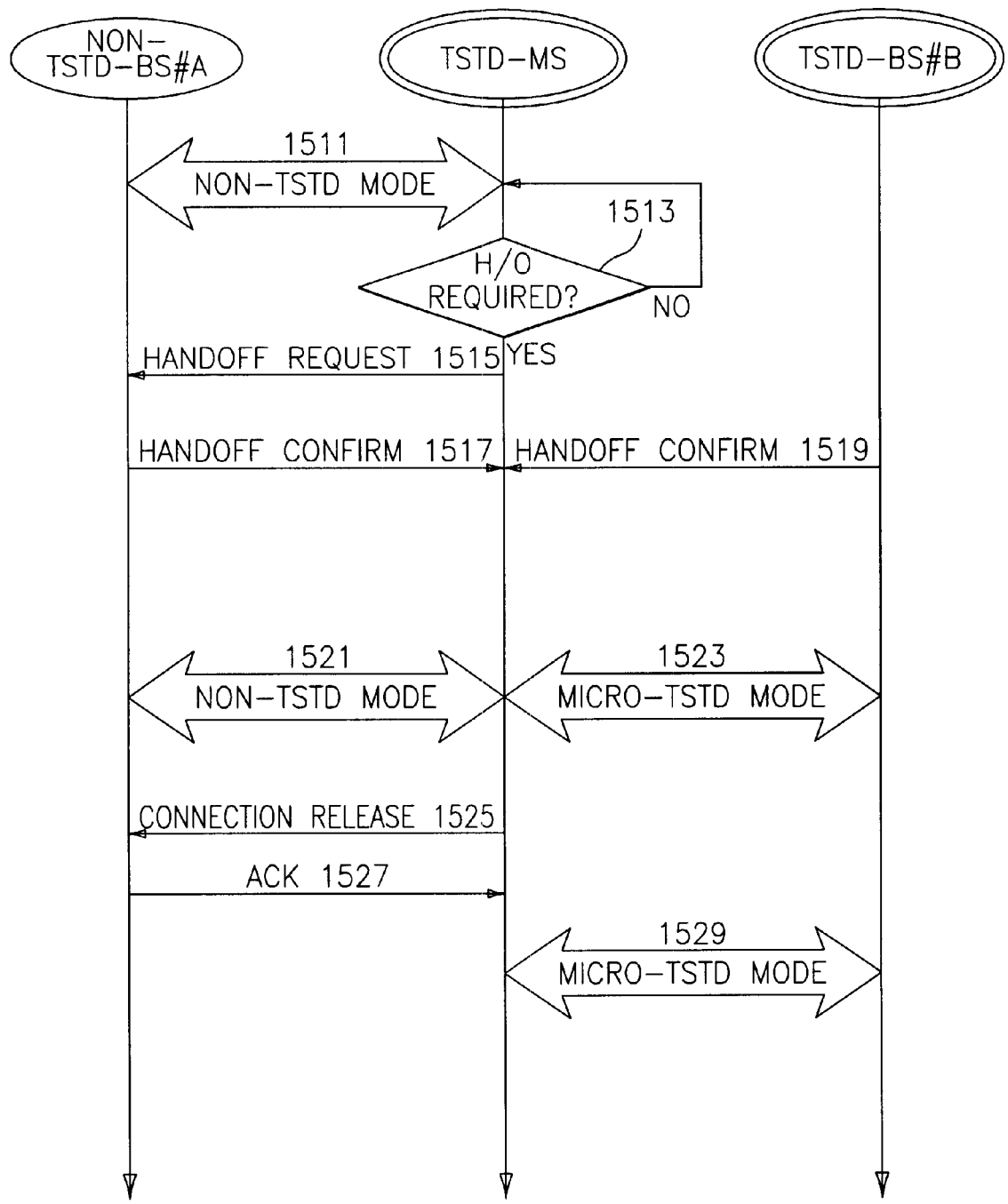

FIGS. 15A and 15B are diagrams illustrating a soft handoff method according to a tenth embodiment of the present invention. Referring to FIG. 15A, a signal exchange occurring when a TSTD mobile station travels from a non-TSTD base station A (BS#A) to an adjacent TSTD base station B (BS#B). Immediately before the soft handoff, the base station A operates in the non-TSTD mode (320). During the soft handoff, the base station A continuously transmits a signal in the non-TSTD mode of operation and the base station B transmits the same data in the TSTD mode of operation. The mobile station then assigns the fingers to the transmission paths from the respective base stations to receive the transmitted data (390). In this embodiment, three fingers are assigned all together. After completion of the soft handoff, the base station B operates in the TSTD mode and the mobile station also operates in the TSTD mode to receive data from the base station B (350).

FIG. 15B illustrates a flow diagram of control signals and traffic signals between the base stations and the mobile station during the handoff process of FIG. 15A. In step 1511, the non-TSTD base station A and the TSTD mobile station communicate with each other in the non-TSTD mode of operation. During the communication, the mobile station examines in step 1513 whether a receiving strength of a signal from the base station A is lower than a threshold to determine whether handoff is required. When handoff is not required, the mobile station returns to step 1511 and continuously communicates with the base station A. Otherwise, when handoff is required, the mobile station proceeds to step 1515 to send a handoff request to the base station A. The base station A then sends a handoff confirm message to the mobile station in response to the handoff request in step 1517.

Here, together with the handoff request, the mobile station sends information about the handoff target base station B and information about a transmission antenna, selected for the non. TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1519.

Thereafter, upon entering the handoff state, the base station A transmits a signal in the non-TSTD mode of operation in steps 1521 and the base station B transmits the same signal in the micro-TSTD mode of operation in step 1523. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1525, and the base station A then sends an acknowledge message in response to i the request message and releases the channel in step 1527. At the same time, the mobile station also discontinues receiving a signal from the base station A. Thereafter, the mobile station communicates with the base station B in the micro-TSTD mode of operation in step 1529.

The tenth embodiment can be applied even to a handoff for a sync channel. Prior to performing the handoff for the sync channel, the mobile station receives a sync channel transmitted in the non-TSTD mode of operation from the base station A. During the handoff, the mobile station receives both a sync channel transmitted in the non-TSTD mode of operation from the base station A and a sync channel transmitted in the TSTD mode of operation from the base station B. After completion of the handoff, the mobile station receives a sync channel transmitted in the TSTD mode of operation from the base station B.

L. Eleventh Embodiment

Figure 16A:
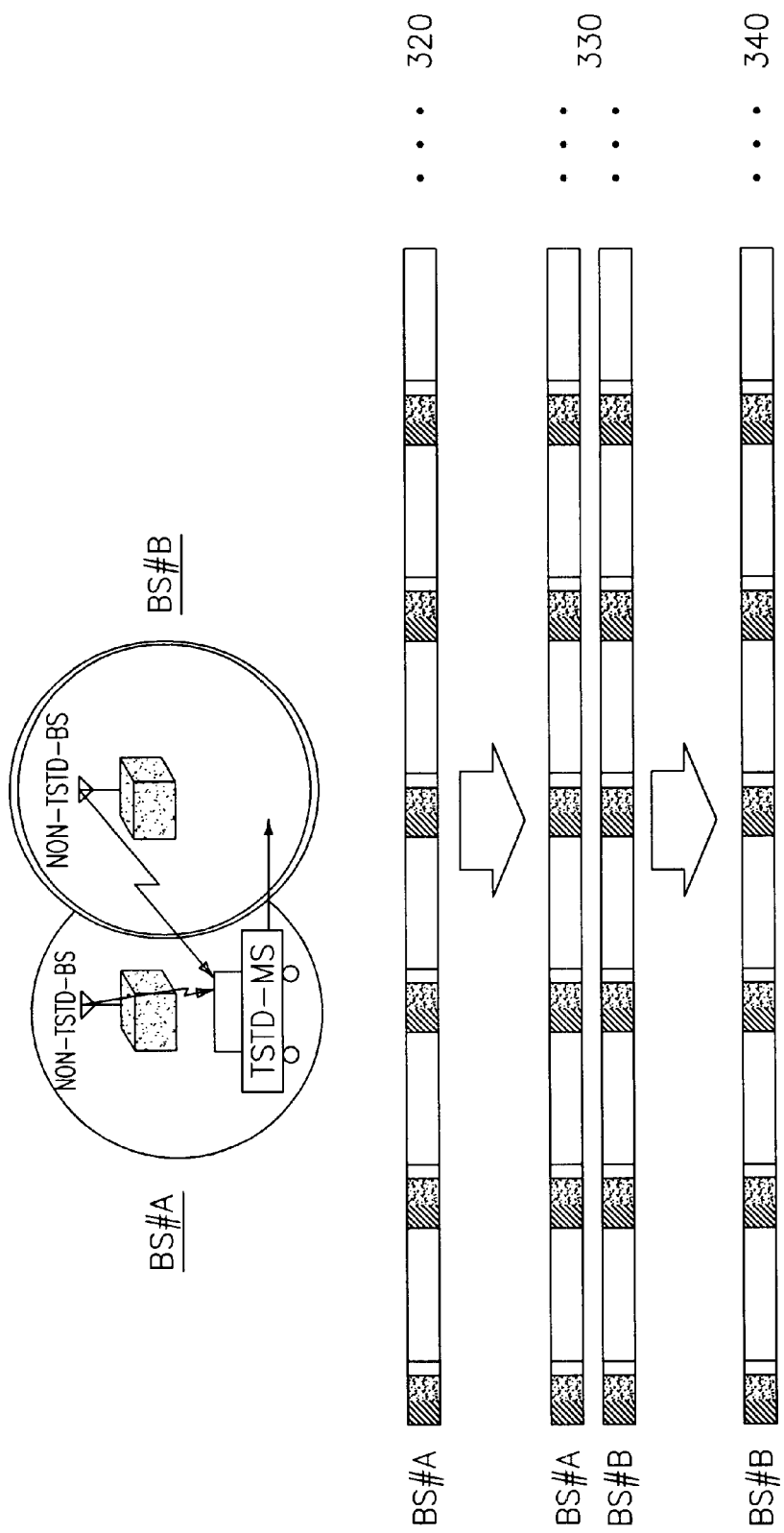
FIGS. 16A and 16B are diagrams illustrating a soft handoff procedure between a TSTD mobile station and two non-TSTD base stations in a mobile communication system according to an eleventh embodiment of the present invention.
Figure 16B:
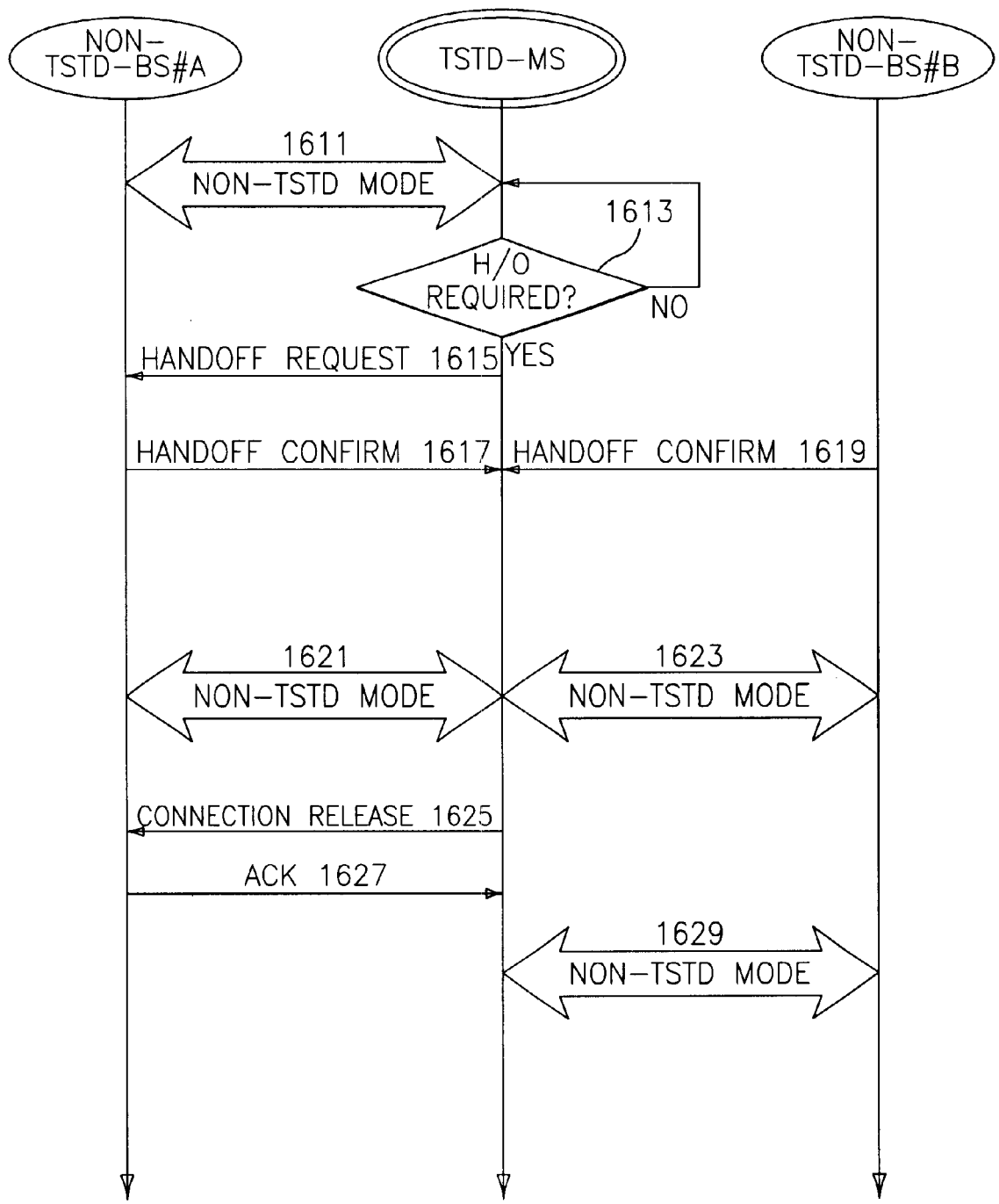

FIGS. 16A and 16B are diagrams illustrating a soft handoff method according to an eleventh embodiment of the present invention. Referring to FIG. 16A, a signal exchange occurring when a TSTD mobile station travels from a non-TSTD base station A (BS#A) to an adjacent non-TSTD base station B (BS#B). Immediately before the soft handoff, the base station A operates in the non-TSTD mode (320). During the soft handoff, the base stations A and B simultaneously transmit the same data in the non-TSTD mode of operation. The mobile station then assigns the fingers to the transmission paths from the respective base stations to receive the transmitted data (330). In this embodiment, two fingers are assigned all together. After completion of the soft handoff, the base station B operates in the non-TSTD mode and the mobile station also operates in the non-TSTD mode to receive data from the base station B (340).

FIG. 16B illustrates a flow diagram of control signals and traffic signals between the base stations and the mobile station during the handoff process of FIG. 16A. In step 1611, the non-TSTD base station A and the TSTD mobile station communicate with each other in the non-TSTD mode of operation. During the communication, the mobile station examines in step 1613 whether a receiving strength of a signal from the base station A is lower than a threshold to determine whether handoff is required. When handoff is not required, the mobile station returns to step 1611 and continuously communicates with the base station A. Otherwise, when handoff is required, the mobile station proceeds to step 1615 to send a handoff request to the base station A. The base station A then sends a handoff confirm message to the mobile station in response to the handoff request in step 1617.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1619.

Thereafter, upon entering the handoff state, the base station A transmits a signal in the non-TSTD mode of operation in steps 1621 and at the same time, the base station B also transmits the same signal in the TSTD mode of operation in step 1623. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1625, and the base station A then sends an acknowledge message in response to the request message and releases the channel in step 1627. At the same time, the mobile station also discontinues receiving a signal from the base station A. Thereafter, the mobile station communicates with the base station B in the non-TSTD mode of operation in step 1629.

M. Twelfth Embodiment

Figure 17A:
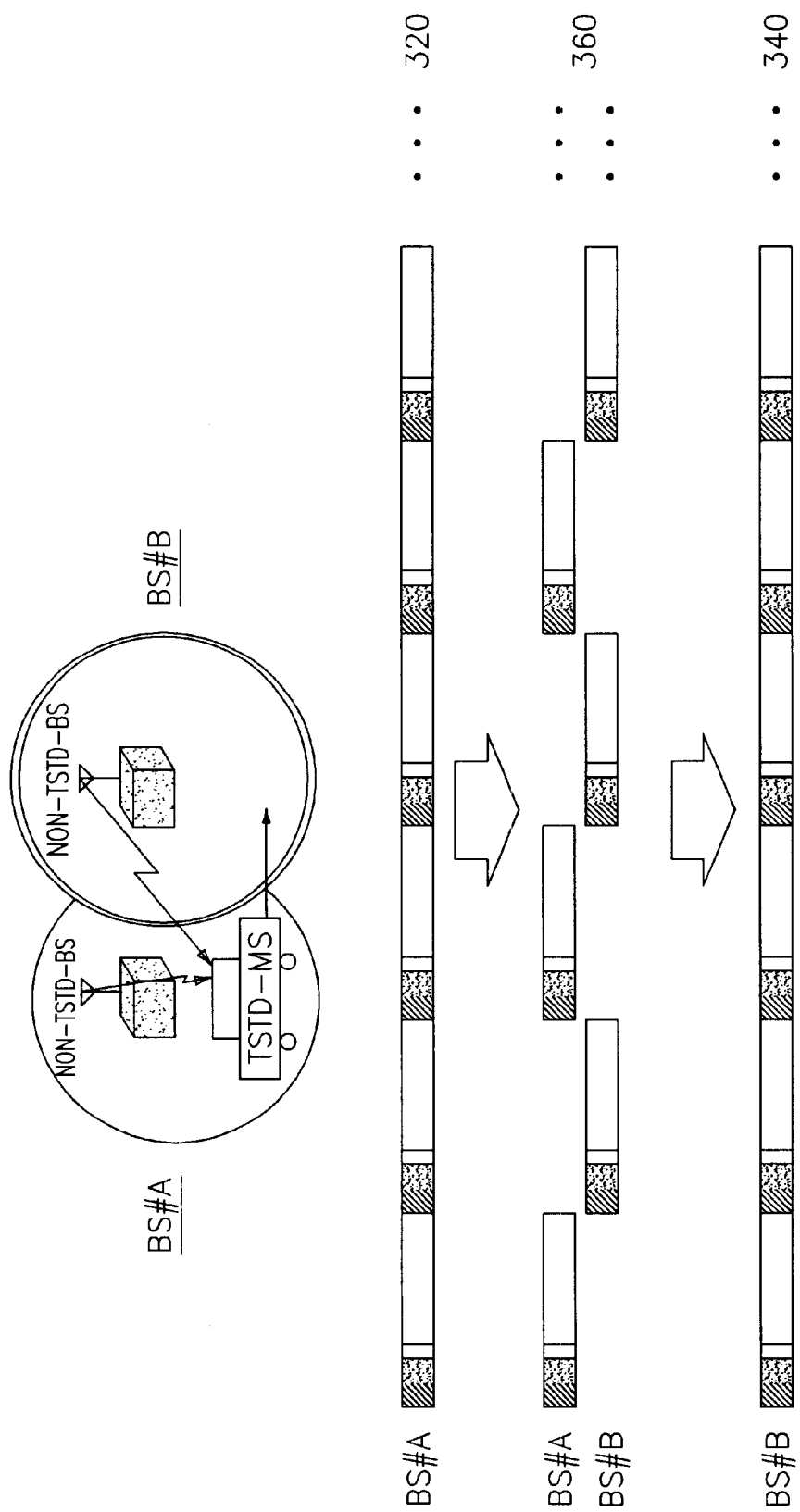
FIGS. 17A and 17B are diagrams illustrating a soft handoff procedure between a TSTD mobile station and two non-TSTD base stations in a mobile communication system according to a twelfth embodiment of the present invention.
Figure 17B:
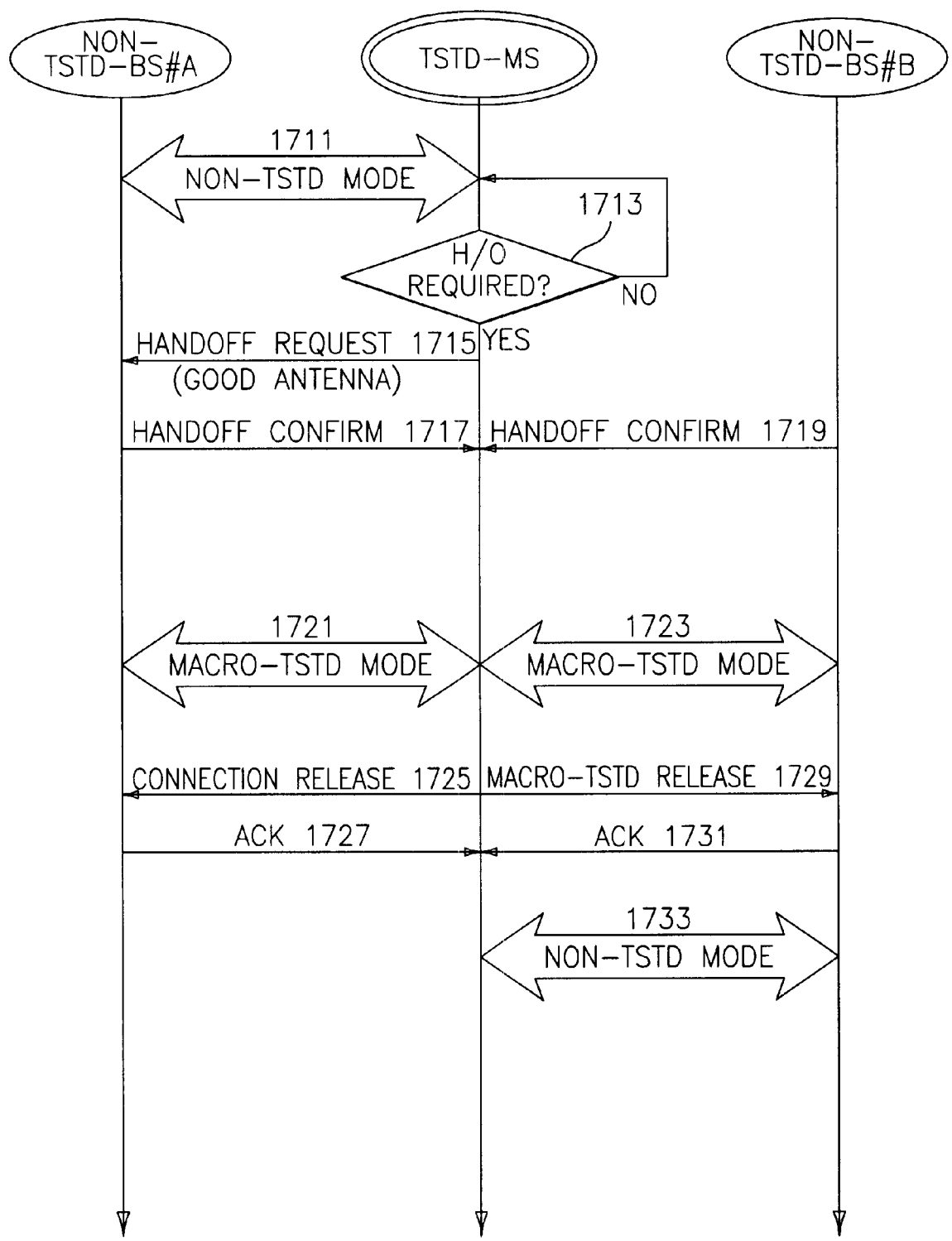

FIGS. 17A and 17B are diagrams illustrating a soft handoff method according to a twelfth embodiment of the present invention. Referring to FIG. 17A, a signal exchange occurring when a TSTD mobile station travels from a non-TSTD base station A (BS#A) to an adjacent non-TSTD base station B (BS#B). Immediately before the soft handoff, the base station A operates in the non-TSTD mode (320). During the soft handoff, the base stations A and B alternately transmit the same data in the macro-TSTD mode of operation via selected transmission antennas thereof and the mobile station then assigns the fingers to the transmission paths from the respective base stations to receive the transmitted data (360). In this embodiment, two fingers are assigned all together. After completion of the soft handoff, the base station B operates in the non-TSTD mode and the mobile station also operates in the non-TSTD mode to receive data from the base station B (340).

FIG. 17B illustrates a flow diagram of control signals and traffic signals between the base stations and the mobile station during the handoff process of FIG. 17A. In step 1711, the non-TSTD base station A and the TSTD mobile station communicate with each other in the non-TSTD mode of operation. During the communication, the mobile station examines in step 1713 whether a receiving strength of a signal from the base station A is lower than a threshold to determine whether handoff is required. When handoff is not required, the mobile station returns to step 1711 and continuously communicates with the base station A. Otherwise, when handoff is required, the mobile station proceeds to step 1715 to send a handoff request to the base station A. The base station A then sends a handoff confirm message to the mobile station in response to the handoff request in step 1717.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1719.

Thereafter, upon entering the handoff state, the base station A transmits a signal in the macro-TSTD mode of operation in steps 1721 and at the same time, the base station B also transmits the same signal in the macro-TSTD mode of operation in step 1723. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1725, and the base station A then sends an acknowledge message in response to the request message and releases the channel in step 1727. At the same time, the mobile station also discontinues receiving a signal from the base station A. At the instant of sending the channel release request message, the mobile station sends a macro-TSTD mode release request to the base station B in step 1729, and the base station B then sends an acknowledge message in response to the request in step 1731. Thereafter, the mobile station communicates with the base station B in the non-TSTD mode of operation in step 1733.

N. Thirteenth Embodiment

Figure 18A:
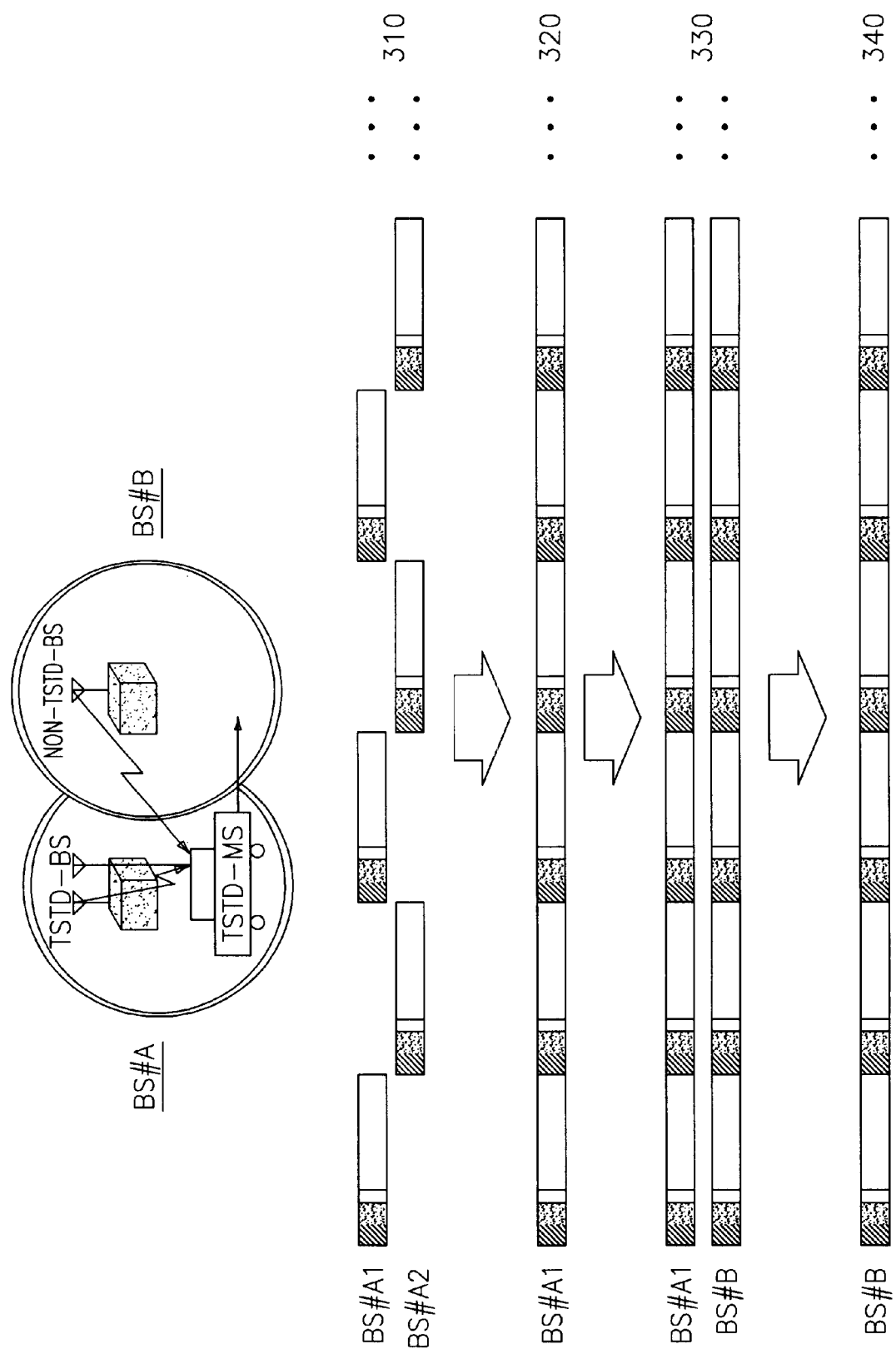
FIGS. 18A and 18B are diagrams illustrating a soft handoff procedure when a TSTD mobile station travels from a TSTD base station to a non-TSTD base station in a mobile communication system according to a thirteenth embodiment of the present invention.
Figure 18B:
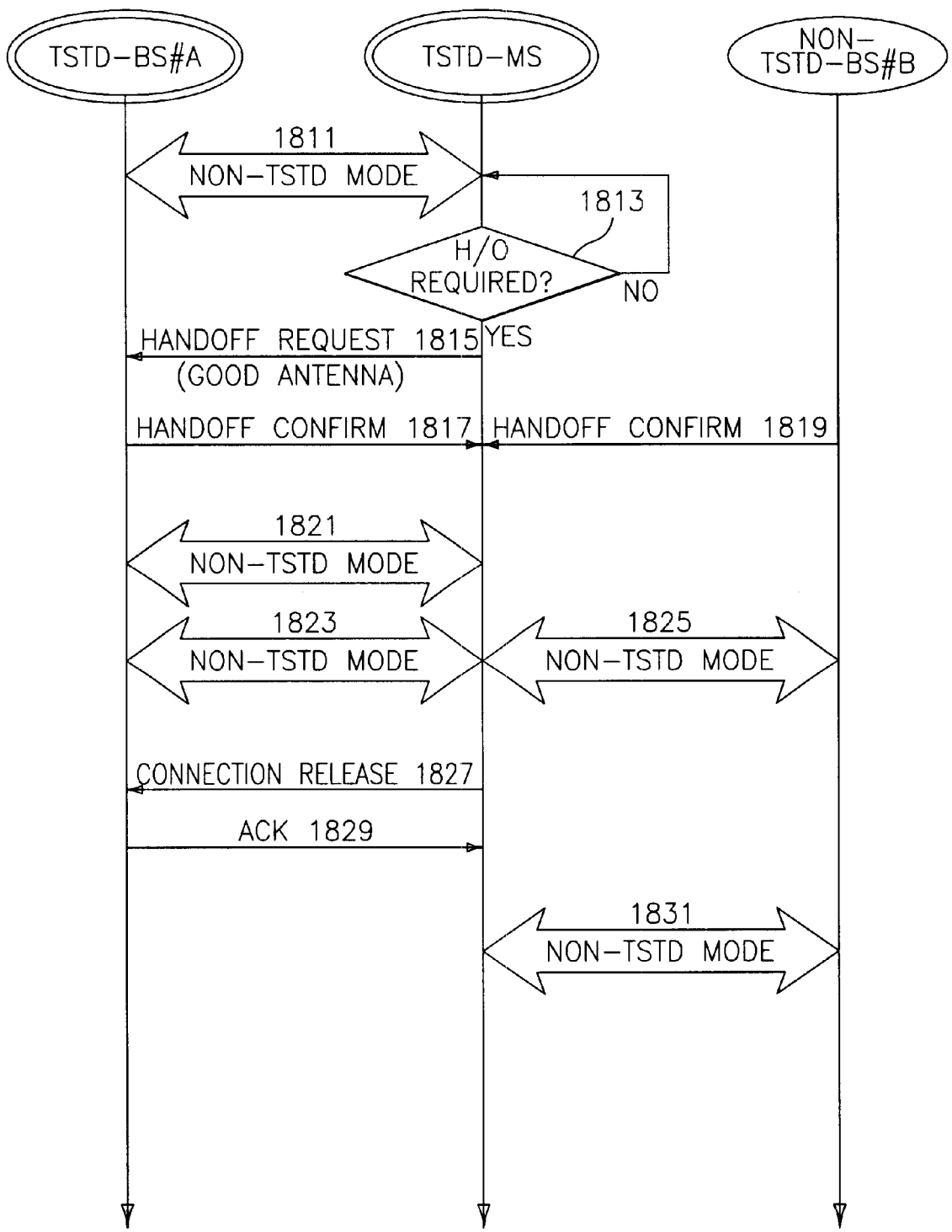

FIGS. 18A and 18B are diagrams illustrating a soft handoff method according to a thirteenth embodiment of the present invention. Referring to FIG. 1 8A, a signal exchange occurring when a TSTD mobile station travels from a TSTD base station A (BS#A) to an adjacent non-TSTD base station B (BS#B). Immediately before the soft handoff, the base station A operates in the TSTD mode by altering the transmission antennas (310). Prior to entering the handoff procedure, the base station A switches the operation mode from the TSTD mode to the non-TSTD mode to transmit a signal through only a selected antenna, and the mobile station receives the transmitted signal (320). In the non-TSTD mode, the base station selects one of the transmission antennas to transmit a signal according to an antenna select message that the mobile station has transmitted based on a quality of a received signal.

During the soft handoff, the base stations A and B simultaneously transmit the same data in the non-TSTD mode of operation. The mobile station assigns the fingers to the transmission paths from the respective base stations to receive the transmitted data (330). In this embodiment, two fingers are assigned all together. After completion of the soft handoff, the base station B operates in the non-TSTD mode and the mobile station also operates in the non-TSTD mode to receive data from the base station B (340).

FIG. 18B illustrates a flow diagram of control signals and traffic signals between the base stations and the mobile station during the handoff process of FIG. 18A. In step 1811, the TSTD base station A and the TSTD mobile station communicate with each other in the micro-TSTD mode of operation. During the communication, the mobile station examines in step 1813 whether a receiving strength of a signal from the base station A is lower than a threshold to determine whether handoff is required. When handoff is not required, the mobile station returns to step 1811 and continuously communicates with the base station A. Otherwise, when handoff is required, the mobile station proceeds to step 1815 to send a handoff request to the base station A. The base station A then sends a handoff confirm message to the mobile station in response to the handoff request in step 1817.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1819. When handoff is approved, the base station A transmits a signal in the non-TSTD mode of operation in step 1821 and the mobile station receives the signal transmitted form the base station A in the non-TSTD mode of operation.

Thereafter, upon entering the soft handoff state, the base station A transmits a signal in the non-TSTD mode of operation in step 1823 and at the same time, the base station B also transmits the same signal in the non-TSTD mode of operation in step 1825. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1827, and the base station A then sends an acknowledge message in response to the request message and releases the channel in step 1829. At the same time, the mobile station also discontinues receiving a signal from the base station A. Thereafter, the mobile station communicates with the base station B in the non-TSTD mode of operation in step 1831.

O. Fourteenth Embodiment

Figure 19A:
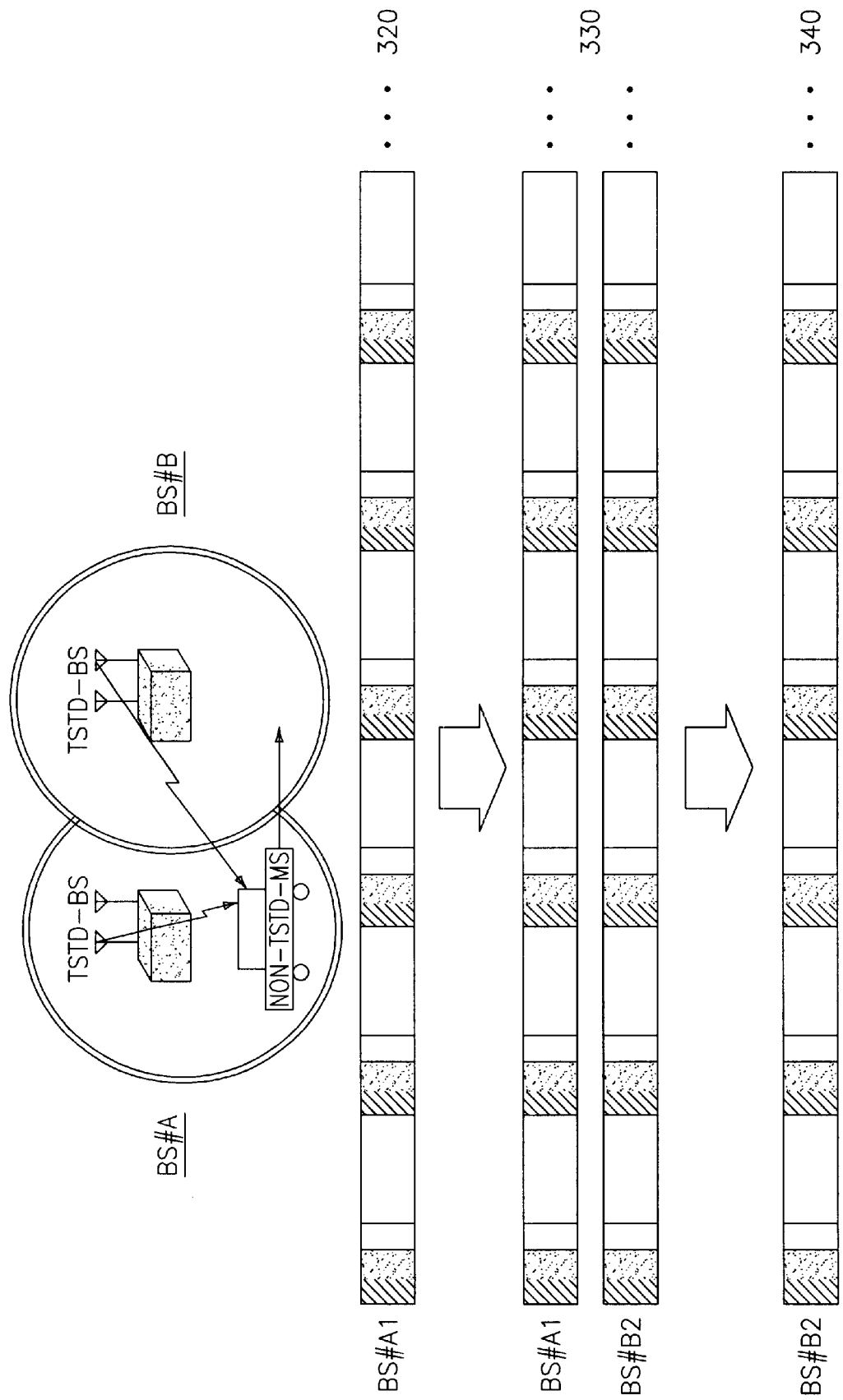
FIGS. 19A and 19B are diagrams illustrating a soft handoff procedure between a non-TSTD mobile station and two TSTD base stations in a mobile communication system according to a fourteenth embodiment of the present invention.
Figure 19B:
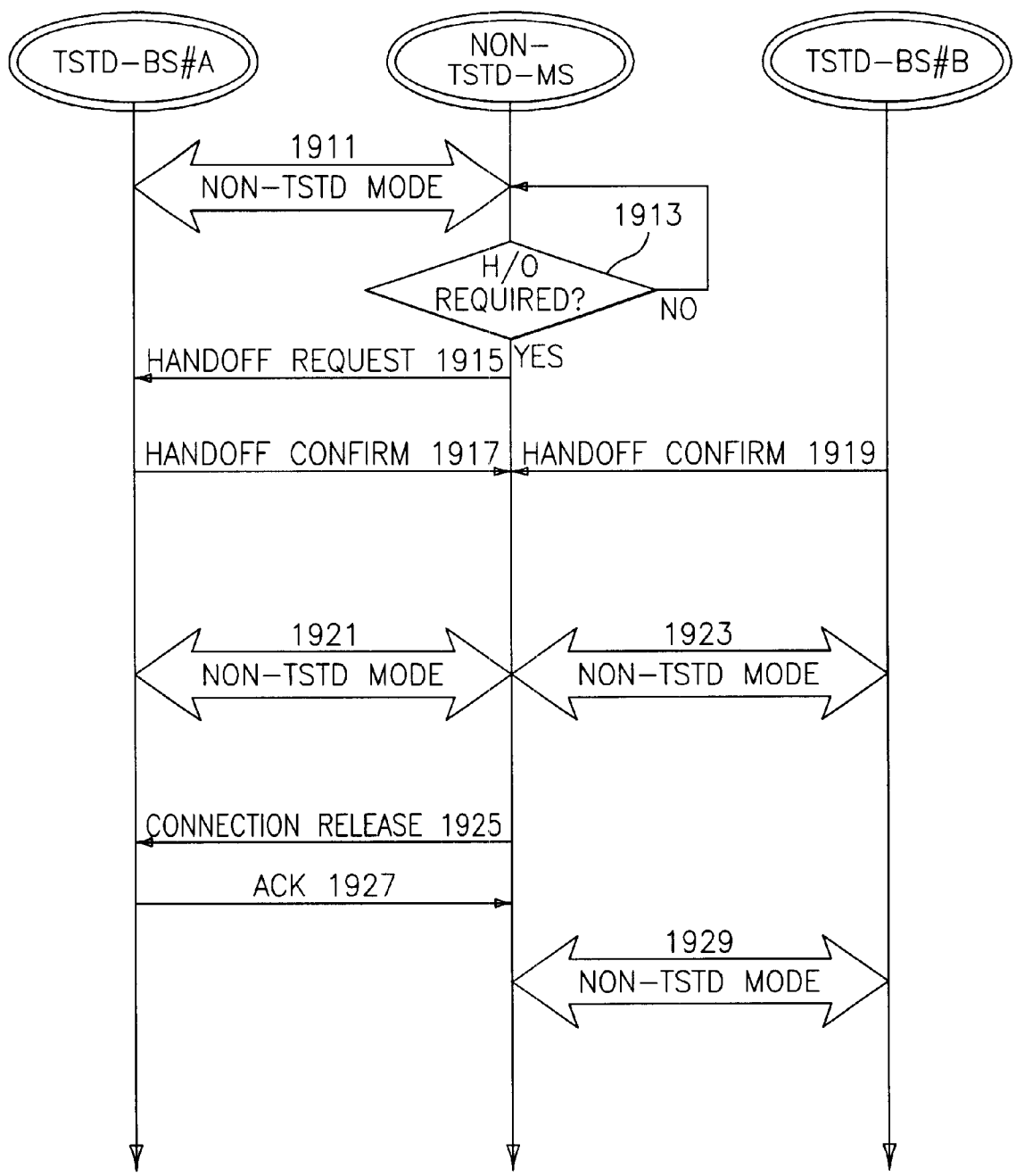

FIGS. 19A and 19B are diagrams illustrating a soft handoff method according to a fourteenth embodiment of the present invention. Referring to FIG. 19A, a signal exchange occurring when a non-TSTD mobile station travels from a TSTD base station A (BS#A) to an adjacent TSTD base station B (BS#B). Immediately before the soft handoff, the base station A transmits a signal via only one selected antenna in the non-TSTD mode of operation, and the mobile station receives the transmitted signal (320). During the soft handoff, the base stations A and B simultaneously transmit the same data in the non-TSTD mode of operation. The mobile station assigns the fingers to the transmission paths from the respective base stations to receive the transmitted data (330). In this embodiment, two fingers are assigned all together. After completion of the soft handoff, the base station B operates in the non-TSTD mode and the mobile station also operates in the non-TSTD mode to receive data from the base station B (340).

FIG. 19B illustrates a flow diagram of control signals and traffic signals between the base stations and the mobile station during the handoff process of FIG. 19A. In step 1911, the TSTD base station A and the non-TSTD mobile station communicate with each other in the non-TSTD mode of operation. During the communication, the mobile station examines in step 1913 whether a receiving strength of a signal from the base station A is lower than a threshold to determine whether handoff is required. When handoff is not required, the mobile station returns to step 1911 and continuously communicates with the base station A. Otherwise, when handoff is required, the mobile station proceeds to step 1915 to send a handoff request to the base station A. The base station A then sends a handoff confirm message to the mobile station in response to the handoff request in step 1917.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 1919.

Thereafter, upon entering the soft handoff state, the base station A transmits a signal in the non-TSTD mode of operation in step 1921 and at the same time, the base station B also transmits the same signal in the non-TSTD mode of operation in step 1923. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 1925, and the base station A then sends an acknowledge message in response to the request message and releases the channel in step 1927. At the same time, the mobile station also a discontinues receiving a signal from the base station A. Thereafter, the mobile station communicates with the base station B in the non-TSTD mode of operation in step 1929.

P. Fifteenth Embodiment

Figure 20A:
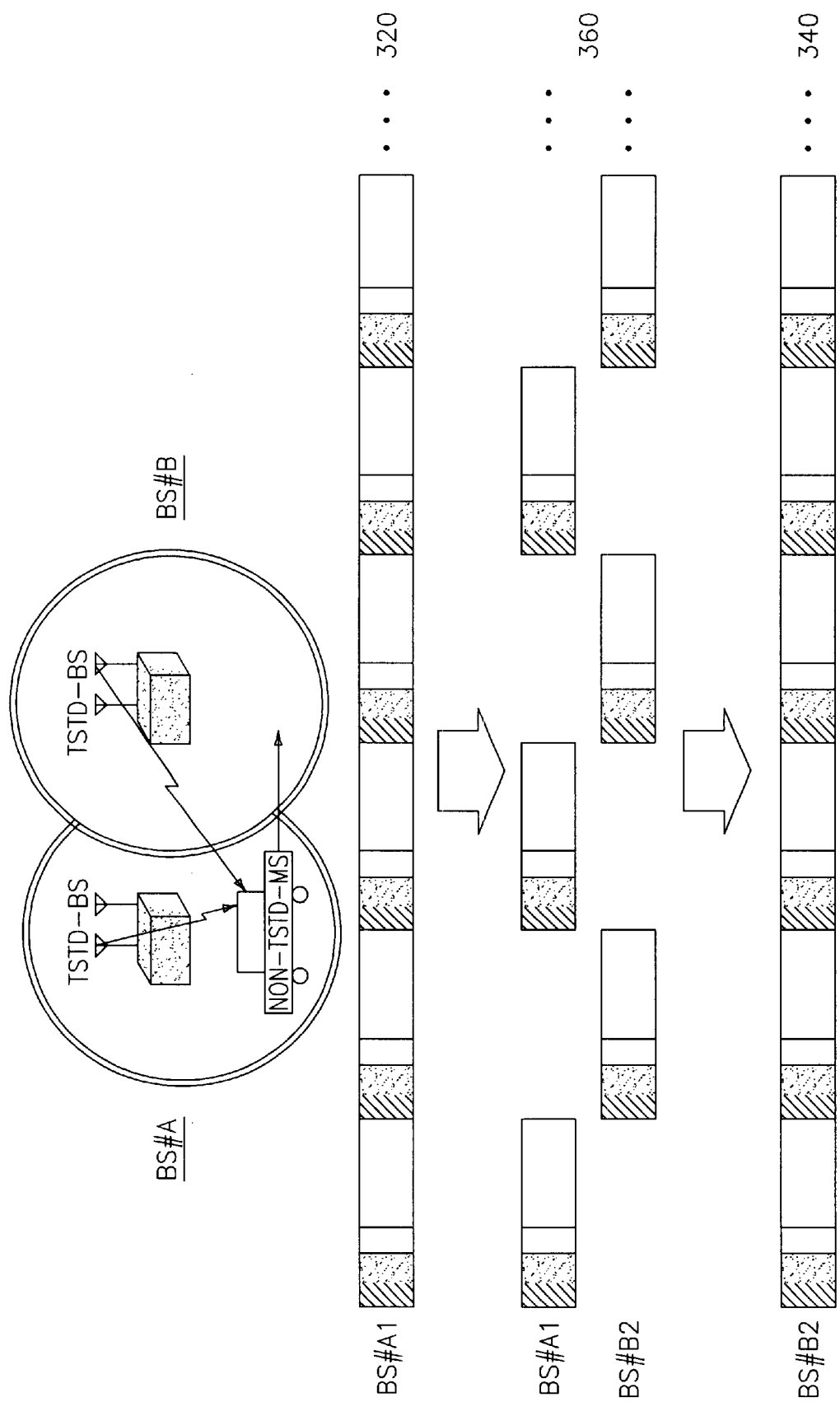
FIGS. 20A and 20B are diagrams illustrating a soft handoff procedure between a non-TSTD mobile station and two TSTD base stations in a mobile communication system according to a fifteenth embodiment of the present invention.
Figure 20B:
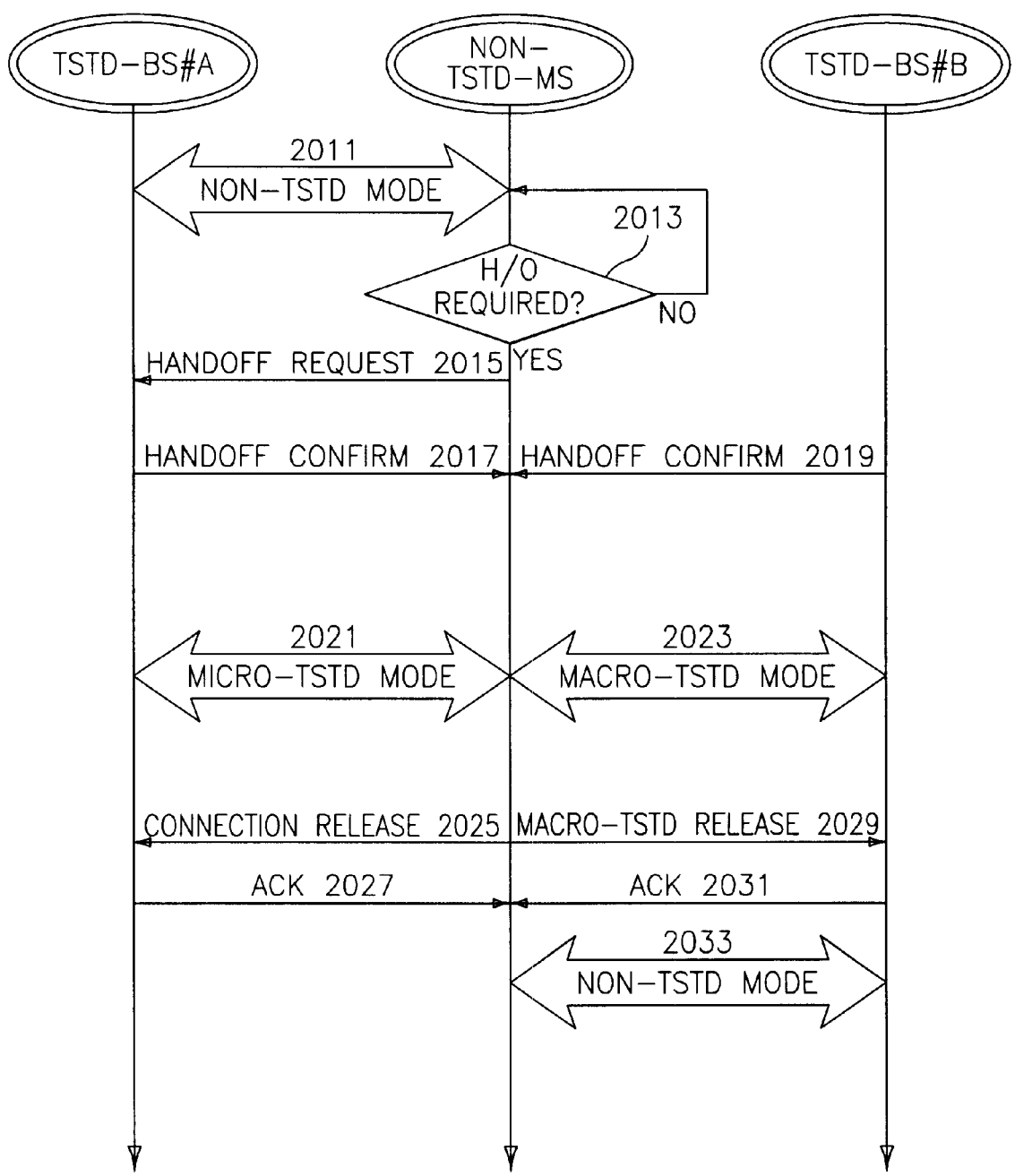

FIGS. 20A and 20B are diagrams illustrating a soft handoff method according to a fifteenth embodiment of the present invention. Referring to FIG. 20A, a signal exchange occurring when a nor-TSTD mobile station travels from a TSTD base station A (BS#A) to an adjacent TSTD base station B (BS#B). Immediately before the soft handoff, the base station A transmits a signal in the non-TSTD mode of operation, and the mobile station receives the transmitted signal (320). During the soft handoff, the base stations A and B alternately transmit the same data via selected antennas thereof in the macro-TSTD mode of operation, and the mobile station assigns the fingers to the transmission paths from the respective base stations to receive the transmitted data (360). In this embodiment, two fingers are assigned all together.

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B operates in the non-TSTD mode and the mobile station also operates in the non-TSTD mode to receive data from the base station B (340).

FIG. 20B illustrates a flow diagram of control signals and traffic signals between the base stations and the mobile station during the handoff process of FIG. 20A. In step 2011, the TSTD base station A and the non-TSTD mobile station communicate with each other in the non-TSTD mode of operation. During the communication, the mobile station examines in step 2013 whether a receiving strength of a signal from the base station A is lower than a threshold to determine whether handoff is required. When handoff is not required, the mobile station returns to step 2011 and continuously communicates with the base station A. Otherwise, when handoff is required, the mobile station proceeds to step 2015 to send a handoff request to the base station A. The base station A then sends a handoff confirm message to the mobile station in response to the handoff request in step 2017.

Here, together with the handoff request, the mobile station sends information about the handoff target base station. B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2019.

Thereafter, upon entering the soft handoff state, the base station A transmits a signal in the macro-TSTD mode of operation in step 2021 and at the same time, the base station B also transmits the same signal in the macro-TSTD mode of operation in step 2023. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2025, and the base station A then sends an acknowledge message in response to the request message and releases the channel in step 2027. At the instant of sending the channel release request, the mobile station sends a macro-TSTD mode release request to the base station B in step 2029, and the base station B sends an acknowledge message in response to the request in step 2031. Upon receipt of the acknowledge message, the mobile station switches the receiving mode from the macro-TSTD mode to the non-TSTD mode and communicates with the base station B in the non-TSTD mode of operation in step 2033.

Q. Sixteenth Embodiment

Figure 21A:
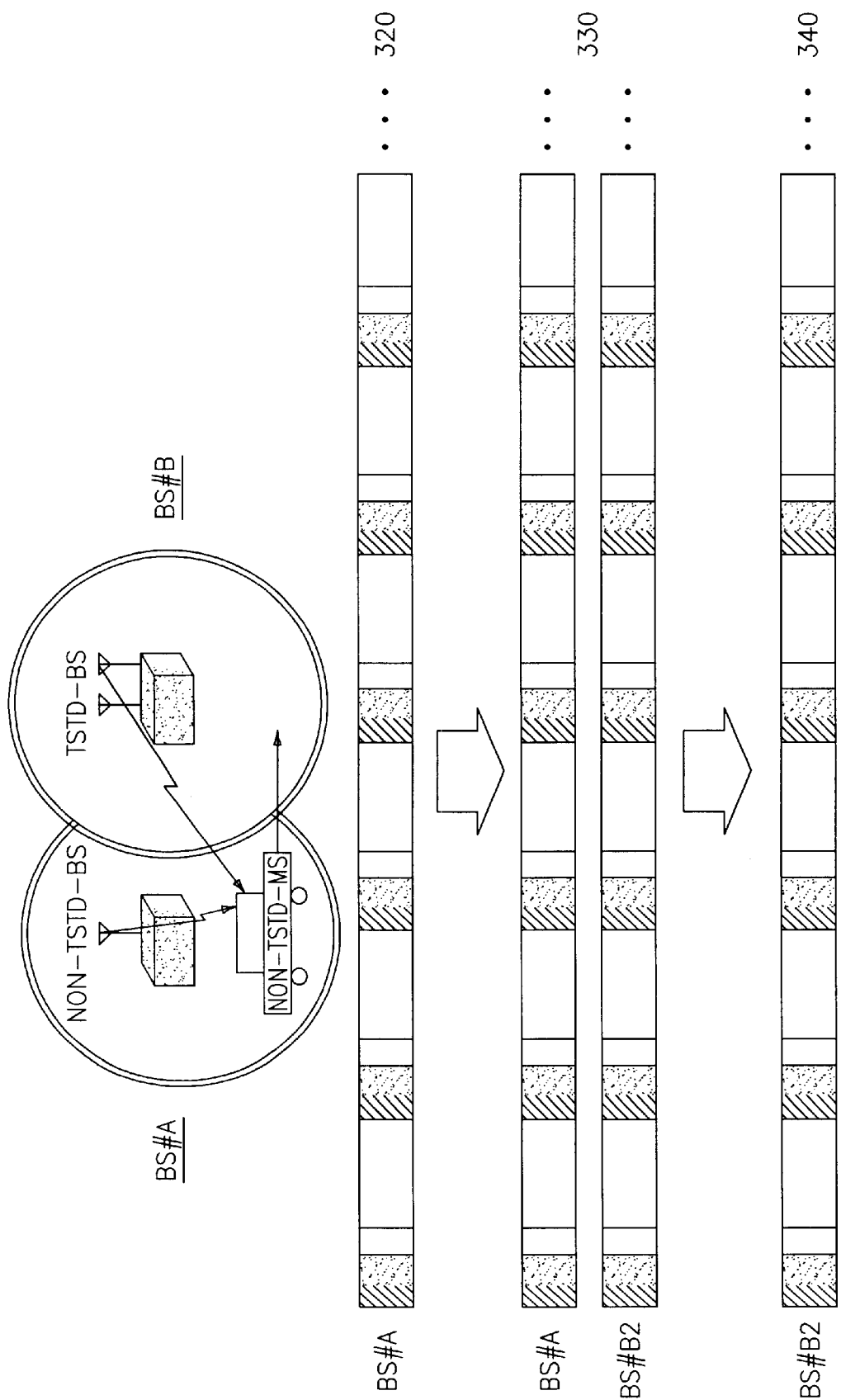
FIGS. 21A and 21B are diagrams illustrating a soft handoff procedure when a non-TSTD mobile station travels from a non-TSTD base station to a TSTD base station in a mobile communication system according to a sixteenth embodiment of the present invention.
Figure 21B:
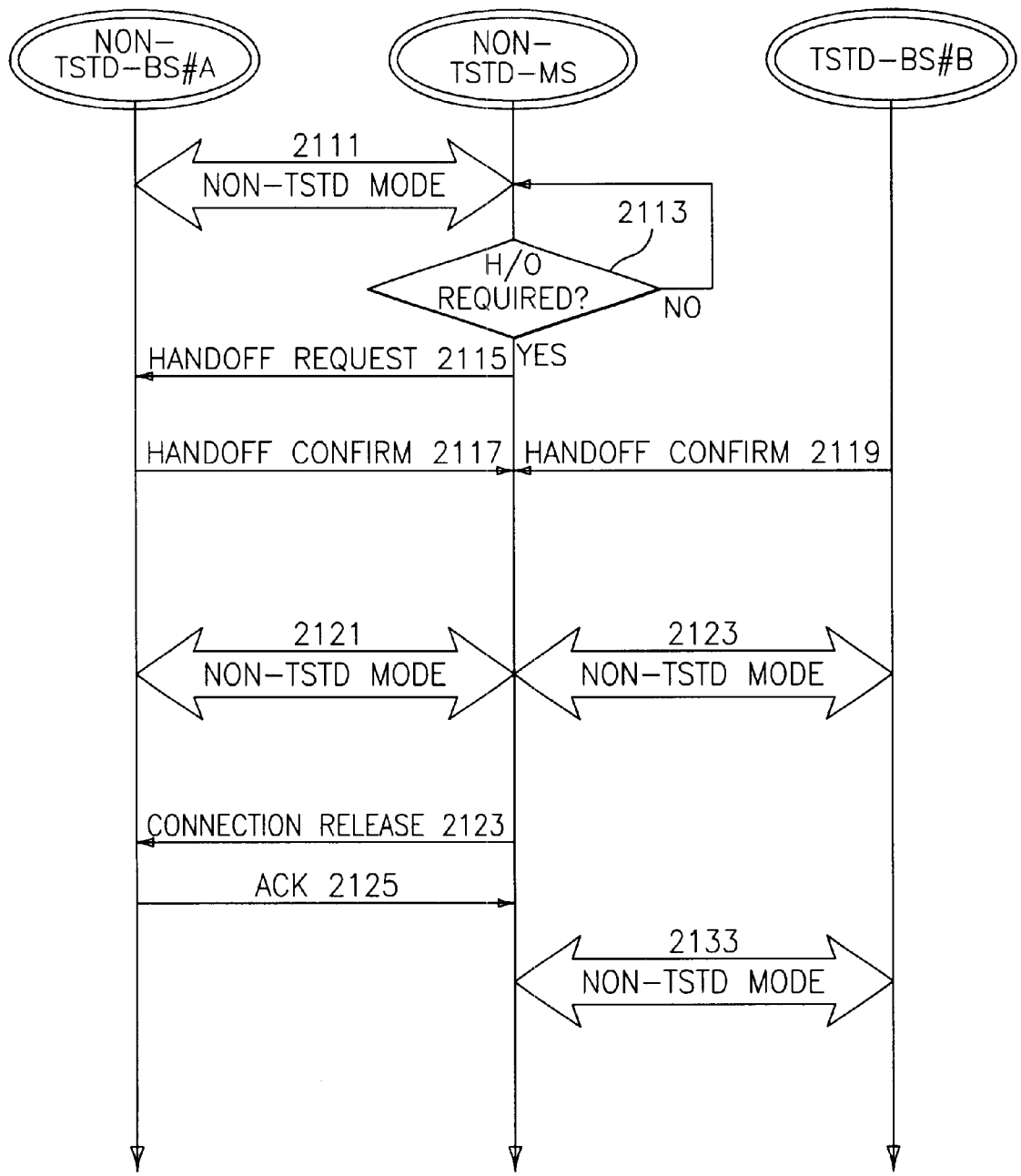

FIGS. 21A and 21B are diagrams illustrating a soft handoff method according to a sixteenth embodiment of the present invention. Referring to FIG. 21A, a signal exchange occurring when a non-TSTD mobile station travels from a non-TSTD base station A (BS#A) to an adjacent TSTD base station B (BS#B). Immediately before the soft handoff, the base station A transmits a signal through one selected transmission antenna in the non-TSTD mode of operation, and the mobile station receives the transmitted signal (320). During the soft handoff, the base stations A and B simultaneously transmit the same data in the non-TSTD mode of operation, and the mobile station assigns the fingers to the transmission paths from the respective base stations to receive the transmitted data (330). In this embodiment, two fingers are assigned all together. After completion of the soft handoff, the base station B operates in the non-TSTD mode of operation. The mobile station also operates in the non-TSTD mode to receive data from the base station B (340).

FIG. 21B illustrates a flow diagram of control signals and traffic signals between the base stations and the mobile station during the handoff process of FIG. 21A. In step 2111, the non-TSTD base station A and the non-TSTD mobile station communicate with each other in the non-TSTD mode of operation. During the communication, the mobile station examines in step 2113 whether a receiving strength of a signal from the base station A is lower than a threshold to determine whether handoff is required. When handoff is not required, the mobile station returns to step 2111 and continuously communicates with the base station A. Otherwise, when handoff is required, the mobile station proceeds to step 2115 to send a handoff request to the base station A. The base station A then sends a handoff confirm message to the mobile station in response to the handoff request in step 2117.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2119.

Thereafter, upon entering the soft handoff state, the base station A transmits a signal in the non-TSTD mode of operation in step 2121 and at the same time, the base station B also transmits the same signal in the non-TSTD mode of operation in step 2123. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2123, and the base station A then sends an acknowledge message in response to the request message and releases the channel in step 2125. At the same time, the mobile station also discontinues receiving a signal from the base station A. Thereafter, the mobile station communicates with the base station B in the non-TSTD mode of operation in step 2127.

R. Seventeenth Embodiment

Figure 22A:
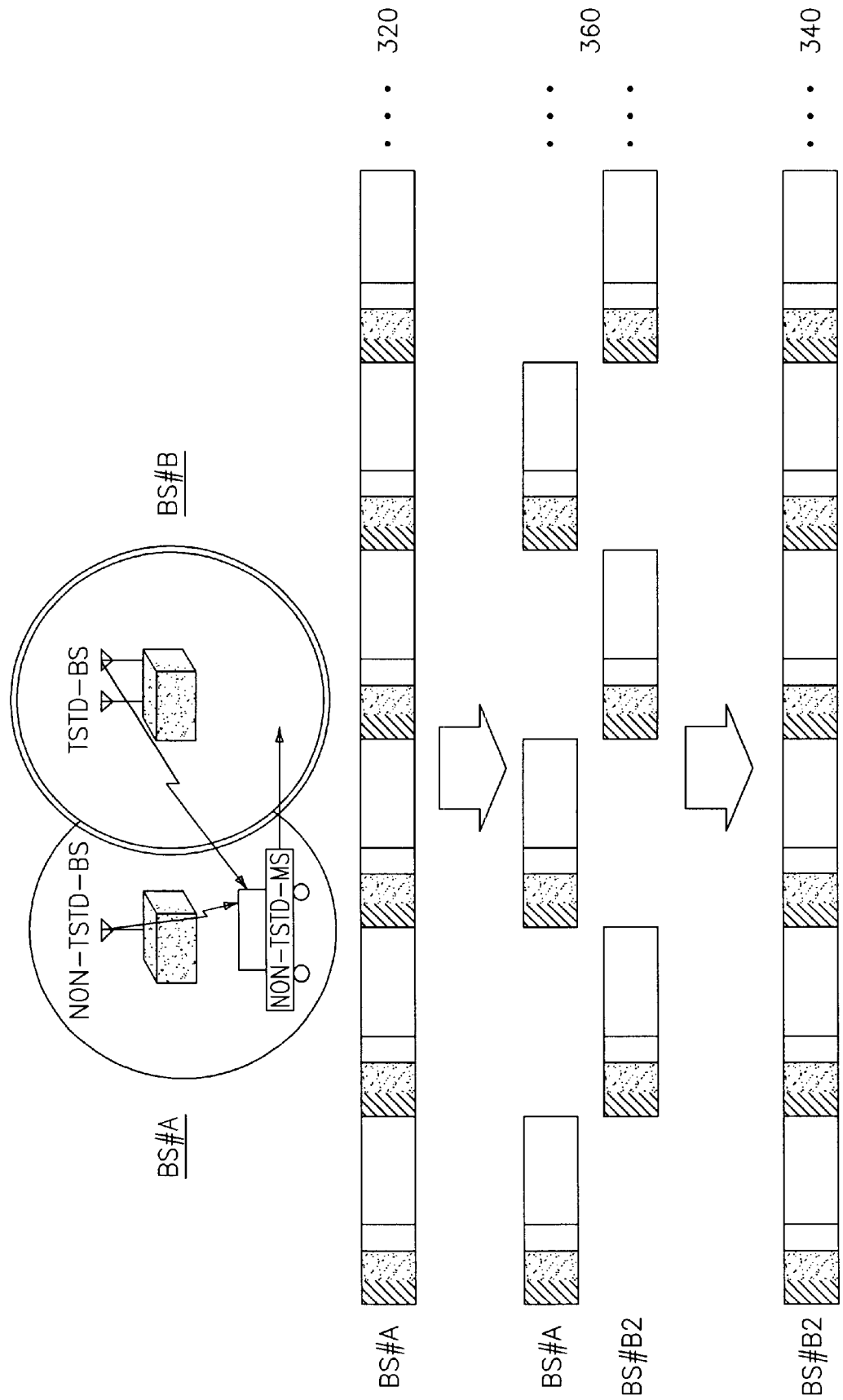
FIGS. 22A and 22B are diagrams illustrating a soft handoff procedure when a non-TSTD mobile station travels from a non-TSTD base station to a TSTD base station in a mobile communication system according to a seventeenth embodiment of the present invention.
Figure 22B:
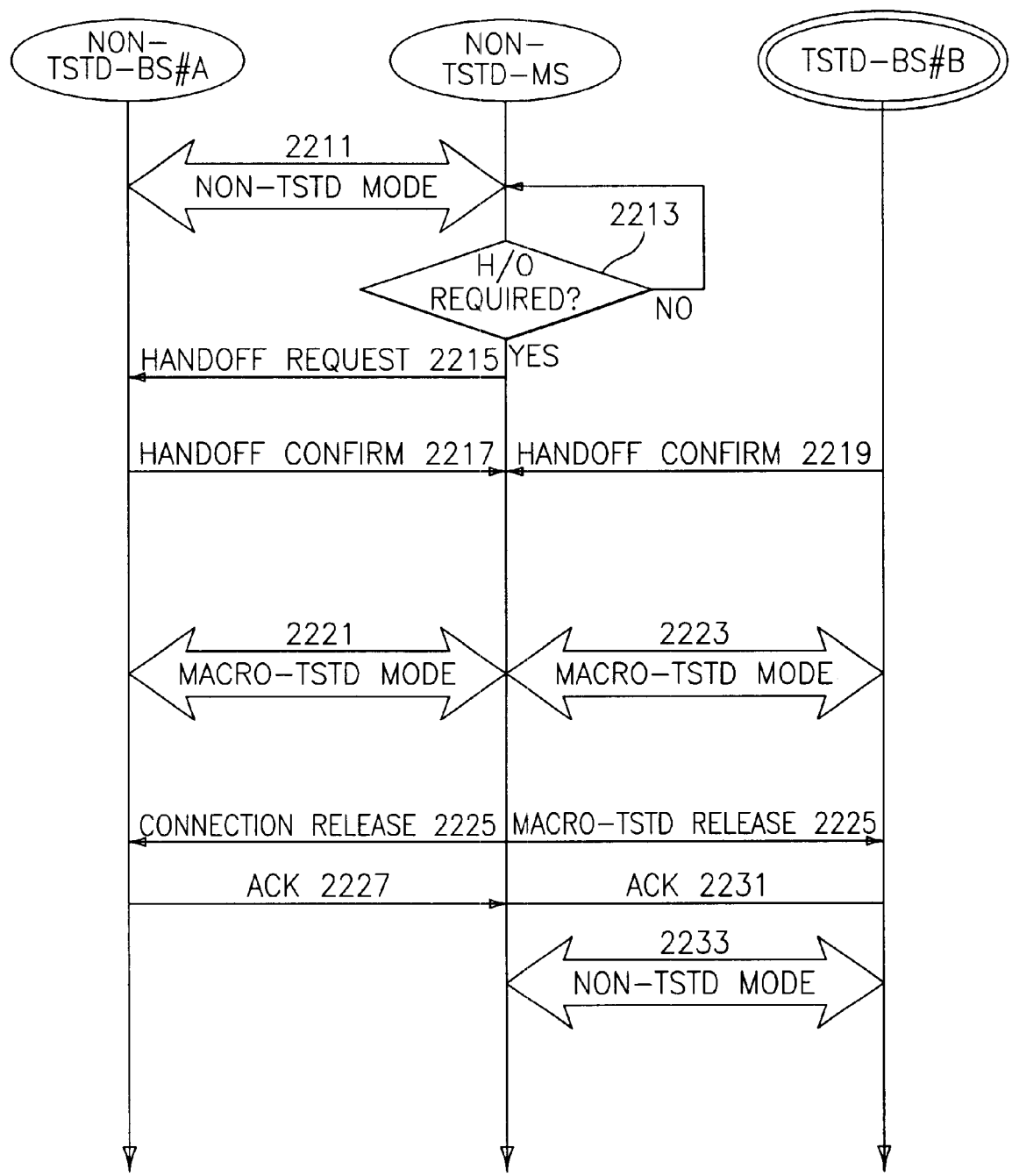

FIGS. 22A and 22B are diagrams illustrating a soft handoff method according to a seventeenth embodiment of the present invention. Referring to FIG. 22A, a signal exchange occurring when a non-TSTD mobile station travels from a non-TSTD base station A (BS#A) to an adjacent TSTD base station B (BS#B). Immediately before the soft handoff, the base station A transmits a signal in the non-TSTD mode of operation, and the mobile station receives the transmitted signal (320). During the soft handoff, the base stations A and B alternately transmit the same data via selected antennas thereof in the macro-TSTD mode of operation, and the mobile station assigns the fingers to the transmission paths from the respective base stations to receive the transmitted data (360). In this embodiment, two fingers are assigned all together.

Here, selection of the transmission antennas in the base station B entirely depends on a judgement of the base station B itself, because the mobile station has not received a signal transmitted in the TSTD mode from the base station B and thus cannot determine which transmission antenna of the base station B has the higher transmission quality. Therefore, selection of the transmission antennas in the base station B is determined by the base station B itself depending on the total transmission powers to the respective antennas. After completion of the soft handoff, the base station B operates in the non-TSTD mode and the mobile station also operates in the non-TSTD mode to receive data from the base station B (340).

FIG. 22B illustrates a flow diagram of control signals and traffic signals between the base stations and the mobile station during the handoff process of FIG. 22A. In step 2211, the non-TSTD base station A and the non-,TSTD mobile station communicate with each other in the non-TSTD mode of operation. During the communication, the mobile station examines in step 2213 whether a receiving strength of a signal from the base station A is lower than a threshold to determine whether handoff is required. When handoff is not required, the mobile station returns to step 2211 and continuously communicates with the base station A. Otherwise, when handoff is required, the mobile station proceeds to step 2215 to send a handoff request to the base station A. The base station A then sends a handoff confirm message to the mobile station in response to the handoff request in step 2217.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2219.

Thereafter, upon entering the soft handoff state, the base station A transmits a signal in the macro-TSTD mode of operation in step 2221 and at the same time, the base station B also transmits the same signal in the macro-TSTD mode of operation in step 2223. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2225, and the base station A then sends an acknowledge message in response to the request message and releases the channel in step 2227. At the instant of sending the channel release request, the mobile station sends a macro-TSTD mode release request to the base station B in step 2229, and the base station B sends an acknowledge message in response to the request in step 2231. Upon receipt of the acknowledge message, the mobile station switches the receiving mode from the macro-TSTD mode to the non-TSTD mode and communicates with the base station B in the non-TSTD mode of operation in step 2233.

R. Eighteenth Embodiment

Figure 23A:
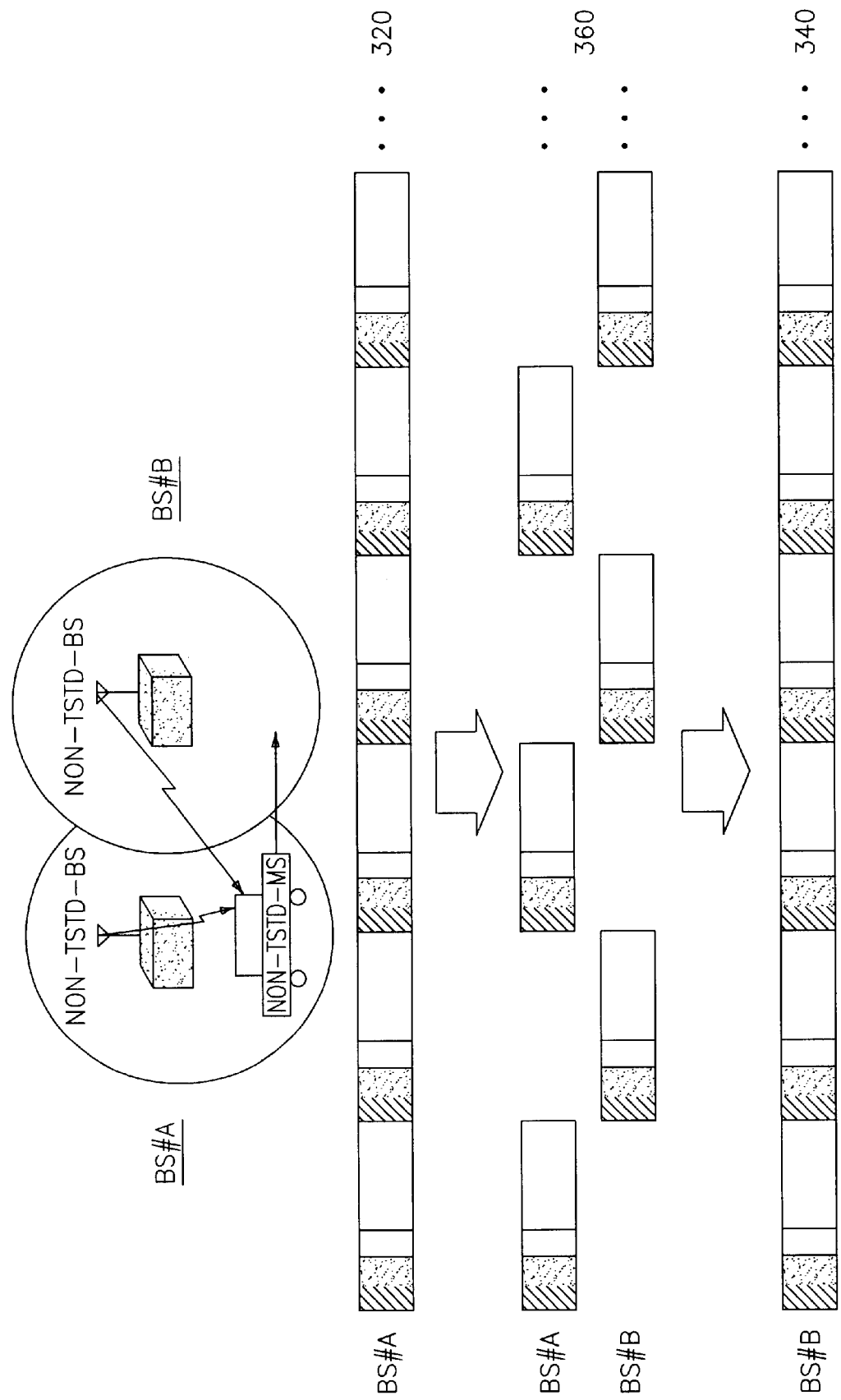
FIGS. 23A and 23B are diagrams illustrating a soft handoff procedure between a non-TSTD mobile station and two non-TSTD base stations in a mobile communication system according to an eighteenth embodiment of the present invention.
Figure 23B:
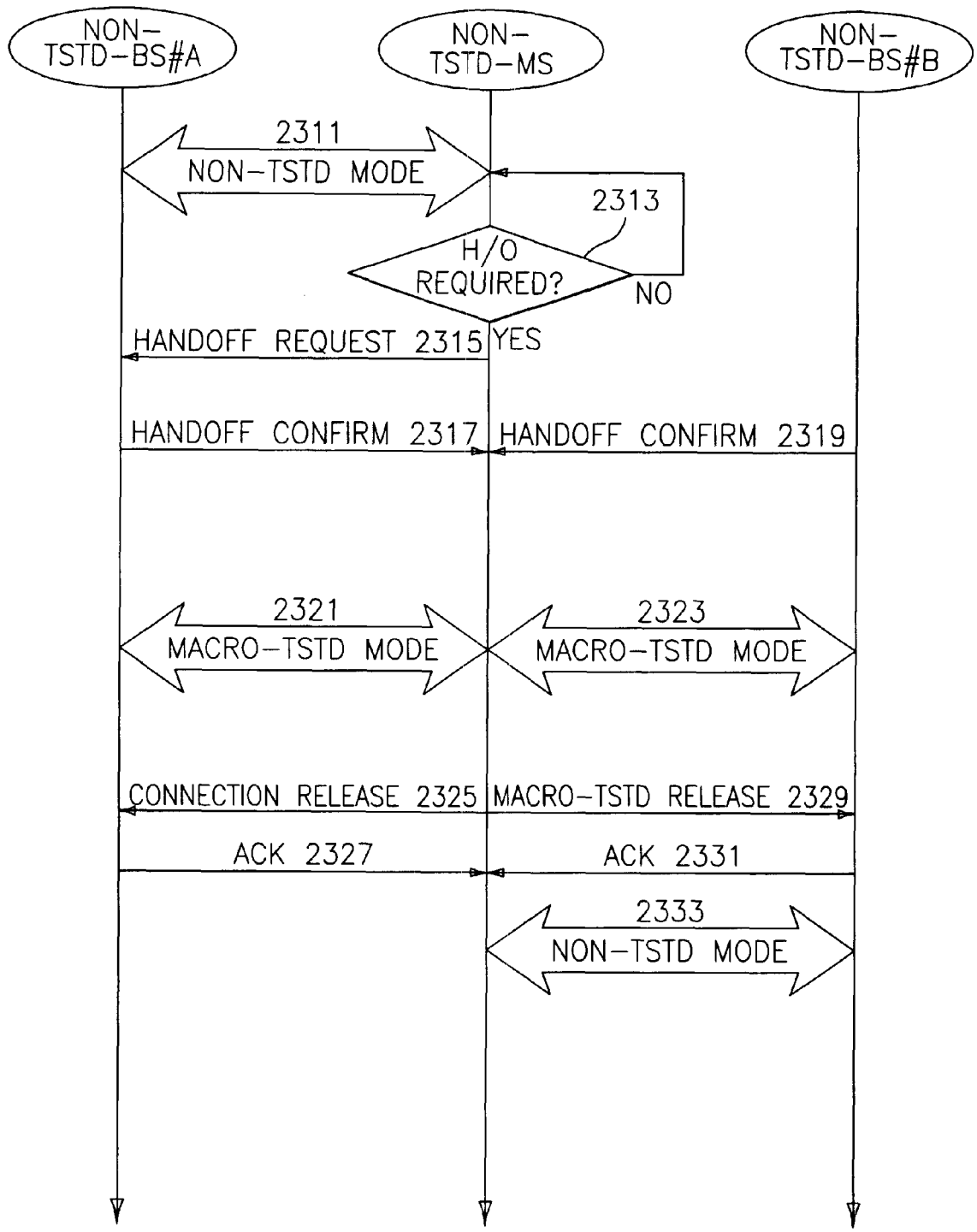

FIGS. 23A and 23B are diagrams illustrating a soft handoff method according to an eighteenth embodiment of the present invention. Referring to FIG. 23A, a signal exchange occurring when a non-TSTD mobile station travels from a non-TSTD base station A (BS#A) to an adjacent non-TSTD base station B (BS#B). Immediately before the soft handoff, the base station A transmits a signal in the non-TSTD mode of operation, and the mobile station receives the transmitted signal (320). During the soft handoff, the base stations A and B alternately transmit the same data via selected antennas thereof in the macro-TSTD mode of operation, and the mobile station assigns the fingers to the transmission paths from the respective base stations to receive the transmitted data (360). In this embodiment, two fingers are assigned all together. After completion of the soft handoff, the base station B operates in the non-TSTD mode and the mobile station also operates in the non-TSTD mode to receive data from the base station B (340).

FIG. 23B illustrates a flow diagram of control signals and traffic signals between the base stations and the mobile station during the handoff process of FIG. 23A. In step 2311, the non-TSTD base station A and the non-TSTD mobile station communicate with each other in the non-TSTD mode of operation. During the communication, the mobile station examines in step 2313 whether a receiving strength of a signal from the base station A is lower than a threshold to determine whether handoff is required. When handoff is not required, the mobile station returns to step 2311 and continuously communicates with the base station A. Otherwise, when handoff is required, the mobile station proceeds to step 2315 to send a handoff request to the base station A. The base station A then sends a handoff confirm message to the mobile station in response to the handoff request in step 2317.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2319.

Thereafter, upon entering the soft handoff state, the base station A transmits a signal in the macro-TSTD mode of operation in step 2321 and at the same time, the base station B also transmits the same signal in the macro-TSTD mode of operation in step 2323. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2325, and the base station A then sends an acknowledge message in response to the request message and releases the channel in step 2327. At the instant of sending the channel release request, the mobile station sends a macro-TSTD mode release request to the base station B in step 2329, and the base station B sends an acknowledge message in response to the request in step 2331. Upon receipt of the acknowledge message, the mobile station switches the receiving mode from the macro-TSTD mode to the non-TSTD mode and communicates with the base station B in the non-TSTD mode of operation in step 2333.

S. Nineteenth Embodiment

Figure 24A:
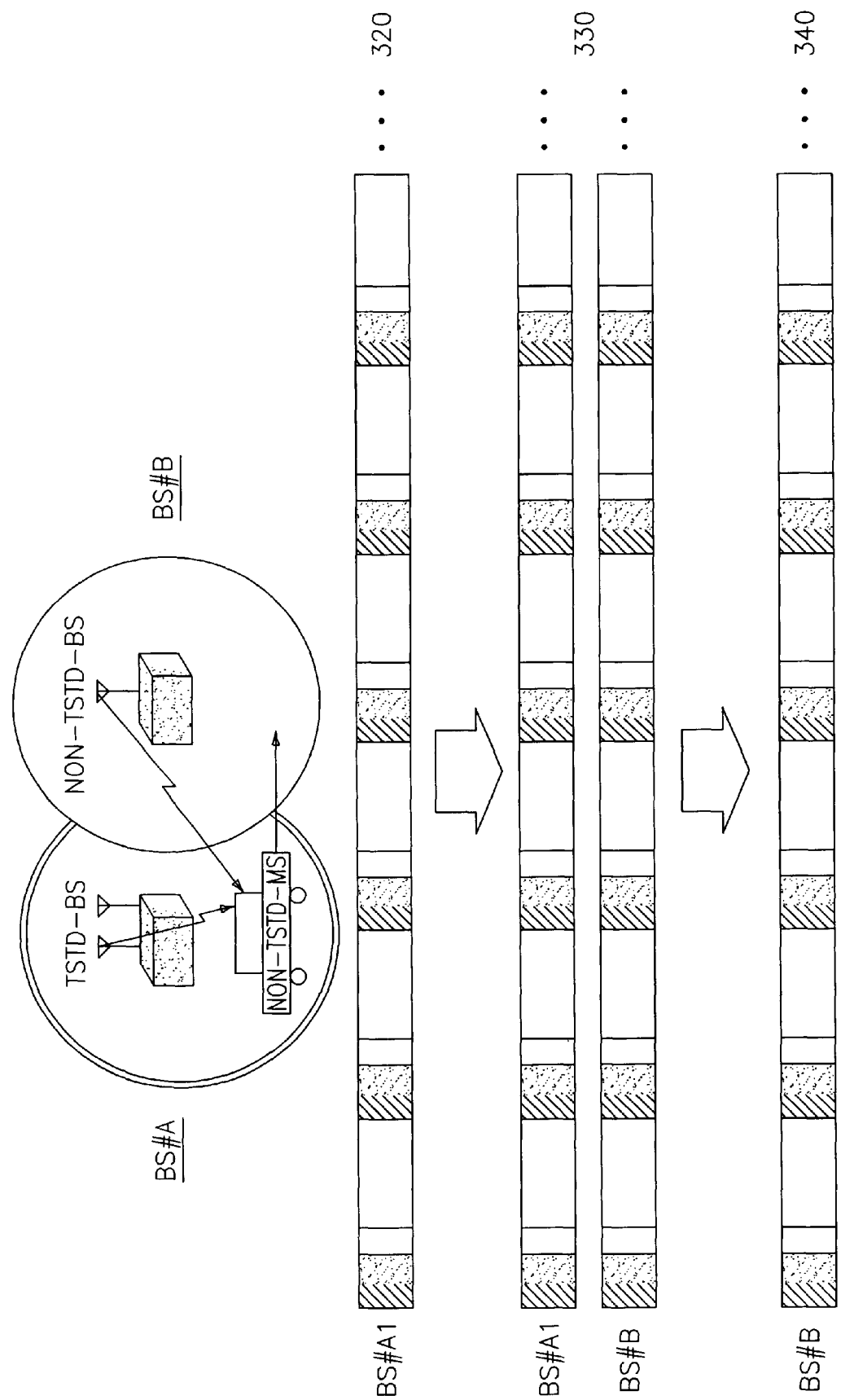
FIGS. 24A and 24B are diagrams illustrating a soft handoff procedure when a non-TSTD mobile station travels from a TSTD base station to a non-TSTD base station in a mobile communication system according to a nineteenth embodiment of the present invention.
Figure 24B:
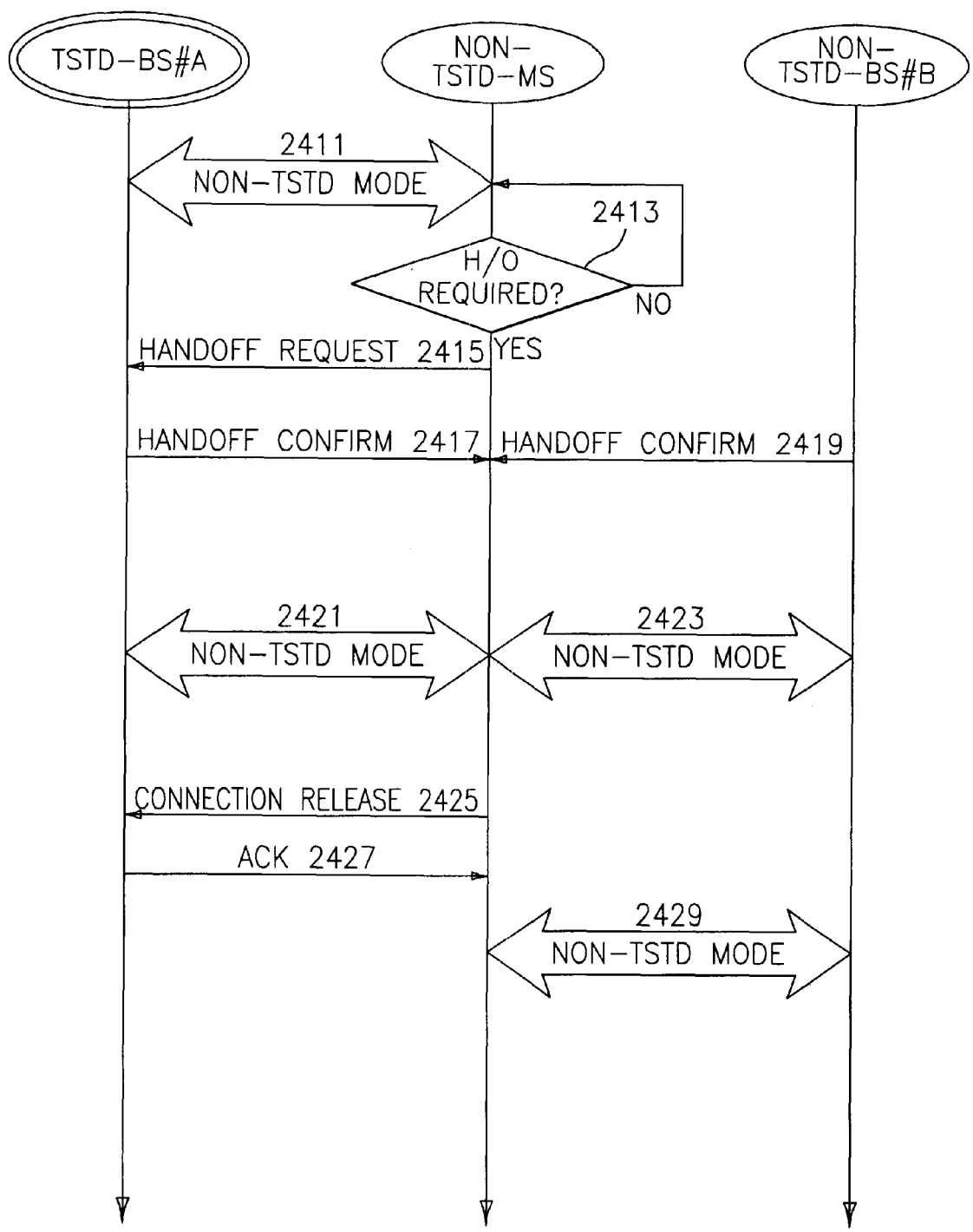

FIGS. 24A and 24B are diagrams illustrating a soft handoff method according to a nineteenth embodiment of the present invention. Referring to FIG. 24A, a signal exchange occurring when a non-TSTD mobile station travels from a TSTD base station A (BS#A) to an adjacent non-TSTD base station B (BS#B). Immediately before the soft handoff, the base station A transmits a signal through one selected transmission antenna in the non-TSTD mode of operation, and the mobile station receives the transmitted signal (320). During the soft handoff, the base stations A and B simultaneously transmit the same data in the non-TSTD mode of operation, and the mobile station assigns the fingers to the transmission paths from the respective base stations to receive the transmitted data (330). In this embodiment, two fingers are assigned all together. After completion of the soft handoff, the base station B operates in the non-TSTD mode and the mobile station also operates in the non-TSTD mode to receive data from the base station B (340).

FIG. 24B illustrates a flow diagram of control signals and traffic signals between the base stations and the mobile station during the handoff process of FIG. 24A. In step 2411, the TSTD base station A and the non-TSTD mobile station communicate with each other in the non-TSTD mode of operation. During the communication, the mobile station examines in step 2413 whether a receiving strength of a signal from the base station A is lower than a threshold to determine whether handoff is required. When handoff is not required, the mobile station returns to step 2411 and continuously communicates with the base station A. Otherwise, when handoff is required, the mobile station proceeds to step 2415 to send a handoff request to the base station A. The base station A then sends a handoff confirm message to the mobile station in response to the handoff request in step 2417.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2419.

Thereafter, upon entering the soft handoff state, the base station A transmits a signal in the non-TSTD mode of operation in step 2421 and at the same time, the base station B also transmits the same signal in the non-TSTD mode of operation in step 2423. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2425, and the base station. A then sends an acknowledge message in response to the request message and releases the channel in step 2427. At the same time, the mobile station also discontinues receiving a signal from the base station A. Thereafter, the mobile station communicates with the base station B in the non-TSTD mode of operation in step 2429.

T. Twentieth Embodiment

Figure 25A:
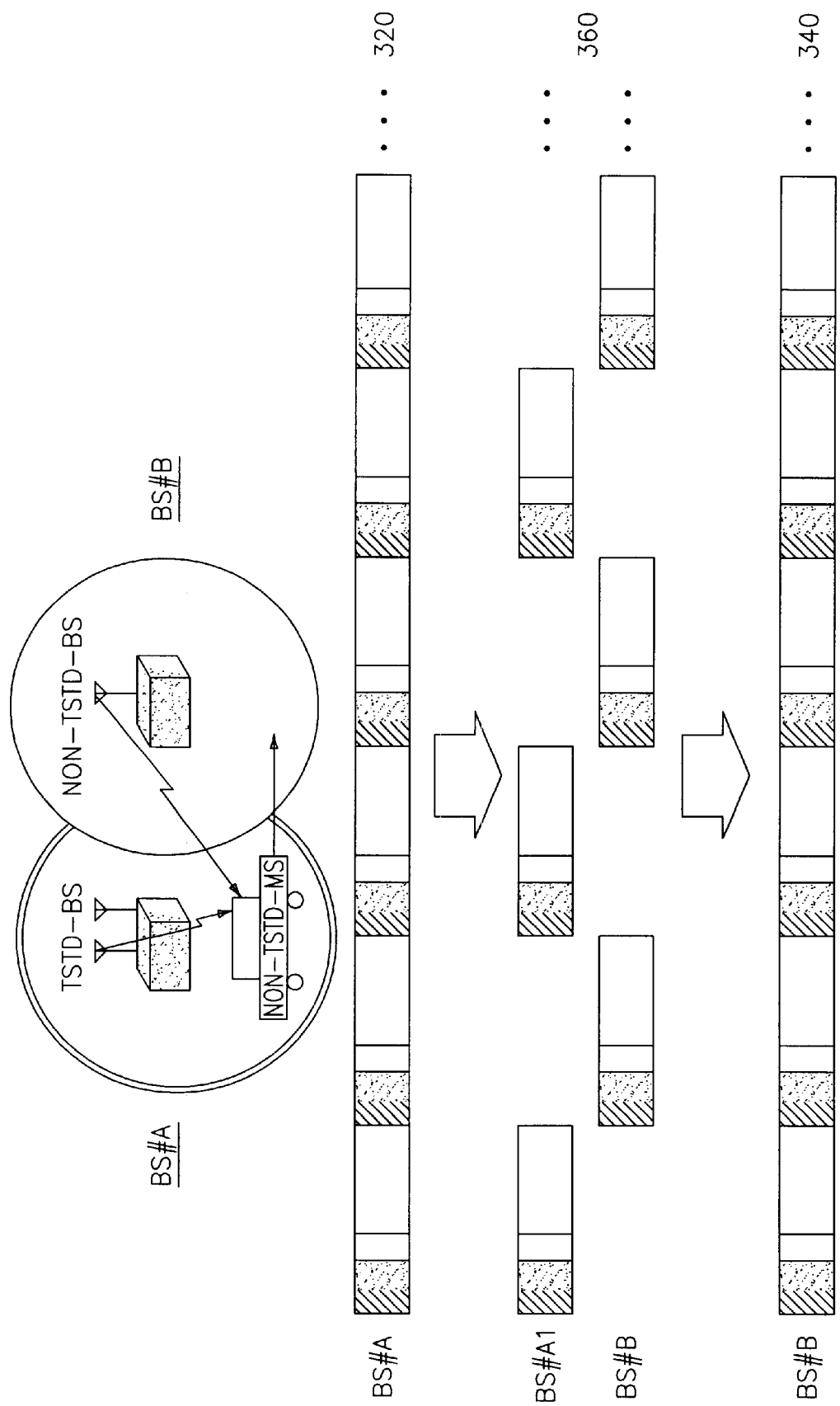
FIGS. 25A and 25B are diagrams illustrating a soft handoff procedure when a non-TSTD mobile station travels from a TSTD base station to a non-TSTD base station in a mobile communication system according to a twelfth embodiment of the present invention.
Figure 25B:
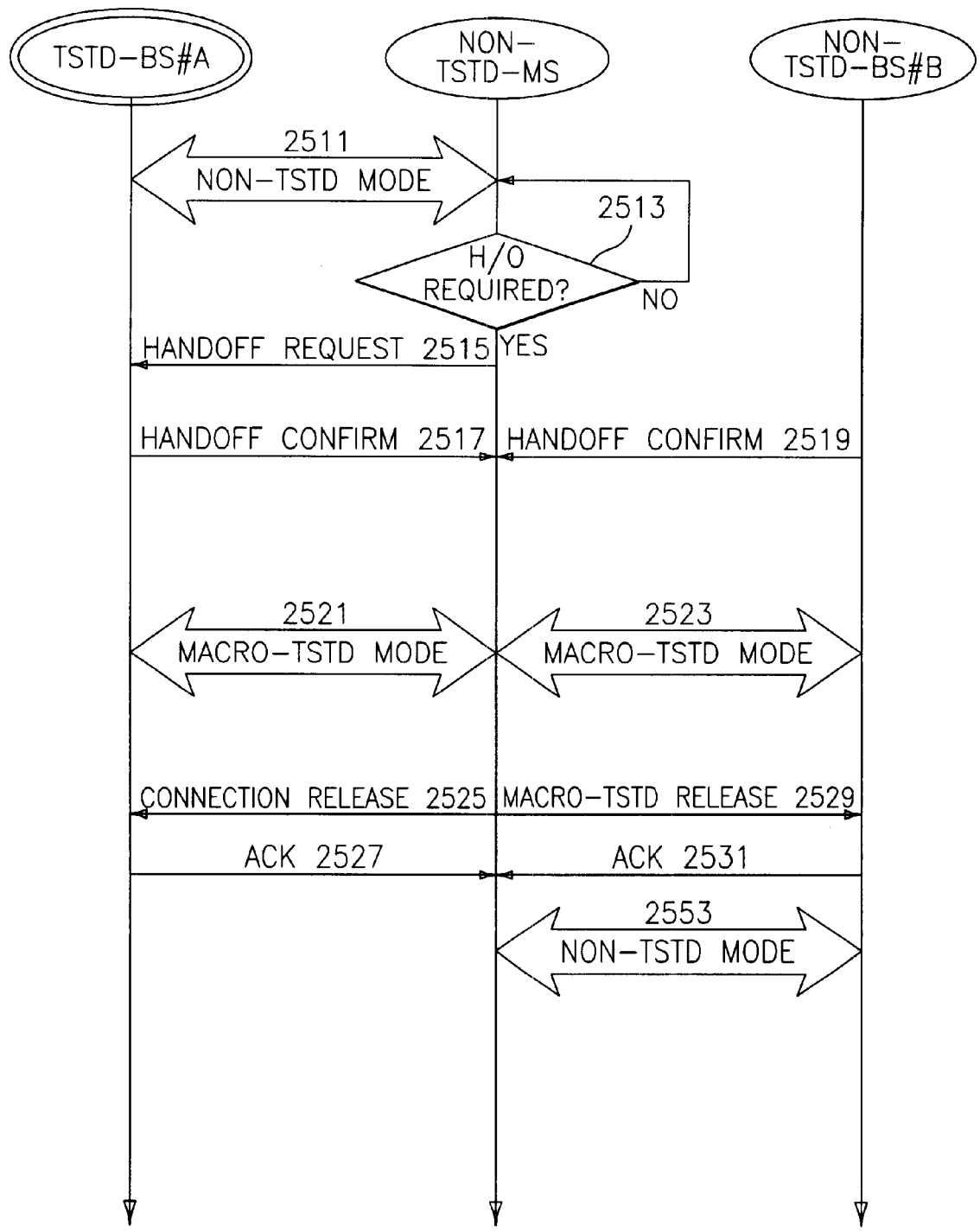

FIGS. 25A and 25B are diagrams illustrating a soft handoff method according to a twentieth embodiment of the present invention. Referring to FIG. 25A, a signal exchange occurring when a non-TSTD mobile station travels from a TSTD base station A (BS#A) to an adjacent non-TSTD base station B (BS#B). Immediately before the soft handoff, the base station A transmits a signal in the non-TSTD mode of operation, and the mobile station receives the transmitted signal (320). During the soft handoff, the base stations A and B alternately transmit the same data via selected antennas thereof in the macro-TSTD mode of operation, and the mobile station assigns the fingers to the transmission paths from the respective base stations to receive the transmitted data alternately (360). In this embodiment, two fingers are assigned all together. After completion of the soft handoff, the base station-B operates in the non-TSTD mode and the mobile station also operates in the non-TSTD mode to receive data from the base station B (340).

FIG. 25B illustrates a flow diagram of control signals and traffic signals between the base stations and the mobile station during the handoff process of FIG. 25A. In step 2511, the TSTD base station A and the non-TSTD mobile station communicate with each other in the non-TSTD mode of operation. During the communication, the mobile station examines in step 2513 whether a receiving strength of a signal from the base station A is lower than a threshold to determine whether handoff is required. When handoff is not required, the mobile station returns to step 2511 and continuously communicates with the base station A. Otherwise, when handoff is required, the mobile station proceeds to step 2515 to send a handoff request to the base station A. The base station A then sends a handoff confirm message to the mobile station in response to the handoff request in step 2517.

Here, together with the handoff request, the mobile station sends information about the handoff target base station B and information about a transmission antenna, selected for the non-TSTD mode, out of the transmission antennas of the base station A. Upon receipt of the handoff request, the base station A inquires the base station controller (BSC) as to whether the base station B can accept the handoff, and sends the inquiry result to the mobile station. At the same moment, the base station B can also send the mobile station information as to whether handoff is acceptable, in step 2519.

Thereafter, upon entering the soft handoff state, the base station A transmits a signal in the macro-TSTD mode of operation in step 2521 and at the same time, the base station B also transmits the same signal in the macro-TSTD mode of operation in step 2523. The mobile station then receives the transmitted signals by assigning the fingers for the signals from the respective base stations, multiplies the received signals by the weights corresponding to qualities of the signals from the respective base stations using the combiner and accumulates the multiplied values, to thereby perform the soft handoff operation.

In the meantime, when the quality of a signal from the base station A decreases below a threshold, the mobile station sends a release request message for a channel connected to the base station A in step 2525, and the base station A then sends an acknowledge message in response to the request message and releases the channel in step 2527. At the instant of sending the channel release request, the mobile station sends a macro-TSTD mode release request to the base station B in step 2529, and the base station B sends an acknowledge message in response to the request in step 2531. Upon receipt of the acknowledge message, the mobile station switches the receiving mode from the macro-TSTD mode to the non-TSTD mode and communicates with the base station B in the non-TSTD mode of operation in step 2533.

In the light of the foregoing descriptions, the mobile communication system having the transmitter and receiver described herein can efficiently perform a handoff operation under various environments and circumstances.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a handoff when a mobile station receiving a transmission diversity signal travels from a first base station transmitting a signal in a transmission diversity mode of operation to a second base station transmitting a signal in the transmission diversity mode of operation, the method comprising the steps of:

enabling the mobile station to communicate with the first base station in the transmission diversity mode of operation;

prior to performing the handoff, enabling the mobile station to communicate with the first base station in a non-transmission diversity mode of operation;

during the handoff, enabling the mobile station to communicate with the first and second base stations in the non-transmission diversity mode of operation;

upon completing the handoff, enabling the mobile station to communicate with the second base station in the non-transmission diversity mode of operation; and after a predetermined time, enabling the mobile station to communicate with the second base station in the transmission diversity mode of operation.

2. A method for performing a handoff when a mobile station receiving a transmission diversity signal travels from a first base station transmitting a signal in a transmission diversity mode of operation to a second base station transmitting a signal in the transmission diversity mode of operation, the method comprising the steps of:

enabling the mobile station to communicate with the first base station in the transmission diversity mode of operation;

during the handoff, enabling the mobile station to communicate with the first and second base stations in the non-transmission diversity mode of operation; and upon completing the handoff, enabling the mobile station to communicate with the second base station in the transmission diversity mode of operation.

3. A method for performing a handoff when a mobile station receiving a transmission diversity signal travels from a first base station transmitting a signal in a non-transmission diversity mode of operation to a second base station transmitting a signal in a transmission diversity mode of operation, the method comprising the steps of:

enabling the mobile station to communicate with the first base station in the non-transmission diversity mode of operation;

during the handoff, enabling the mobile station to communicate with the first and second base stations in the non-transmission diversity mode of operation;

upon completing the handoff, enabling the mobile station to communicate with the second base station in the non-transmission diversity mode of operation; and after a predetermined time, enabling the mobile station to communicate with the second base station in a micro-transmission diversity mode of operation.

4. A method for performing a handoff when a mobile station receiving a transmission diversity signal travels from a first base station transmitting a signal in a non-transmission diversity mode of operation to a second base station transmitting a signal in a transmission diversity mode of operation, the method comprising the steps of:

enabling the mobile station to communicate with the first base station in the non-transmission diversity mode of operation;

during the handoff, enabling the mobile station to communicate with the first and second base stations in the non-transmission diversity mode of operation; and upon completing the handoff, enabling the mobile station to communicate with the second base station in the transmission diversity mode of operation.

5. A method for performing a handoff when a mobile station receiving a transmission diversity signal travels from a first base station transmitting a signal in a non-transmission diversity mode of operation to a second base station transmitting a signal in the non-transmission diversity mode of operation, the method comprising the steps of:

enabling the mobile station to communicate with the first base station in the non-transmission diversity mode of operation;

during the handoff, enabling the mobile station to communicate with the first and second base stations in the non-transmission diversity mode of operation; and upon completing the handoff, enabling the mobile station to communicate with the second base station in the non-transmission diversity mode of operation.

6. A method for performing a handoff when a mobile station receiving a transmission diversity signal travels from a first base station transmitting a signal in a transmission diversity mode of operation to a second base station transmitting a signal in a non-transmission diversity mode of operation, the method comprising the steps of:

enabling the mobile station to communicate with the first base station in a micro-transmission diversity mode of operation;

prior to performing handoff, enabling the mobile station to communicate with the first base station in the non-transmission diversity mode of operation;

during the handoff, enabling the mobile station to communicate with the first and second base stations in the non-transmission diversity mode of operation; and upon completing the handoff, enabling the mobile station to communicate with the second base station in the non-transmission diversity mode of operation.

7. A method for performing a handoff when a mobile station receiving a transmission diversity signal travels from a first base station transmitting a signal in a transmission diversity mode of operation to a second base station transmitting a signal in the transmission diversity mode of operation, the method comprising the steps of:

enabling the mobile station to communicate with the first base station in a non-transmission diversity mode of operation;

during the handoff, enabling the mobile station to communicate with the first and second base stations in the non-transmission diversity mode of operation; and upon completing the handoff, enabling the mobile station to communicate with the second base station in the non-transmission diversity mode of operation.

8. A method for performing a handoff when a mobile station receiving a transmission diversity signal travels from a first base station transmitting a signal in a non-transmission diversity mode of operation to a second base station transmitting a signal in a transmission diversity mode of operation, the method comprising the steps of:

enabling the mobile station to communicate with the first base station in a non-transmission diversity mode of operation;

during the handoff, enabling the mobile station to communicate with the first and second base stations in the non-transmission diversity mode of operation; and upon completing the handoff, enabling the mobile station to communicate with the second base station in the non-transmission diversity mode of operation.

9. A method for performing a handoff when a mobile station receiving a transmission diversity signal travels from a first base station transmitting a signal in a transmission diversity mode of operation to a second base station transmitting a signal in a non-transmission diversity mode of operation, the method comprising the steps of:

enabling the mobile station to communicate with the first base station in a non-transmission diversity mode of operation;

during the handoff, enabling the mobile station to communicate with the first and second base stations in the non-transmission diversity mode of operation; and upon completing the handoff, enabling the mobile station to communicate with the second base station in the non-transmission diversity mode of operation.

* * * * *